(12) United States Patent
Kondo

(10) Patent No.: US 11,423,578 B2
(45) Date of Patent: Aug. 23, 2022

(54) ENCODING DEVICE, ENCODING METHOD, DECODING DEVICE, AND DECODING METHOD

(71) Applicant: SONY CORPORATION, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 16/649,186

(22) PCT Filed: Sep. 13, 2018

(86) PCT No.: PCT/JP2018/033918
§ 371 (c)(1),
(2) Date: Mar. 20, 2020

(87) PCT Pub. No.: WO2019/065261
PCT Pub. Date: Apr. 4, 2019

(65) Prior Publication Data
US 2020/0273209 A1    Aug. 27, 2020

(30) Foreign Application Priority Data

Sep. 27, 2017   (JP) .............................. JP2017-185644

(51) Int. Cl.
*G06T 9/00* (2006.01)
*H04N 19/117* (2014.01)
(Continued)

(52) U.S. Cl.
CPC ................ *G06T 9/00* (2013.01); *G06K 9/628* (2013.01); *G06K 9/6277* (2013.01); *G06N 20/00* (2019.01);
(Continued)

(58) Field of Classification Search
CPC .......... G06T 9/00; G06T 3/40; G06K 9/6277; G06K 9/628; G06N 20/00; H04N 19/117;
(Continued)

(56) References Cited

U.S. PATENT DOCUMENTS 6,678,405 B1 *  1/2004  Kondo ................. H04N 7/0125
                                                   382/254
2012/0213271 A1 *  8/2012  Chong .................. H04N 19/96
                                                   375/E7.193
(Continued)

FOREIGN PATENT DOCUMENTS

| CN | 102780887 A | 11/2012 |
| CN | 102804781 A | 11/2012 |
| CN | 103959777 A | 7/2014 |
| JP | 2001-285881 A | 10/2001 |

*Primary Examiner* — Aaron W Carter
(74) *Attorney, Agent, or Firm* — Paratus Law Group, PLLC

(57) ABSTRACT

There is provided an encoding device, encoding method, decoding device, and decoding method that make it possible to improve the coding efficiency. The encoding device and the decoding device each perform classification of classifying a pixel of interest of a decoding in-progress image into any of a plurality of classes by using an inclination feature amount, and perform a filter arithmetic operation with the decoding in-progress image by using a tap coefficient of a class of the pixel of interest among tap coefficients of the respective classes. The inclination feature amount indicates a tangent direction of a contour line of pixel values of the pixel of interest. The decoding in-progress image is obtained by adding a residual of predictive coding and a predicted image together. The tap coefficients of the respective classes are each obtained through learning for minimizing an error by using the decoding in-progress image and an original image. The original image corresponds to the decoding in-progress image. The present technology is applicable in a case where an image is encoded or decoded.

20 Claims, 47 Drawing Sheets

(51) Int. Cl.
*H04N 19/65* (2014.01)
*G06N 20/00* (2019.01)
*G06K 9/62* (2022.01)
*G06T 3/40* (2006.01)

(52) U.S. Cl.
CPC ............ *G06T 3/40* (2013.01); *H04N 19/117* (2014.11); *H04N 19/65* (2014.11)

(58) Field of Classification Search
CPC ...... H04N 19/65; H04N 19/14; H04N 19/176; H04N 19/182; H04N 19/82; H04N 19/86; G06V 10/473; G06V 10/50
See application file for complete search history.

(56) References Cited

U.S. PATENT DOCUMENTS

| | | | |
|---|---|---|---|
| 2012/0288209 A1* | 11/2012 | Miyai | H04N 19/86 |
| | | | 382/233 |
| 2013/0094569 A1* | 4/2013 | Chong | H04N 19/82 |
| | | | 375/240.02 |
| 2019/0104308 A1* | 4/2019 | Nishida | H04N 19/82 |
| 2020/0021832 A1* | 1/2020 | Kawai | H04N 19/136 |
| 2020/0273209 A1* | 8/2020 | Kondo | H04N 19/182 |
| 2020/0382812 A1* | 12/2020 | Kawai | H04N 19/182 |
| 2021/0168407 A1* | 6/2021 | Ikeda | H04N 19/182 |
| 2021/0266535 A1* | 8/2021 | Kawai | H04N 19/117 |
| 2021/0289200 A1* | 9/2021 | Ikeda | H04N 19/14 |
| 2021/0297687 A1* | 9/2021 | Kawai | H04N 19/82 |
| 2021/0377523 A1* | 12/2021 | Kawai | H04N 19/182 |

* cited by examiner

ENCODING DEVICE, ENCODING METHOD, DECODING DEVICE, AND DECODING METHOD

CROSS REFERENCE TO PRIOR APPLICATION

This application is a National Stage Patent Application of PCT International Patent Application No. PCT/JP2018/033918 (filed on Sep. 13, 2018) under 35 U.S.C. § 371, which claims priority to Japanese Patent Application No. 2017-185644 (filed on Sep. 27, 2017), which are all hereby incorporated by reference in their entirety.

TECHNICAL FIELD

The present technology relates to an encoding device, an encoding method, a decoding device, and a decoding method. For example, the present technology particularly relates to an encoding device, encoding method, decoding device, and decoding method that make it possible to improve the encoding efficiency of an image.

BACKGROUND ART

Examples of ILF (In Loop Filter) proposed in HEVC (High Efficiency Video Coding) include DF (Deblocking Filter) for reducing block noise, SAO (Sample Adaptive Offset) for reducing ringing, and ALF (Adaptive Loop Filter) for minimizing encoding errors (errors of decoded images with respect to original images). The ILF (In Loop Filter) is one of predictive coding systems.

The ALF is described in PTL 1, and the SAO is described in PTL 2.

CITATION LIST

Patent Literature

PTL 1: Japanese Patent No. 5485983
PTL 2: Japanese Unexamined Patent Application Publication (Published Japanese Translation of PCT Application) No. 2014-523183

SUMMARY OF THE INVENTION

Problems to be Solved by the Invention

In recent years, a proposal for ILF is requested that makes it possible to further improve the coding efficiency.

The present technology has been devised in view of such circumstances, and makes it possible to improve the coding efficiency.

Means for Solving the Problems

A decoding device according to the present technology is a decoding device including: a decoding unit: a classification section; and an arithmetic operation unit. The decoding unit decodes tap coefficients of respective classes. The tap coefficients are each obtained through learning for minimizing an error by using a decoding in-progress image and an original image. The decoding in-progress image is obtained by adding a residual of predictive coding and a predicted image together. The original image corresponds to the decoding in-progress image. The classification section performs classification of classifying a pixel of interest of the decoding in-progress image into any of a plurality of classes by using an inclination feature amount. The inclination feature amount indicates a tangent direction of a contour line of pixel values of the pixel of interest. The arithmetic operation unit performs a filter arithmetic operation with the decoding in-progress image by using a tap coefficient of a class of the pixel of interest among the tap coefficients of the respective classes.

A decoding method according to the present technology is a decoding method including, by a decoding device: decoding tap coefficients of respective classes; performing classification of classifying a pixel of interest of a decoding in-progress image into any of a plurality of classes by using an inclination feature amount: and performing a filter arithmetic operation with the decoding in-progress image by using a tap coefficient of a class of the pixel of interest among the tap coefficients of the respective classes. The tap coefficients are each obtained through learning for minimizing an error by using the decoding in-progress image and an original image. The decoding in-progress image is obtained by adding a residual of predictive coding and a predicted image together. The original image corresponds to the decoding in-progress image. The inclination feature amount indicates a tangent direction of a contour line of pixel values of the pixel of interest.

In the decoding device and decoding method according to the present technology, the tap coefficients of the respective classes are decoded. The tap coefficients of the respective classes are obtained through the learning for minimizing the error by using the decoding in-progress image and the original image. The decoding in-progress image is obtained by adding the residual of the predictive coding and the predicted image together. The original image corresponds to the decoding in-progress image. In addition, the classification of classifying the pixel of interest of the decoding in-progress image into any of the plurality of classes is performed by using the inclination feature amount indicating the tangent direction of the contour line of the pixel values of the pixel of interest, and the filter arithmetic operation with the decoding in-progress image is performed by using the tap coefficient of the class of the pixel of interest among the tap coefficients of the respective classes.

An encoding device according to the present technology is an encoding device including: a classification section; an arithmetic operation unit; and an encoding unit. The classification section performs classification of classifying a pixel of interest of a decoding in-progress image into any of a plurality of classes by using an inclination feature amount. The inclination feature amount indicates a tangent direction of a contour line of pixel values of the pixel of interest. The decoding in-progress image is obtained by adding a residual of predictive coding and a predicted image together. The arithmetic operation unit performs a filter arithmetic operation with the decoding in-progress image by using a tap coefficient of a class of the pixel of interest among tap coefficients of the respective classes. The tap coefficients of the respective classes are each obtained through learning for minimizing an error by using the decoding in-progress image and an original image. The original image corresponds to the decoding in-progress image. The encoding unit encodes the tap coefficient.

An encoding method according to the present technology is an encoding method including, by an encoding device: performing classification of classifying a pixel of interest of a decoding in-progress image into any of a plurality of classes by using an inclination feature amount; performing a filter arithmetic operation with the decoding in-progress image by using a tap coefficient of a class of the pixel of interest among tap coefficients of the respective classes; and encoding the tap coefficient. The inclination feature amount indicates a tangent direction of a contour line of pixel values of the pixel of interest. The decoding in-progress image is obtained by adding a residual of predictive coding and a predicted image together. The tap coefficients of the respective classes are each obtained through learning for minimizing an error by using the decoding in-progress image and an original image. The original image corresponds to the decoding in-progress image.

In the encoding device and encoding method according to the present technology, the classification of classifying the pixel of interest of the decoding in-progress image into any of the plurality of classes is performed by using the inclination feature amount. The filter arithmetic operation with the decoding in-progress image is performed by using the tap coefficient of the class of the pixel of interest among the tap coefficients of the respective classes. The inclination feature amount indicates the tangent direction of the contour line of the pixel values of the pixel of interest. The decoding in-progress image is obtained by adding the residual of the predictive coding and the predicted image together. The tap coefficients of the respective classes are each obtained through the learning for minimizing the error by using the decoding in-progress image and the original image. The original image corresponds to the decoding in-progress image. In addition, the tap coefficient is encoded.

It is to be noted that each of the encoding device and the decoding device may be an independent device or may be an internal block included in one device.

In addition, it is possible to achieve each of the encoding device and the decoding device by causing a computer to execute a program. It is possible to provide the program by being transmitted via a transmission medium, or by being recorded in a recording medium.

Effects of the Invention

According to the present technology, it is possible to improve the coding efficiency.

It is to be noted that the effects described here are not necessarily limitative, but may be any of the effects described in the present disclosure.

MODES FOR CARRYING OUT THE INVENTION

<Image Processing System to which the Present Technology is Applied>

Figure 1:
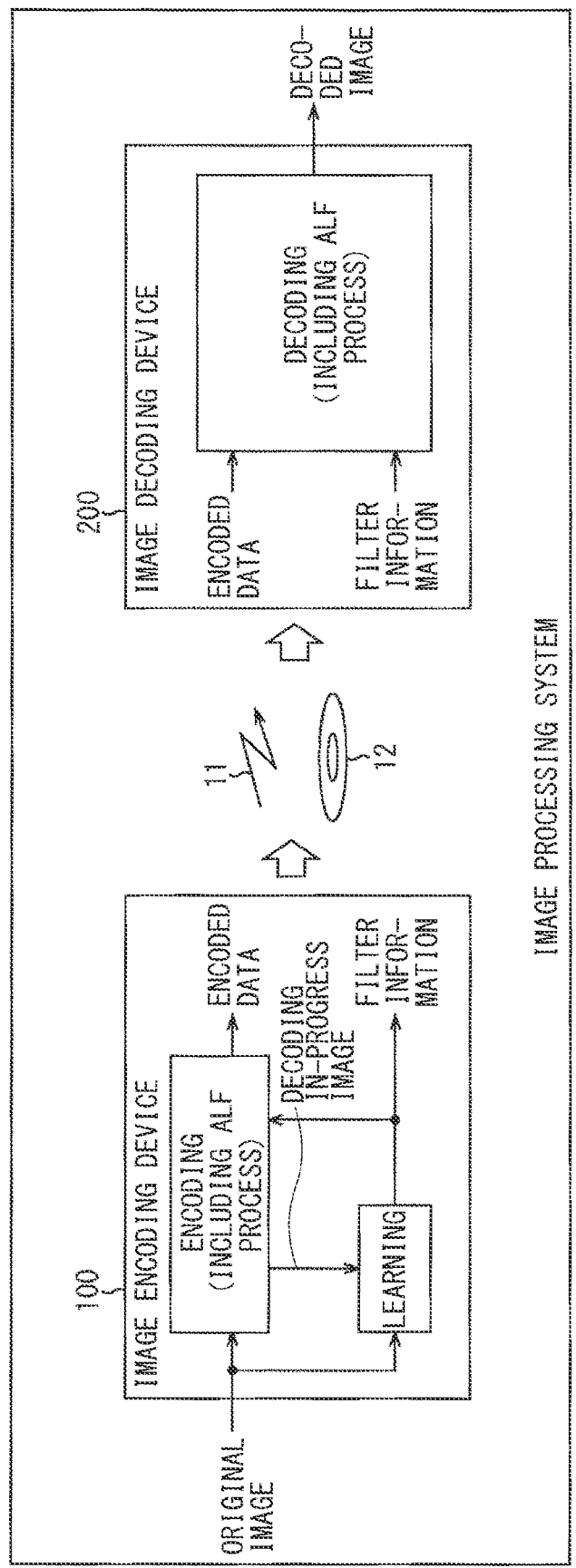
FIG. 1 is a diagram illustrating a configuration example of an embodiment of an image processing system to which the present technology is applied.

FIG. 1 is a diagram illustrating a configuration example of an embodiment of an image processing system to which the present technology is applied.

In FIG. 1, the image processing system includes an image encoding device 100 and an image decoding device 200.

An original image to be encoded is supplied to the image encoding device 100.

The image encoding device 100 encodes the original image, for example, by predictive encoding such as HEVC or AVC (Advanced Video Coding).

In the predictive encoding of the image encoding device 100, a predicted image of the original image is generated, and a residual between the original image and the predicted image is encoded.

Further, in the predictive encoding of the image encoding device 100, an ALF process is performed that applies ALF to a decoding in-progress image, thereby generating a reference image that is used to predict the predicted image. The decoding in-progress image is obtained by adding the residual of the predictive encoding and the predicted image together.

Here, an image obtained by performing a filter process (filtering) serving as the ALF process on the decoding in-progress image is also referred to as filtered image.

The image encoding device 100 performs not only predictive coding, but also learning or the like as necessary by using a decoding in-progress image and the original image corresponding to the decoding in-progress image, thereby making it possible to obtain information regarding a filter process as filter information. The filter process serves as an ALF process that brings a filtered image as close to the original image as possible.

It is possible to perform the ALF process of the image encoding device 100 by using the filter information obtained through the learning.

Here, it is possible to perform the learning to obtain the filter information, for example, every sequence or sequences of the original image, every scene (frame from a scene change to the next scene change) or scenes of the original image, every frame (picture) or frames (pictures) of the original image, every slice or slices of the original image, every line or lines in a block of a picture serving as a coding unit, or in any other units. In addition, it is possible to perform the learning for obtaining filter information, for example, in a case where the residual or the RD cost is greater than or equal to a threshold.

The image encoding device 100 transmits encoded data obtained from the predictive coding of the original image via a transmission medium 11 or to a recording medium 12 to cause the recording medium 12 to record the encoded data.

In addition, the image encoding device 100 is able to transmit the filter information obtained through learning via the transmission medium 11 or to the recording medium 12 to cause the recording medium 12 to record the filter information.

It is to be noted that it is possible to perform the learning for obtaining filter information by a device different from the image encoding device 100.

In addition, it is also possible to transmit the filter information separately from the encoded data, or transmit the filter information included in the encoded data.

Further, it is possible to perform the learning for obtaining filter information by using not only the original image itself (and the decoding in-progress image obtained from the original image), but also an image that is different from the original image, but has an image feature amount similar to that of the original image.

The image decoding device 200 accepts (receives) (acquires) the encoded data and necessary filter information transmitted from the image encoding device 100, via the transmission medium 11 or the recording medium 12, and decodes the encoded data with a system corresponding to the predictive encoding of the image encoding device 100.

That is, the image decoding device 200 obtains the residual of the predictive encoding by processing the encoded data from the image encoding device 100. Further, the image decoding device 200 obtains a decoding in-progress image similar to the decoding in-progress image obtained by the image encoding device 100, by adding the residual and the predicted image together. The image decoding device 200 then performs a filter process serving as the ALF process on the decoding in-progress image, and obtains a filtered image. In the ALF process, the filter information from the image encoding device 100 is used as necessary.

In the image decoding device 200, the filtered image is outputted as a decoding image of the original image, and as necessary, is temporarily stored as a reference image used to predict the predicted image.

The following describes the outline of ALF.

<Outline of ALF>

Figure 2:
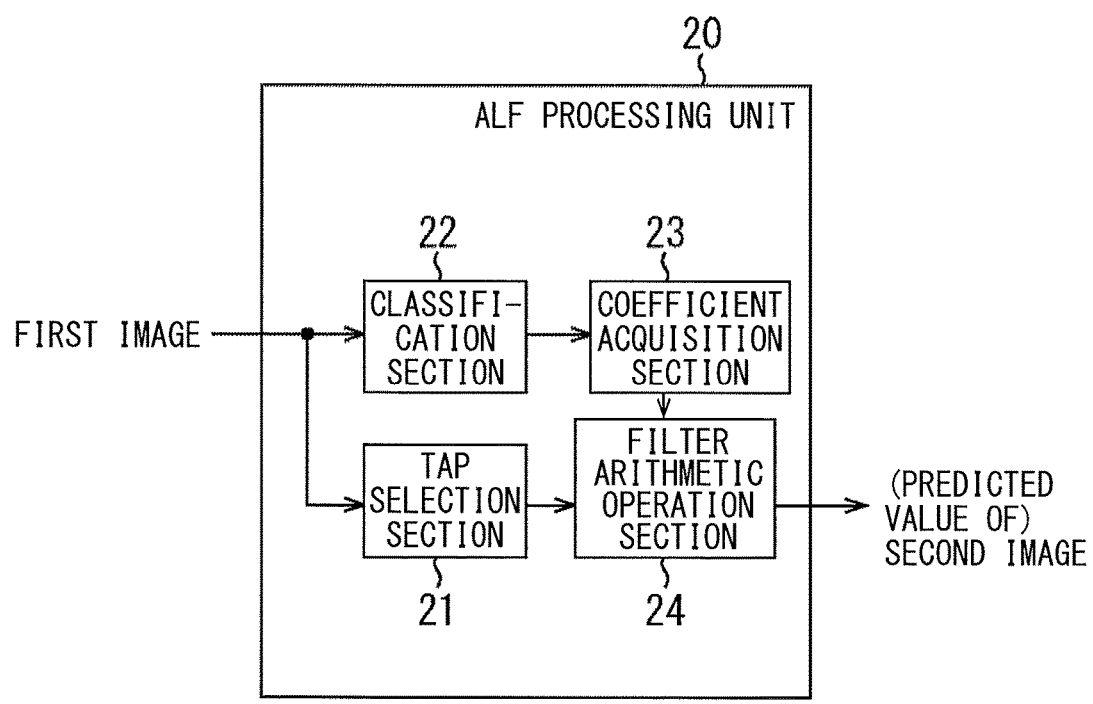
FIG. 2 is a block diagram illustrating a configuration example of an ALF processing unit 20 of ALF that performs an ALF process of applying a filter.

FIG. 2 is a block diagram illustrating a configuration example of an ALF processing unit 20 of ALF that performs an ALF process of applying a filter to an image.

Here, in the ALF process, a filter arithmetic operation with a first image is performed by using a tap coefficient of each class, and (the predicted value of) a second image is obtained. The tap coefficient is obtained through learning for minimizing an error by using the first image and the second image.

In FIG. 2, the ALF processing unit 20 includes a tap selection section 21, a classification section 22, a coefficient acquisition section 23, and a filter arithmetic operation section 24.

The ALF processing unit 20 is supplied with the first image. The first image supplied to the ALF processing unit 20 is supplied to the tap selection section 21 and the classification section 22.

The tap selection section 21 sequentially selects the pixels included in the first image as pixels of interest. Further, the tap selection section 21 selects, as a prediction tap, (the pixel values of) some of the pixels included in the first image used to predict (the pixel values of) the corresponding pixels of the second image. The corresponding pixels of the second image correspond to the pixels of interest.

Specifically, the tap selection section 21 selects a plurality of pixels of the first image at positions spatially (or temporally) close to the spatiotemporal position of the pixel of interest as a prediction tap, thereby configuring the prediction tap and supplying the filter arithmetic operation section 24 therewith.

The classification section 22 performs classification of classifying the pixel of interest into any of several classes in accordance with a certain rule, and supplies (the class code indicating) the resultant class of the pixel of interest to the coefficient acquisition section 23.

That is, the classification section 22 sets, for example, a peripheral region of the pixel of interest as a class block used to classify the pixel of interest, and uses a pixel in (inside) the class block to classify the pixel of interest.

For example, the classification section 22 obtains the feature amount of the pixel of interest by using the class block. Further, the classification section 22 uses the feature amount of the pixel of interest to classify the pixel of interest, and obtains the class of the pixel of interest.

The coefficient acquisition section 23 stores a tap coefficient of each class, and further acquires a tap coefficient of the class of the pixel of interest from the stored tap coefficient. The tap coefficient of each class is obtained through learning described below. The tap coefficient of the class of the pixel of interest is supplied from the classification section 22. The coefficient acquisition section 23 then supplies the tap coefficient of the class of the pixel of interest to the filter arithmetic operation section 24.

Here, the tap coefficient corresponds to a coefficient multiplied by input data in a so-called tap in a digital filter. Here, the input data that is multiplied by the tap coefficient is a prediction tap.

In addition, the disposition (positional relationship between the pixel of interest and the pixels included in the prediction tap) of the pixels included in the prediction tap of the pixel of interest is also referred to as tap structure. If tap coefficients multiplied by the pixels included in the prediction tap are disposed at the positions of the pixels, the tap structure is also paraphrased with the disposition of the tap coefficients. Accordingly, it is assumed that the tap structure means both the disposition of the pixels included in the prediction tap of the pixel of interest, and the disposition of tap coefficients multiplied by the pixels included in the prediction tap in which the tap coefficients are disposed at the positions of the pixels.

The filter arithmetic operation section 24 uses a tap coefficient of the class of the pixel of interest supplied from the coefficient acquisition section 23 to perform a filter arithmetic operation with the first image, and obtains the predicted value of the pixel value of the pixel (corresponding pixel) corresponding to the pixel of interest in the second image.

That is, the filter arithmetic operation section 24 uses the prediction tap of the pixel of interest outputted from the tap selection section 21 and the tap coefficient of the class of the pixel of interest from the coefficient acquisition section 23 to perform a filter arithmetic operation that is a predetermined arithmetic operation, and obtains and outputs the predicted value of the pixel value of the corresponding pixel corresponding to the pixel of interest of the second image.

Figure 3:
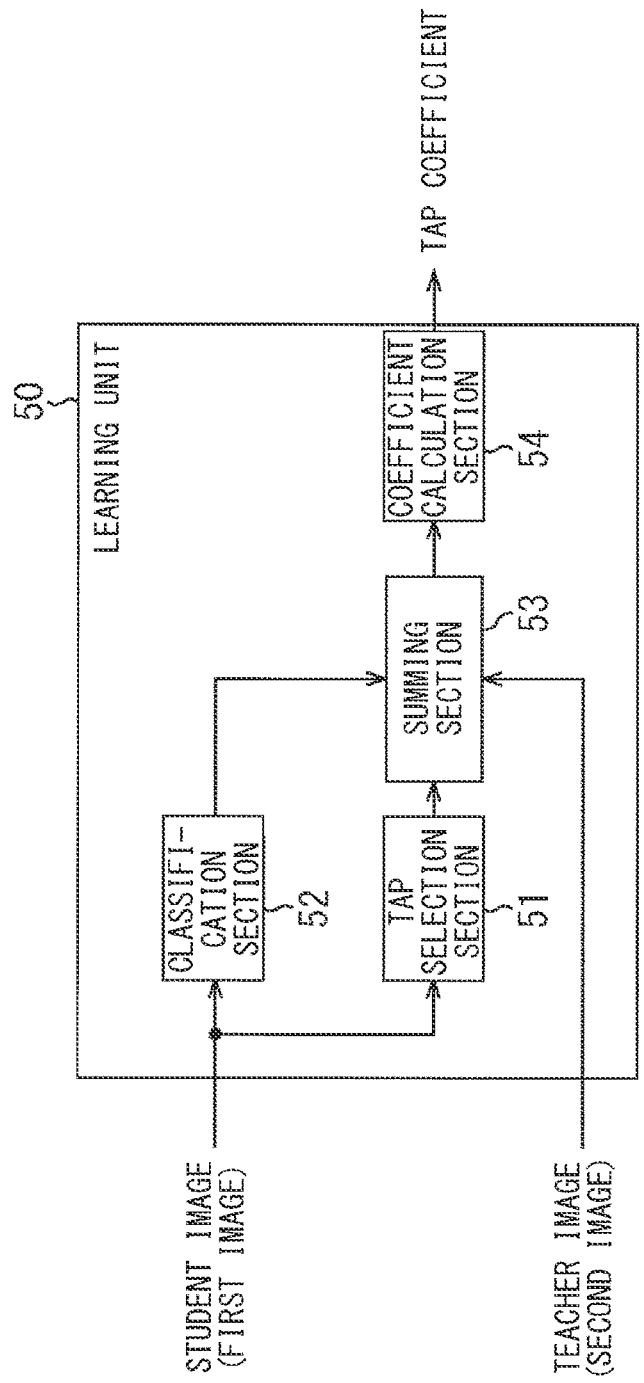
FIG. 3 is a block diagram illustrating a configuration example of a learning unit 50 that learns a tap coefficient stored in a coefficient acquisition section 23.

FIG. 3 is a block diagram illustrating a configuration example of a learning unit 50 that learns a tap coefficient stored in the coefficient acquisition section 23.

Here, it is assumed, for example, that an original image to be encoded is the second image, and predictive coding is performed on the original image. A decoding in-progress image that is obtained by adding the residual of the predictive coding and a predicted image together is the first image, and a prediction tap is selected from the first image. The prediction tap and the tap coefficient are used to obtain (the predicted value of) the pixel value of a pixel of the original image that is the second image through a predetermined filter arithmetic operation.

For example, if a product-sum operation is adopted as the predetermined filter arithmetic operation, a pixel value y of the corresponding pixel of the second image (original image) corresponding to the pixel of interest of the first image is obtained in accordance with the following linear primary expression.

[Expression 1]

$$y = \sum_{n=1}^{N} w_n x_n \qquad (1)$$

However, in Expression (1), $x_n$ represents the pixel value of the n-th pixel (that is referred to as first pixel as appropriate) included in the prediction tap of the pixel of interest in the first image, and $w_n$ represents the n-th tap coefficient multiplied by (the pixel value of) the n-th first pixel included in the prediction tap. It is to be noted that, in Expression (1), the prediction tap includes (the pixel values of) N first pixels $x_1, x_2 \ldots x_N$.

Here, it is also possible to obtain the pixel value y of the corresponding pixel in accordance with not the linear primary expression of Expression (1), but a second or higher order expression.

If it is now assumed that a true value of the pixel value of the corresponding pixel of the k-th sample is represented as $y_k$, and the predicted value of the true value $y_k$ obtained from Expression (1), is represented as $y_k'$, a prediction error $e_k$ thereof is expressed as the following expression.

[Expression 2]

$$e_k = y_k - y_k' \qquad (2)$$

The predicted value $y_k'$ in Expression (2) is now obtained in accordance with Expression (1). Accordingly, if $y_k'$ in Expression (2) is replaced in accordance with Expression (1), the following expression is obtained.

[Expression 3]

$$e_k = y_k - \left(\sum_{n=1}^{N} w_n x_{n,k}\right) \quad (3)$$

However, in Expression (3), $x_{n,k}$ represents the n-th first pixel included in the prediction tap (of the pixel of interest) for the corresponding pixel of the k-th sample.

The tap coefficient $w_n$ that makes the prediction error $e_k$ in Expression (3) (or Expression (2)) be 0 is optimal for predicting the corresponding pixel, but it is difficult in general to obtain the tap coefficients $w_n$ like that for all of the corresponding pixels.

Therefore, for example, if the least square method is adopted as the norm indicating that the tap coefficient $w_n$ is optimal, it is possible to obtain the optimal tap coefficient $w_n$ by minimizing a sum total E (statistical error) of square errors expressed as the following expression.

[Expression 4]

$$E = \sum_{k=1}^{K} e_k^2 \quad (4)$$

However, in Expression (4), K represents the number of samples (the number of samples for learning) of a set of the corresponding pixel $y_k$ serving as the corresponding pixel, and first pixels $x_{1,k}, x_{2,k}, \ldots, x_{N,k}$ included in the prediction tap for the corresponding pixel $y_k$.

The minimum value (minima) of the sum total E of square errors in Expression (4) is given by $w_n$ that makes a value be 0 as in Expression (5). The value is obtained by performing partial differentiation on the sum total E with the tap coefficient $w_n$.

[Expression 5]

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (5)$$

$$(n = 1, 2, \ldots, N)$$

Therefore, if Expression (3) described above is subjected to the partial differentiation with the tap coefficient $w_n$, the following expression is obtained.

[Expression 6]

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (6)$$

$$(k = 1, 2, \ldots, K)$$

Expressions (5) and (6) offer the following expression.

[Expression 7]

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

It is possible to express Expression (7) as the normal equation of Expression (8) by substituting Expression (3) into $e_k$ in Expression (7).

[Expression 8]

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

It is possible to solve the normal equation of Expression (8) with respect to the tap coefficient $w_n$ by using, for example, a sweep out method (Gauss-Jordan elimination method) or the like.

The normal equation of Expression (8) is established and solved for each class, and it is thus possible to obtain the optimal tap coefficient (here, a tap coefficient for minimizing the sum total E of square errors) $w_n$ for each class.

FIG. 3 is a block diagram illustrating a configuration example of the learning unit 50 that performs learning for obtaining tap coefficient $w_n$ by establishing and solving the normal equation of Expression (8).

The learning unit 50 uses a teacher image serving as a teacher (true value) for learning the tap coefficient $w_n$ and a student image serving as a student (input of the filter arithmetic operation) for learning the tap coefficient $w_n$ to perform tap coefficient learning that is learning for obtaining the tap coefficient $w_n$.

The teacher image serving as a teacher (true value) for learning the tap coefficient $w_n$ is an image whose predicted value is obtained through the filter arithmetic operation of Expression (1). As the teacher image, the second image (or image (image having a feature amount similar to that of the second image) corresponding to the second image) is used. In addition, the student image serving as a student for learning the tap coefficient $w_n$ is an image to be subjected to the filter arithmetic operation with the tap coefficient $w_n$ in Expression (1). As the student image, the first image (or image (image having a feature amount similar to that of the first image) corresponding to the first image) is used.

In the tap coefficient learning, the pixels included in the student image are sequentially set as pixels of interest, and pixels having the same tap structure as that of the pixels selected by the tap selection section 21 of FIG. 2 are selected as a prediction tap from the student image for the pixels of interest. Further, in the tap coefficient learning, the normal equation of Expression (8) is established and solved for each class by using the corresponding pixels included in the teacher image and the prediction tap of the pixels of interest. This causes the tap coefficients $w_n$ of each class to be obtained. The corresponding pixels included in the teacher image correspond to the pixels of interest.

In FIG. 3, the learning unit 50 includes a tap selection section 51, a classification section 52, a summing section 53, and a coefficient calculation section 54.

The learning unit 50 is supplied with the first image serving as a student image and the second image serving as a teacher image.

The student image is supplied to the tap selection section 51 and the classification section 52, and the teacher image is supplied to the summing section 53.

The tap selection section 51 sequentially selects the pixels included in the student image as pixels of interest, and supplies information indicating the pixels of interest to a necessary block.

Further, for the pixels of interest, the tap selection section 51 selects, as a prediction tap, the same pixels as the pixels selected by the tap selection section 21 of FIG. 2 from the pixels included in the student image. This offers the prediction tap having the same tap structure as the tap structure obtained by the tap selection section 21, and the summing section 53 is supplied therewith.

The classification section 52 uses the student image to perform the same classification as that of the classification section 22 in FIG. 2 for the pixel of interest, and outputs the resultant class of the pixel of interest to the summing section 53.

That is, the classification section 52 sets a peripheral region of the pixel of interest as a class block used to classify the pixel of interest, and uses a pixel in (inside) the class block to classify the pixel of interest similarly to the classification section 22 of FIG. 2.

For example, the classification section 52 obtains the feature amount of the pixel of interest by using the class block. Further, the classification section 22 uses the feature amount of the pixel of interest to classify the pixel of interest, and obtains the class of the pixel of interest.

The summing section 53 acquires (the pixel value of) the corresponding pixel corresponding to the pixel of interest from the pixels included in the teacher image, and performs summing for each class supplied from the classification section 52. The summing targets the corresponding pixel, and (the pixel value of) a pixel of the student image that is included in the prediction tap of the pixel of interest. The student image is supplied from the tap selection section 51.

That is, the summing section 53 is supplied with the corresponding pixel $y_k$ of the teacher image, a prediction tap $x_{n,k}$ of the pixel of interest serving as the student image, and the class of the pixel of interest.

The summing section 53 uses the prediction tap (student data) $x_{n,k}$ to perform the multiplication ($x_{n,k} x_{n',k}$) of (the pixel values of) the pixels serving a prediction tap on the matrix on the left side of Expression (8), and an arithmetic operation corresponding to the summation (E) for each of the classes of the pixels of interest.

Further, the summing section 53 also uses the prediction tap (student image) $x_{n,k}$ and the corresponding pixel $y_k$ for each class of the pixel of interest to perform arithmetic operations corresponding to the multiplication ($\Sigma x_{n,k} y_k$) and summation ($\Sigma$) of the pixel $x_{n,k}$ and (the pixel value of) the corresponding pixel $y_k$ serving as the prediction tap in the vector on the right side of Expression (8).

That is, the summing section 53 stores a component ($\Sigma x_{n,k} x_{n',k}$) of the matrix on the left side of Expression (8) that has been obtained for the corresponding pixel $y_k$ of the teacher image last time, and a component ($\Sigma x_{n,k} y_k$) of the vector on the right side in a built-in memory (not illustrated) thereof. With respect to the component ($\Sigma x_{n,k} x_{n',k}$) of the matrix or the component ($\Sigma x_{n,k} y_k$) of the vector, the summing section 53 sums (performs addition expressed by the summation of Expression (8)), for a pixel $y_{k+1}$ of the teacher image, a corresponding component $x_{n,k+1} x_{n',k+1}$ or $x_{n,k+1} y_{k+1}$ calculated by using the pixel $y_{k+1}$ and a pixel $x_{n,k+1}$ serving as the prediction tap. The corresponding pixel $y_k$ corresponds to the pixel of interest. The pixel $y_{k+1}$ is the corresponding pixel corresponding to a new pixel of interest.

Then, the summing section 53, for example, performs the summation described above by using all of the pixels of the student image as pixels of interest, thereby establishing the normal equation of Expression (8) for each class. The summing section 53 supplies the normal equation to the coefficient calculation section 54.

The coefficient calculation section 54 solves the normal equation for each class supplied from the summing section 53, thereby obtaining the optimal tap coefficient $w_n$ for each class, and outputting the optimal tap coefficient $w_n$.

The tap coefficient $w_n$ of each class obtained as described above is stored in the coefficient acquisition section 23 of the ALF processing unit 20 of FIG. 2.

<Configuration Example of Image Encoding Device 100>

Figure 4:
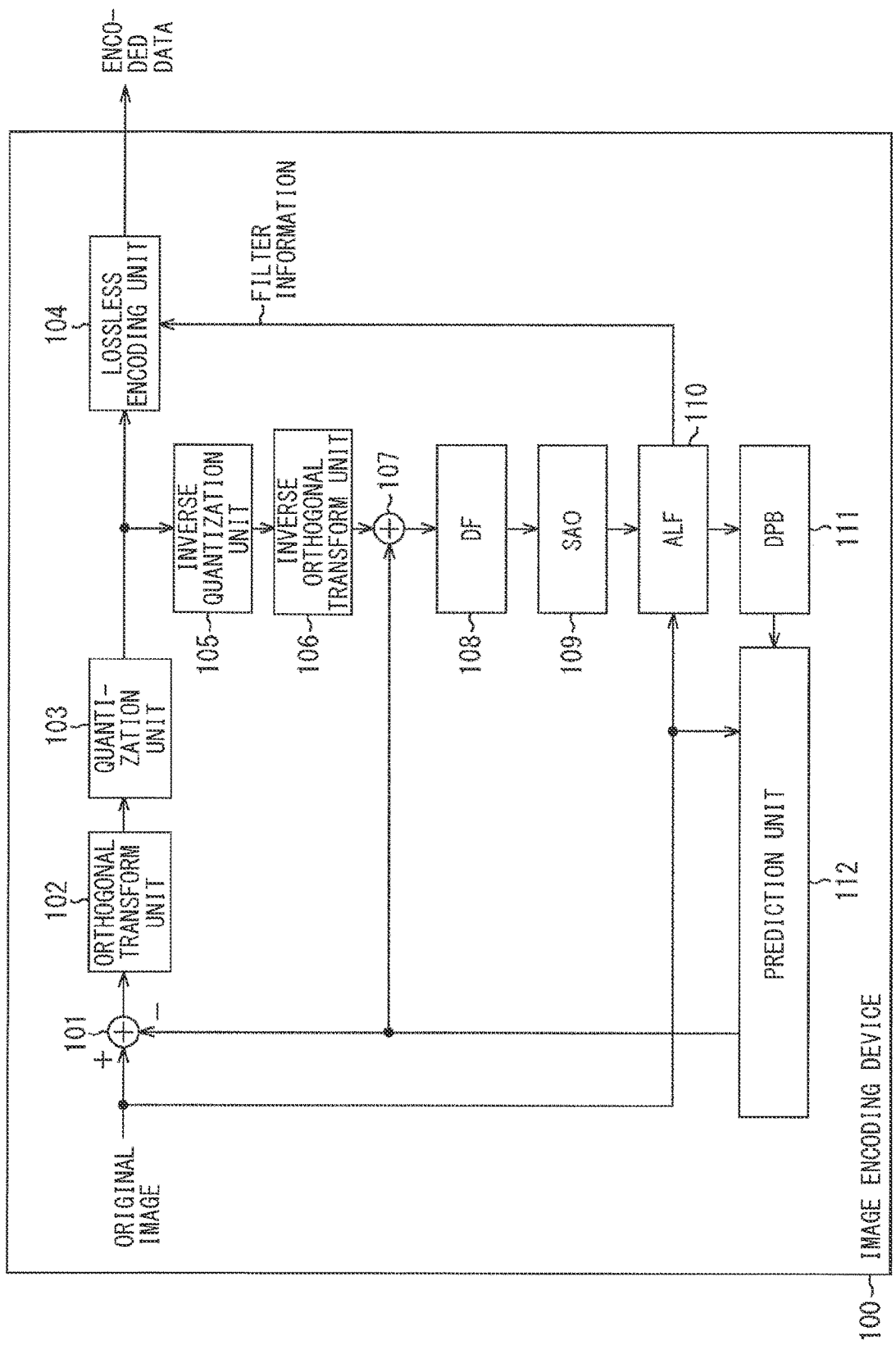
FIG. 4 is a block diagram illustrating a configuration example of an image encoding device 100.

FIG. 4 is a block diagram illustrating a configuration example of the image encoding device 100 of FIG. 1.

In FIG. 4, the image encoding device 100 includes an arithmetic operation unit 101, an orthogonal transform unit 102, a quantization unit 103, a lossless encoding unit 104, an inverse quantization unit 105, an inverse orthogonal transform unit 106, an arithmetic operation unit 107, DF 108, SAO 109, ALF 110, DPB (Decoded Picture Buffer) 111, and a prediction unit 112.

An original image to be subjected to predictive coding is supplied to the image encoding device 100. The original image is supplied to the arithmetic operation unit 101, the ALF 110, and the prediction unit 112.

The arithmetic operation unit 101 subtracts a predicted image from the original image, and supplies a residual (prediction residual) obtained from the subtraction to the orthogonal transform unit 102. The predicted image is supplied from the prediction unit 112.

The orthogonal transform unit 102 performs orthogonal transformation such as discrete cosine transformation or Karhunen-Loeve transformation on the residual supplied from the arithmetic operation unit 101. It is to be noted that this orthogonal transformation is performed in any method. The orthogonal transform unit 102 supplies a transformation coefficient obtained from the orthogonal transformation to the quantization unit 103.

The quantization unit 103 quantizes the transformation coefficient supplied from the orthogonal transform unit 102. It is to be noted that this quantization is performed in any method. The quantization unit 103 supplies the quantized transformation coefficient to the lossless encoding unit 104.

The lossless encoding unit 104 encodes (entropy coding) the transformation coefficient quantized by quantization unit 103 with a predetermined lossless encoding system, and generates encoded data.

In addition, the lossless encoding unit 104 acquires filter information regarding an ALF process from the ALF 110. The ALF process is performed by the ALF 110. The filter information includes a tap coefficient of each class and a classification parameter used for classification. The classification parameter is described below.

Further, the lossless encoding unit 104 acquires necessary encoding information in encoding information regarding the predictive encoding of the image encoding device 100 from each block. Examples of the encoding information include a prediction mode such as intra prediction or inter prediction, information regarding motion such as a motion vector, a quantization parameter QP, information of a picture type (I, P. or B), or the like.

The lossless encoding unit 104 encodes the encoding information and the filter information with a predetermined lossless encoding system, and multiplexes the encoding information and the filter information on a portion of header information of the encoded data. This causes the lossless encoding unit 104 to function as an encoding unit that encodes (a tap coefficient or a classification parameter included in) the filter information.

The lossless encoding unit 104 transmits the encoded data obtained as described above. Therefore, the lossless encoding unit 104 also functions as a transmission unit that transmits the encoded data, and the filter information included in the encoded data.

For example, it is possible to adopt variable length coding, arithmetic coding, or the like as a lossless encoding system of the lossless encoding unit 104. Examples of the variable length coding include CAVLC (Context-Adaptive Variable Length Coding) determined by an H.264/AVC system, and the like. Examples of the arithmetic coding include CABAC (Context-Adaptive Binary Arithmetic Coding) and the like.

The transformation coefficient quantized by the quantization unit 103 is supplied to the lossless encoding unit 104, and is also supplied to the inverse quantization unit 105. The inverse quantization unit 105 inversely quantizes the quantized transformation coefficient in a method corresponding to the quantization of the quantization unit 103. This inverse quantization may be performed in any method as long as the method corresponds to the quantization process performed by of the quantization unit 103. The inverse quantization unit 105 supplies the transformation coefficient obtained from the inverse quantization to the inverse orthogonal transform unit 106.

The inverse orthogonal transform unit 106 performs inverse orthogonal transformation on the transformation coefficient supplied from the inverse quantization unit 105 in a method corresponding to the orthogonal transformation process by the orthogonal transform unit 102. This inverse orthogonal transformation may be performed in any method as long as the method corresponds to the orthogonal transformation process by the orthogonal transform unit 102. The inverse orthogonal transformation of a transformation coefficient by the inverse orthogonal transform unit 106 offers a residual, and the residual is supplied to the arithmetic operation unit 107.

The arithmetic operation unit 107 adds the predicted image supplied from the prediction unit 112 to the residual supplied from the inverse orthogonal transform unit 106, and outputs a result of the addition to a decoding in-progress image that is in the middle of decoding. The residual is a result of the inverse orthogonal transformation.

The decoding in-progress image that is outputted from the arithmetic operation unit 107 is supplied to the DF 108.

The DF 108 performs a filter process of DF on the decoding in-progress image from the arithmetic operation unit 107, and supplies the SAO 109 with the decoding in-progress image that has been subjected to the filter process.

The SAO 109 performs a filter process of SAO on the decoding in-progress image from the DF 108, and supplies the ALF 110 with the decoding in-progress image that has been subjected to the filter process.

The ALF 110 performs a filter process of ALF, that is, an ALF process on the decoding in-progress image from the SAO 109, and supplies the DPB 111 with a filtered image obtained in the ALF process.

That is, the ALF 110 uses the decoding in-progress image from the SAO 109 as a student image and also the original image as a teacher image to perform tap coefficient learning, and obtains a tap coefficient of each class. The tap coefficient of each class is supplied from the ALF 110 to the lossless encoding unit 104 as the filter information.

Further, the ALF 110 uses the decoding in-progress image from the SAO 109 as the first image to perform an ALF process using a tap coefficient of each class, thereby converting the decoding in-progress image serving as the first image into the predicted value of the original image (second image), that is, a filtered image serving as an image (ideally, image that is the same as the original image) close to the original image (generating a filtered image) for output.

The filtered image outputted from the ALF 110 is supplied to the DPB 111.

The DPB 111 temporarily stores the filtered image supplied from the ALF 110 as a decoded image that is locally decoded. The decoded image stored in the DPB 111 is read out at necessary timing, and supplied to the prediction unit 112 as a reference image used to generate the predicted image.

The prediction unit 112 uses the original image and the reference image supplied from the DPB 111 to perform intra prediction (intra-screen prediction) and inter prediction, for example, by using PU (Prediction Unit) as a processing unit, and generates a predicted image of the original image.

On the basis of a predetermined cost function (e.g., RD (Rate-Distortion) cost), the prediction unit 112 selects the optimal prediction mode from the prediction modes of the intra prediction and inter prediction in which the predicted image is generated. The prediction unit 112 supplies the arithmetic operation units 101 and 107 with the predicted image generated in the optimal prediction mode.

It is to be noted that FIG. 4 provides the image encoding device 100 with the DF 108 and the SAO 109 in accordance with HEVC, but the image encoding device 100 is able to dispense with one or both of the DF 108 and the SAO 109.

In a case where the image encoding device 100 dispenses with the DF 108, the decoding in-progress image outputted from the arithmetic operation unit 107 is subjected to a filter process of SAO by the SAO 109, and then supplied to the ALF 110. In addition, in a case where the image encoding device 100 dispenses with the SAO 109, the decoding in-progress image outputted from the arithmetic operation unit 107 is subjected to a filter process of DF by the DF 108, and then supplied to the ALF 110. Further, in a case where the image encoding device 100 dispenses with the DF 108 and the SAO 109, the decoding in-progress image outputted from the arithmetic operation unit 107 is supplied to the ALF 110.

In addition, it is possible to provide the preceding or following stage of the ALF 110 with a filter other than the DF 108 and the SAO 109.

Further, the image encoding device 100 is able to encode all the pictures of the original image as I pictures. In this case, the prediction unit 112 does not perform inter prediction, but performs only intra prediction.

<Configuration Example of ALF 110>

Figure 5:
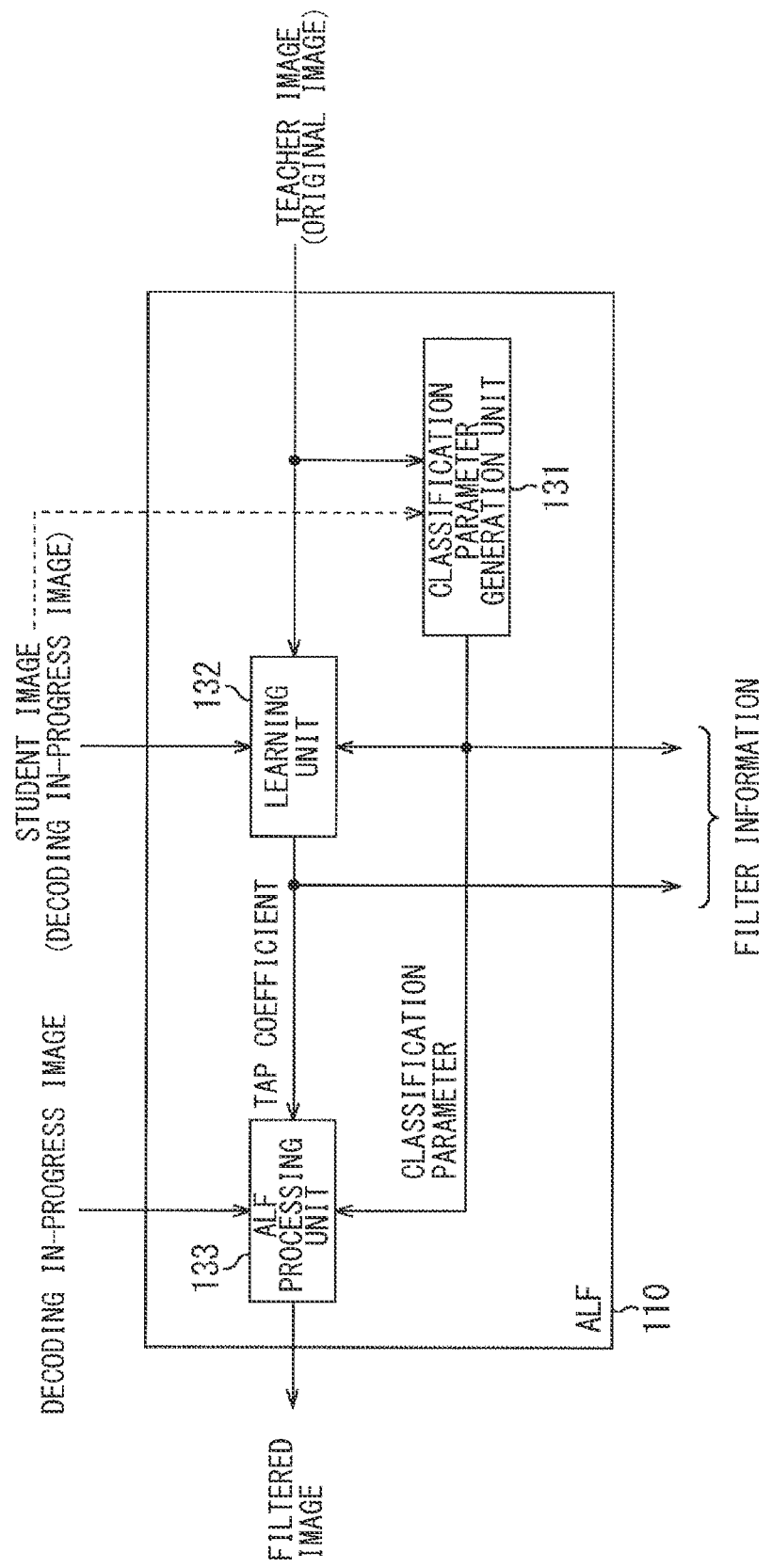
FIG. 5 is a block diagram illustrating a configuration example of ALF 110.

FIG. 5 is a block diagram illustrating a configuration example of the ALF 110 of FIG. 4.

In FIG. 5, the ALF 110 includes a classification parameter generation unit 131, a learning unit 132, and an ALF processing unit 133.

The classification parameter generation unit 131 is supplied with an original image serving as a teacher image. The classification parameter generation unit 131 uses the original image serving as a teacher image to generate and output a classification parameter. The classification parameter is used for classification performed by the learning unit 132 or the ALF processing unit 133. The classification parameter outputted from the classification parameter generation unit 131 is supplied to the learning unit 132 and the ALF processing unit 133. Further, the classification parameter outputted from the classification parameter generation unit 131 is included in the filter information along with the tap coefficient outputted from the learning unit 132, and supplied to the lossless encoding unit 104 (FIG. 4).

It is to be noted here that the classification parameter generation unit 131 uses the original image serving as a teacher image to generate a classification parameter, but it is possible to generate a classification parameter by using a decoding in-progress image serving as a student image instead of the original image as indicated by the dotted line in the diagram.

The learning unit 132 is supplied with not only the classification parameter, but also the original image from the classification parameter generation unit 131. The learning unit 132 is supplied with the decoding in-progress image from the SAO 109 (FIG. 4).

The learning unit 132 uses the decoding in-progress image as a student image, and uses the original image as a teacher image to perform tap coefficient learning, and outputs a tap coefficient of each class that obtained through the tap coefficient learning. The tap coefficient outputted from the learning unit 132 is included in the filter information as described above, and supplied to not only the lossless encoding unit 104, but also the ALF processing unit 133.

Here, the learning unit 132 performs classification in tap coefficient learning by using the classification parameter supplied from the classification parameter generation unit 131.

The ALF processing unit 133 is supplied with the classification parameter from the classification parameter generation unit 131, and supplied with the tap coefficient of each class from the learning unit 132. In addition, the ALF processing unit 133 is supplied with the decoding in-progress image from the SAO 109 (FIG. 4).

The ALF processing unit 133 uses, for example, the decoding in-progress image as the first image to perform an ALF process on the first image, thereby transforming the decoding in-progress image serving as the first image into a filtered image (generating a filtered image) and supplying the DPB 111 (FIG. 4) therewith. The ALF process uses the tap coefficient of each class from the learning unit 132. The filtered image serves as the predicted value of the second image that is the original image.

The ALF processing unit 133 performs classification in the ALF process by using the classification parameter supplied from the classification parameter generation unit 131 similarly to the learning unit 132.

It is to be noted that the learning unit 132 performs tap coefficient learning in the ALF 110 as appropriate, updating the tap coefficient of each class. The updated tap coefficient of each class is then supplied to the ALF processing unit 133, and included in the filter information. The tap coefficient of each class is transmitted from the image encoding device 100 to the image decoding device 200.

As an update unit for updating the tap coefficient any sequence, for example, a plurality of pictures (frames), one picture, CU, other blocks, or the like is adopted. It is possible to update the tap coefficient at timing with the update unit as a minimum unit.

<Configuration Example of Learning Unit 132>

Figure 6:
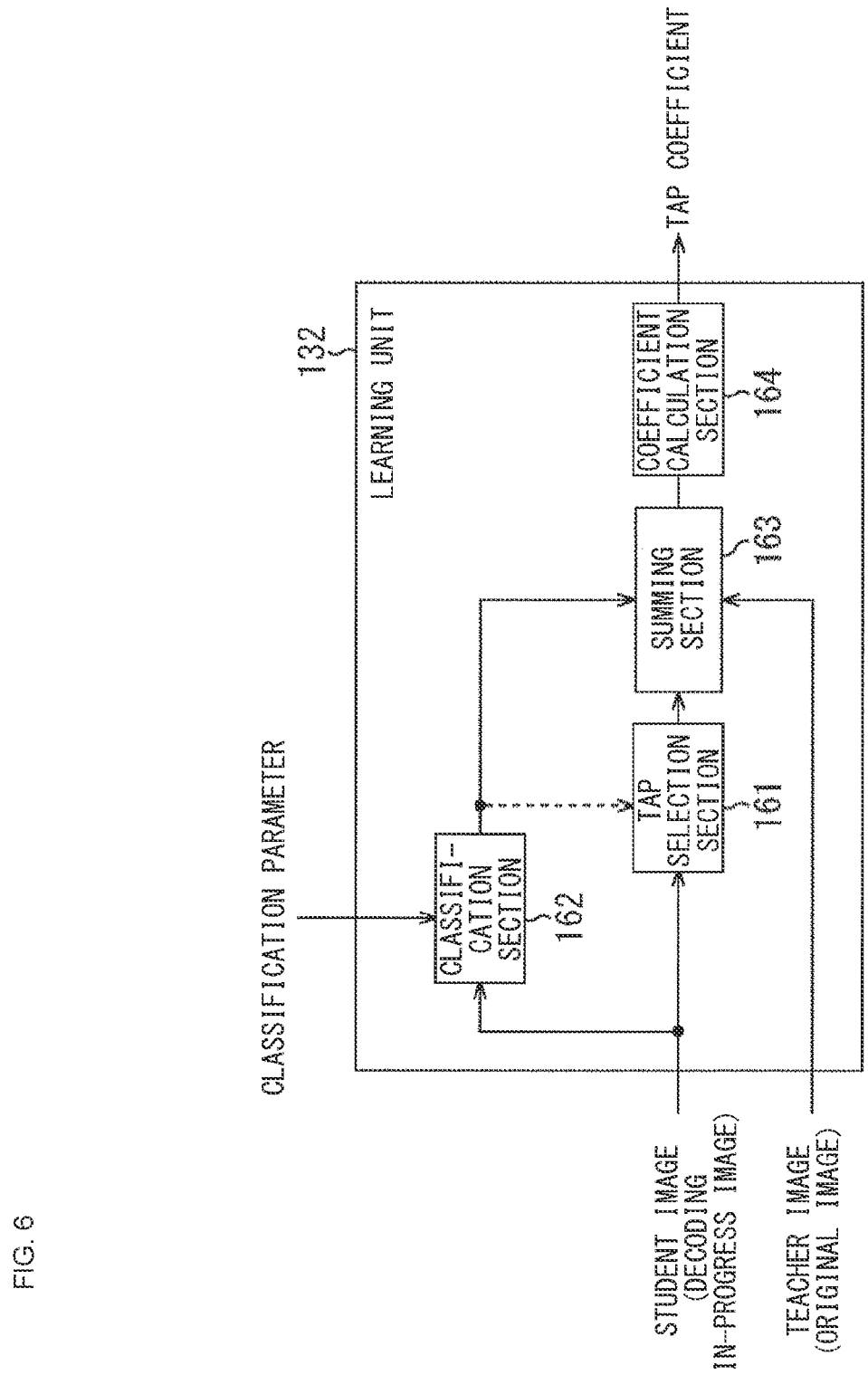
FIG. 6 is a block diagram illustrating a configuration example of a learning unit 132.

FIG. 6 is a block diagram illustrating a configuration example of the learning unit 132 of FIG. 5.

The learning unit 132 includes a tap selection section 161, a classification section 162, a summing section 163, and a coefficient calculation section 164.

The tap selection section 161 to the coefficient calculation section 164 respectively perform processes similar to those of the tap selection section 51 to the coefficient calculation section 54 included in the learning unit 50 of FIG. 3.

Similarly to the classification section 52 of FIG. 3, the classification section 162, however, uses the pixels in the class block to obtain the feature amount of the pixel of interest. The classification section 162 uses the feature amount to classify the pixel of interest, but obtains a feature amount that contributes to the improvement in the coding efficiency of encoding the original image in obtaining the feature amount of the pixel of interest. The pixels in the class block are a peripheral region of the pixel of interest.

That is, the classification section 162 obtains, for example, the mean or variance of the pixel values (e.g., luminance) of the pixels in the class block of the pixel of interest, the inclination feature amount indicating the tangent direction of the contour line of the pixel values of the pixel of interest, the reliability of the inclination feature amount, the TV (Total variation) norm, the maximum differential absolute value, or the like as the feature amount of the pixel of interest. Here, the details of the inclination feature amount, the reliability of the inclination feature amount, the TV norm, and the maximum differential absolute value are described below.

The classification section 162 then uses the classification parameter from the classification parameter generation unit 131, and uses the feature amount of the pixel of interest (in accordance with the feature amount) to classify the pixel of interest. The classification section 162 supplies the resultant class of the pixel of interest to the summing section 163.

In classification of the classification section 162, for example, whether or not the feature amount of the pixel of interest satisfies a predetermined expression defined by a classification parameter or an expression, for example, having a classification parameter as a threshold causes the pixel of interest to be classified into the class corresponding to the satisfaction of the predetermined expression or class corresponding to the dissatisfaction of the predetermined expression.

In addition, in classification of the classification section 162, for example, the feature amount of the pixel of interest is inputted to a linear classifier defined by a classification parameter. The pixel of interest is classified into the class corresponding to the output of the linear classifier in accordance with the output of the linear classifier.

It is to be noted that it is possible to supply not only the summing section 163, but also the tap selection section 161 with the class of the pixel of interest acquired by the classification section 162. In this case, the tap selection section 161 is able to change the tap structure of the prediction tap in accordance with the class of the pixel of interest from the classification section 162.

That is, as the tap structure of the prediction tap, it is possible to adopt tap structures that are different in accordance with the class of the pixel of interest. For example, it is possible to adopt a cross-shaped tap structure for a certain class. The cross-shaped tap structure includes nine pixels in total: the pixel of interest; two adjacent pixels above the pixel of interest; two adjacent pixels below the pixel of interest; two adjacent pixels on the left of the pixel of interest; and two adjacent pixels on the right of the pixel of interest. It is possible to adopt a square-shaped tap structure for another class. The square-shaped tap structure includes nine pixels in total: 3×3 pixels for width×height around the pixel of interest.

It is to be noted that the above-described cross-shaped tap structure of nine pixels and the above-described square-shaped tap structure of nine pixels include the same number of pixels in the prediction tap (the same applies to the number of tap coefficients multiplied by the prediction tap), but different tap structures include tap structures that are different in the number of pixels included in the prediction taps.

In a case where the tap structure of the prediction tap is changed in accordance with the class, that is, in a case where each class has a different tap structure for the prediction tap, the tap structure of the tap coefficient used for a filter arithmetic operation with (the pixel value of) a pixel serving as the prediction tap is also different in accordance with the class.

Here, the classification section 162 is able to perform classification by using not only the feature amount of the pixel of interest, but also encoding information regarding the predictive coding of the pixel of interest. That is, for example, the classification section 162 is able to perform classification by using not only the feature amount of the pixel of interest, but also the QP (quantization parameter), CBF (Coded Block Flag), or the like of the pixel of interest.

In addition, the learning unit 132 performs tap coefficient learning, for example, by using the decoding in-progress image and the original image each serving as an update unit as a student image and a teacher image.

<Classification>

Figure 7:
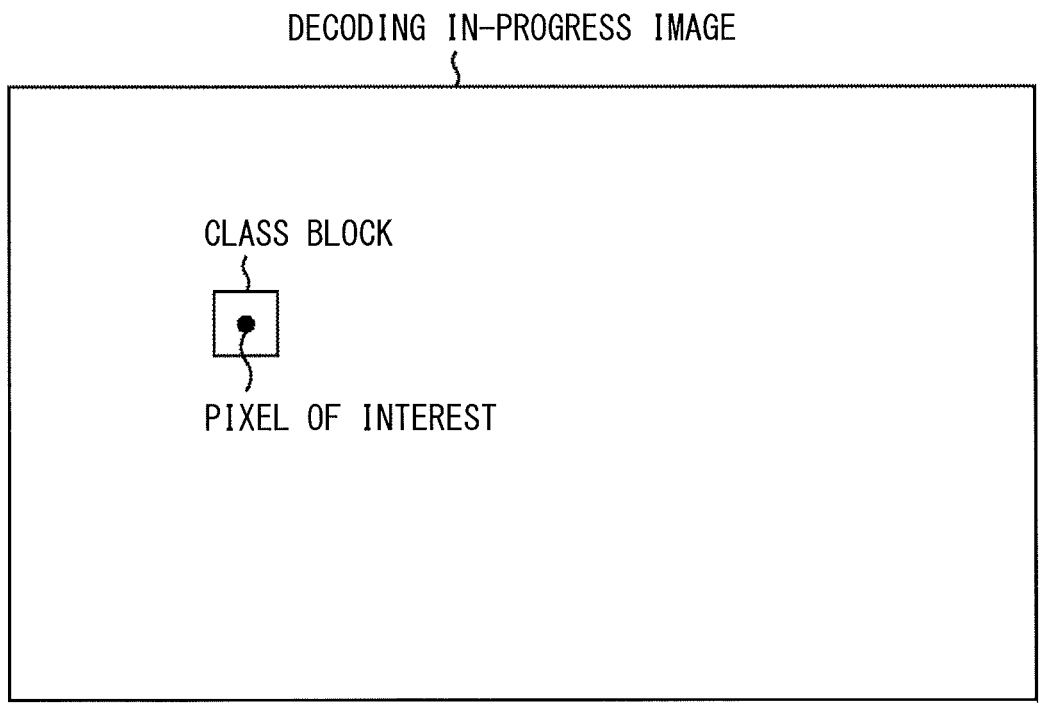
FIG. 7 is a diagram describing a class block used to obtain a feature amount of a pixel of interest that is used for classification performed in a classification section 162.

FIG. 7 is a diagram describing a class block used to obtain the feature amount of a pixel of interest that is used for classification performed in the classification section 162 (or the ALF 110) of FIG. 6.

It is possible to adopt, as the class block of the pixel of interest, a block (local region) including pixels around the pixel of interest in the decoding in-progress image. The pixels around the pixel of interest include the pixel of interest.

In addition, it is possible to adopt a predetermined block such as CU or PU including the pixel of interest as the class block of the pixel of interest. In this case, the same class block is adopted for the pixels included in the predetermined block such as CU or PU, resulting in the same class as well.

Figure 8:
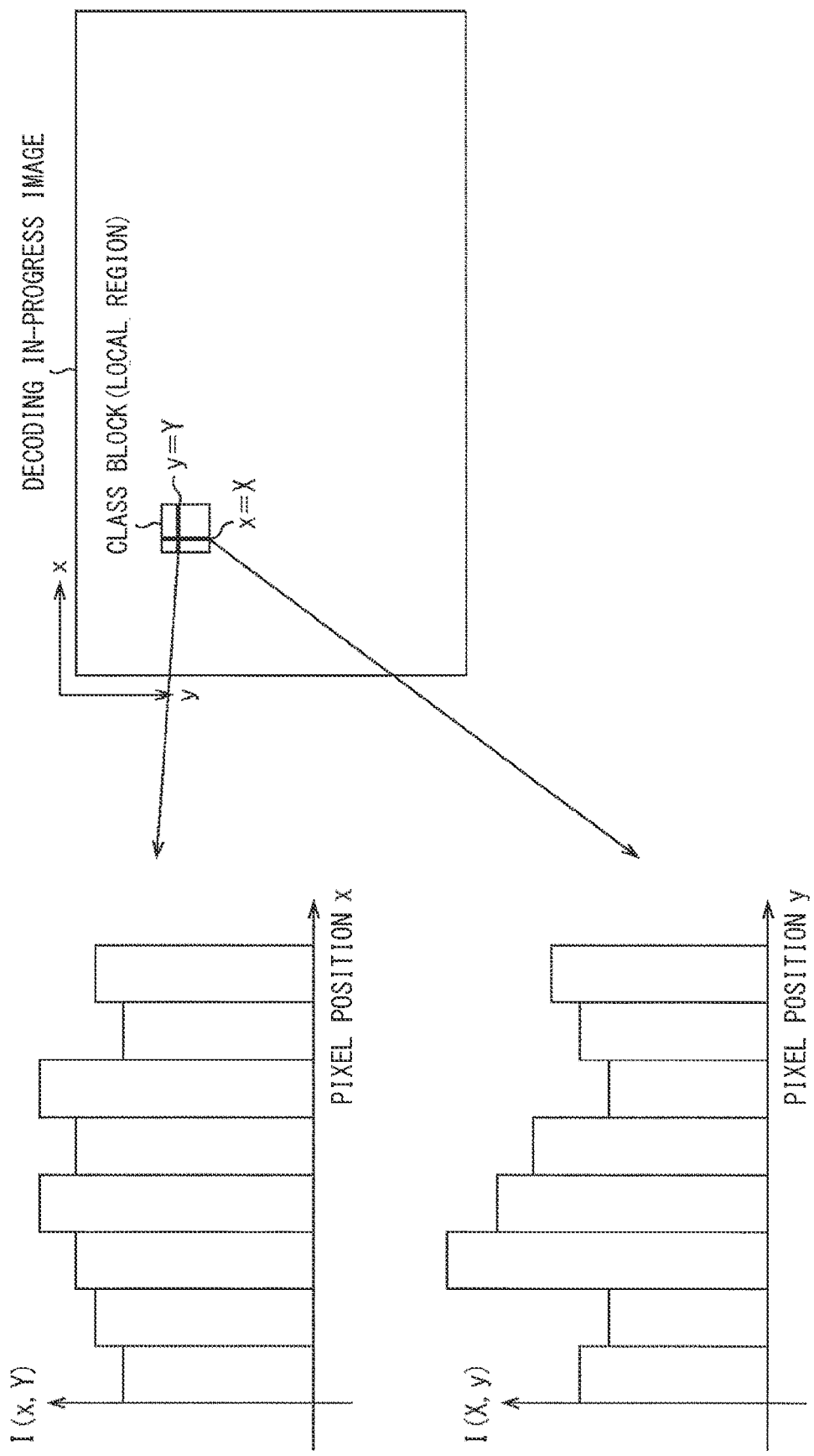
FIG. 8 is a diagram illustrating an example of a pixel value of a pixel included in the class block.

FIG. 8 is a diagram illustrating an example of the pixel value of a pixel included in the class block.

It is to be noted that the following refers to the direction from the left to right of an image such as the decoding in-progress image as x direction (x axis), and refers to the direction from the top to bottom as y direction (y axis) unless otherwise stated.

It is now assumed that I(x, y) represents the pixel value of the pixel at the position of coordinates (x, y). If so, in FIG. 8, I(x, Y) represents the pixel value of a pixel in the row of y=Y inside a class block, and I(X, y) represents the pixel value of a pixel in the column of x=X inside a class block.

The classification section 162 uses the pixels in the class block of the pixel of interest to obtain, as the feature amount of the pixel of interest, the mean or variance of the pixel values of the pixels in the class block, the inclination feature amount indicating the tangent direction of the contour line of the pixel values of the pixel of interest, the reliability of the inclination feature amount, the TV norm, the maximum differential absolute value, or the like, for example.

Figure 9:
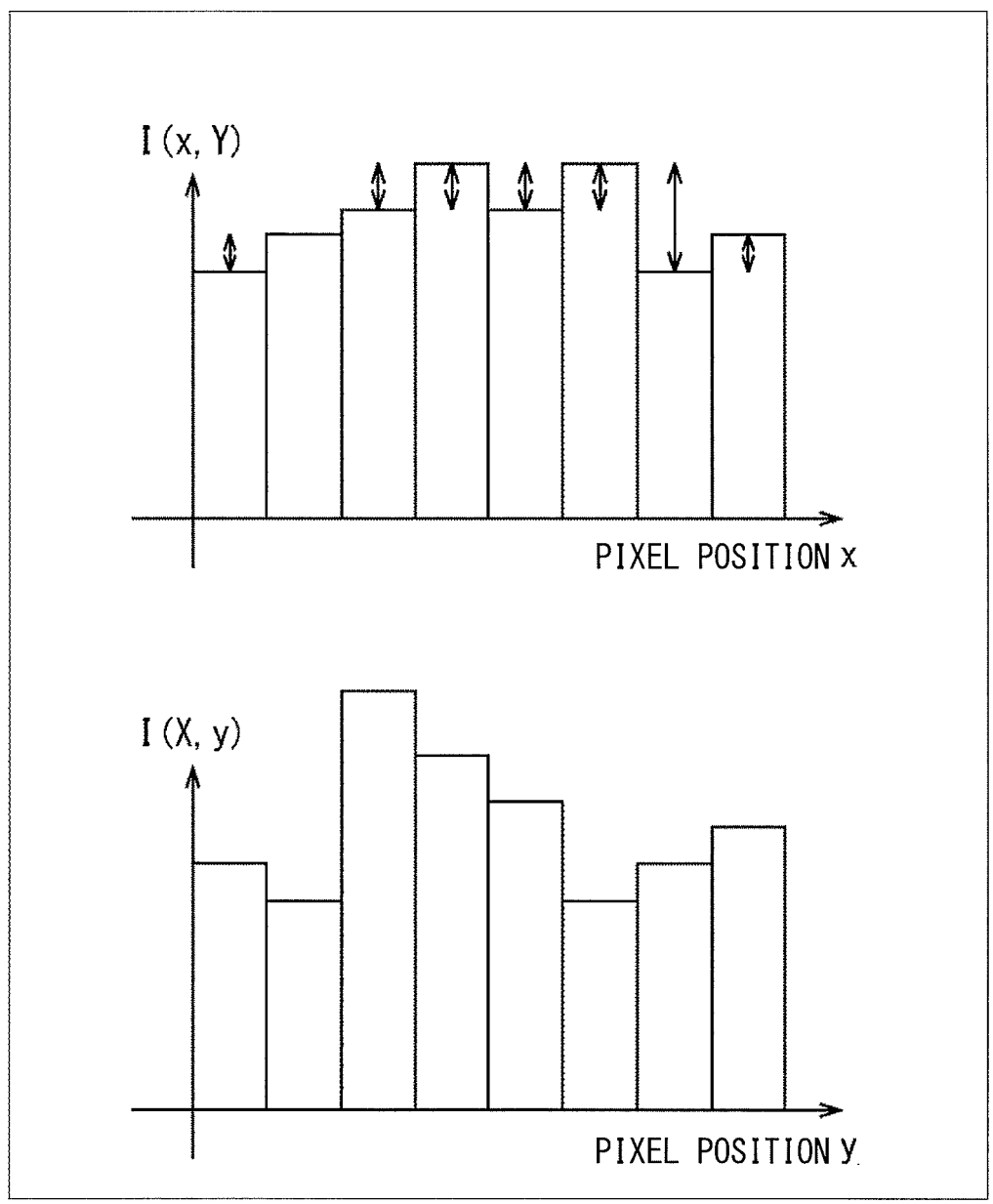
FIG. 9 is a diagram describing an example of a method of calculating a TV norm serving as the feature amount of the pixel of interest.

FIG. 9 is a diagram describing an example of a method of calculating the TV norm serving as the feature amount of the pixel of interest.

That is, FIG. 9 illustrates an example of the pixel values of pixels included in a class block similarly to FIG. 8.

The classification section 162 obtains a sum total TVxy of the absolute values of the differences (portions indicated by the arrows in FIG. 9) between the pixel values of pixels adjacent to each other among the pixels in the class block of the pixel of interest as the TV norm in accordance with Expression (9).

[Expression 9]

$$TV_x = \sum_{x,y \in S} |I_{(x,y)} - I_{(x+1,y)}|$$

$$TV_y = \sum_{x,y \in S} |I_{(x,y)} - I_{(x,y+1)}|$$

$$TV_{xy} = TV_x + TV_y$$

(9)

Here, in Expression (9), TVx represents the sum total of the absolute values of the differences I(x, y)−I(x+1, y) between the pixel values of pixels adjacent to each other in the x direction among the pixels in the class block. TVy represents the sum total of the absolute values of the differences I(x, y)−I(x, y+1) between the pixel values of pixels adjacent to each other in the y direction among the pixels in the class block. In addition, S represents (a region serving as) a class block, and x, y∈S indicates that x, y represents the coordinates of the position of a pixel inside the class block S.

According to Expression (9), the sum of the sum totals TVx and TVy is obtained as a TV norm TVxy.

The TV norm TVxy represents the degree (amount or quantity) of high frequency components in the frequency components of an image around the pixel of interest.

Figure 10:
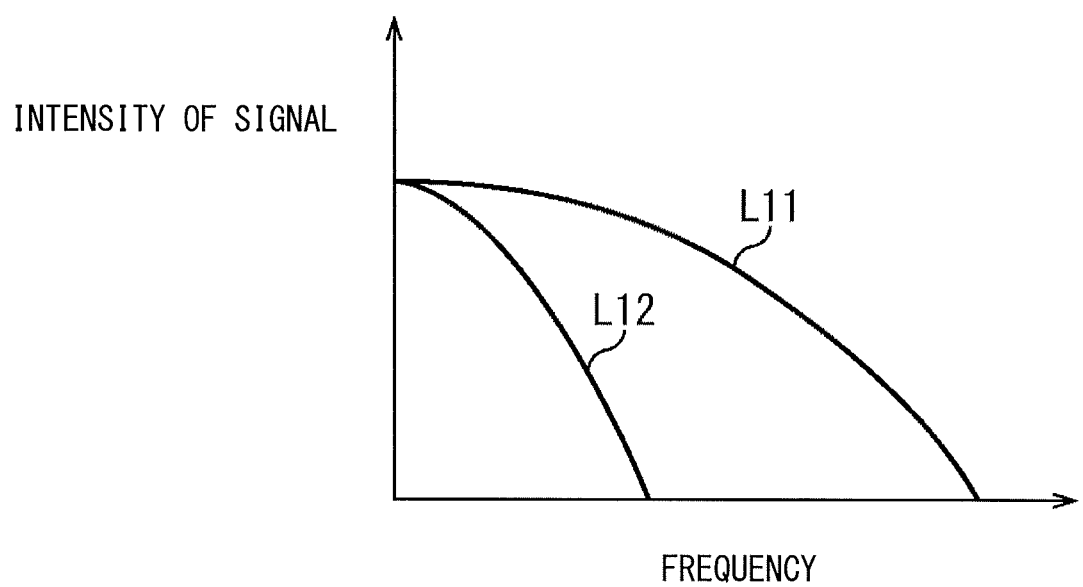
FIG. 10 is a diagram illustrating an example of a frequency characteristic of an image.

FIG. 10 is a diagram illustrating an example of a frequency characteristic of an image.

In FIG. 10, the horizontal axis represents frequency, and the vertical axis represents the intensity of frequency components.

An image has frequency characteristics that the image tends to have a large number of low frequency components and a smaller number of higher frequency components as illustrated in FIG. 10.

In FIG. 10, a graph L11 represents a frequency characteristic of an image having a relatively large number of high frequency components, and a graph L12 represents a frequency characteristic of an image having a relatively small number of high frequency components.

The image having the frequency characteristic represented by the graph L11 with a relatively large number of high frequency components and the image having the frequency characteristic represented by the graph L12 with a relatively small number of high frequency components are expected to have different tap coefficients that are appropriate for an ALF process.

Here, an appropriate tap coefficient means a tap coefficient (tap coefficient for reducing the sum total E of square errors in Expression (4)) that offers an image closer to the original image as a filtered image obtained in the ALF process.

The TV norm TVxy increases in a case where the pixel value of a pixel inside the class block drastically changes. This causes the TV norm TVxy of an image having a large number of high frequency components to tend to increase.

It can be said that the TV norm TVxy represents the high frequency components inside the class block. Thus, according to the TV norm TVxy, it is possible to grasp the degree of the high frequency components around the pixel of interest. Performing classification by using the TV norm TVxy makes it possible to learn a tap coefficient for each class in accordance with the degree of the high frequency components around the pixel of interest, and separate tap coefficients for use in the ALF process.

Figure 11:
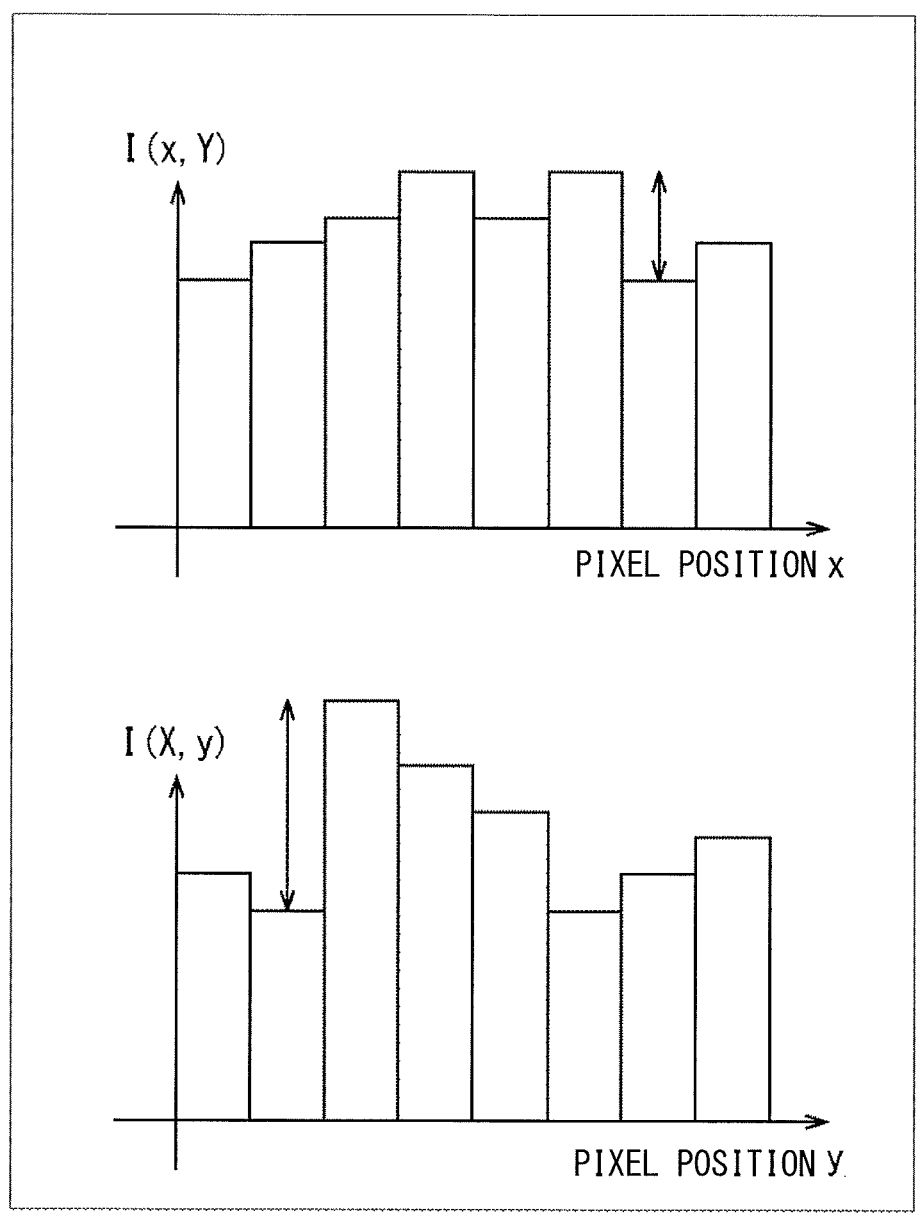
FIG. 11 is a diagram describing an example of a method of calculating a maximum differential absolute value serving as the feature amount of the pixel of interest.

FIG. 11 is a diagram describing an example of a method of calculating a maximum differential absolute value serving as the feature amount of the pixel of interest.

That is, FIG. 11 illustrates an example of the pixel values of pixels included in a class block similarly to FIG. 8.

The classification section 162 obtains the maximum value of the absolute values of the differences (portions indicated by the arrows in FIG. 11) between the pixel values of pixels adjacent to each other among the pixels in the class block of the pixel of interest as the maximum differential absolute value in accordance with Expression (10).

[Expression 10]

$$M_x = \max_{x,y \in S} |I_{(x,y)} - I_{(x+1,y)}|$$
$$M_y = \max_{x,y \in S} |I_{(x,y)} - I_{(x,y+1)}|$$
$$M_{xy} = M_x + M_y$$

(10)

Here, in Expression (10), max(A) represents the maximum value in A. Thus, in Expression (10), Mx represents the maximum value of the absolute values of the differences I(x, y)−I(x+1, y) between the pixel values of pixels adjacent to each other in the x direction among the pixels in the class block. My represents the maximum value of the absolute values of the differences I(x, y)−I(x, y+1) between the pixel values of pixels adjacent to each other in the y direction among the pixels in the class block.

According to Expression (10), the sum of the maximum values Mx and My is obtained as a maximum differential absolute value Mxy.

It is to be noted that it is also possible to adopt, as the maximum differential absolute value Mxy, the larger one of the maximum values Mx and My in addition to the sum of the maximum values Mx and My.

The maximum differential absolute value Mxy increases in a case where the pixel value of a pixel inside the class block drastically changes. This causes the maximum differential absolute value Mxy of an image having a large number of higher frequency components to tend to increase.

It can be said that the maximum differential absolute value Mxy represents the high frequency components inside the class block. Thus, according to the maximum differential absolute value Mxy, it is possible to grasp the degree of the high frequency components around the pixel of interest. Performing classification by using the maximum differential absolute value Mxy makes it possible to learn a tap coefficient for each class in accordance with the degree of the high frequency components around the pixel of interest, and separate tap coefficients for use in the ALF process.

Figure 12:
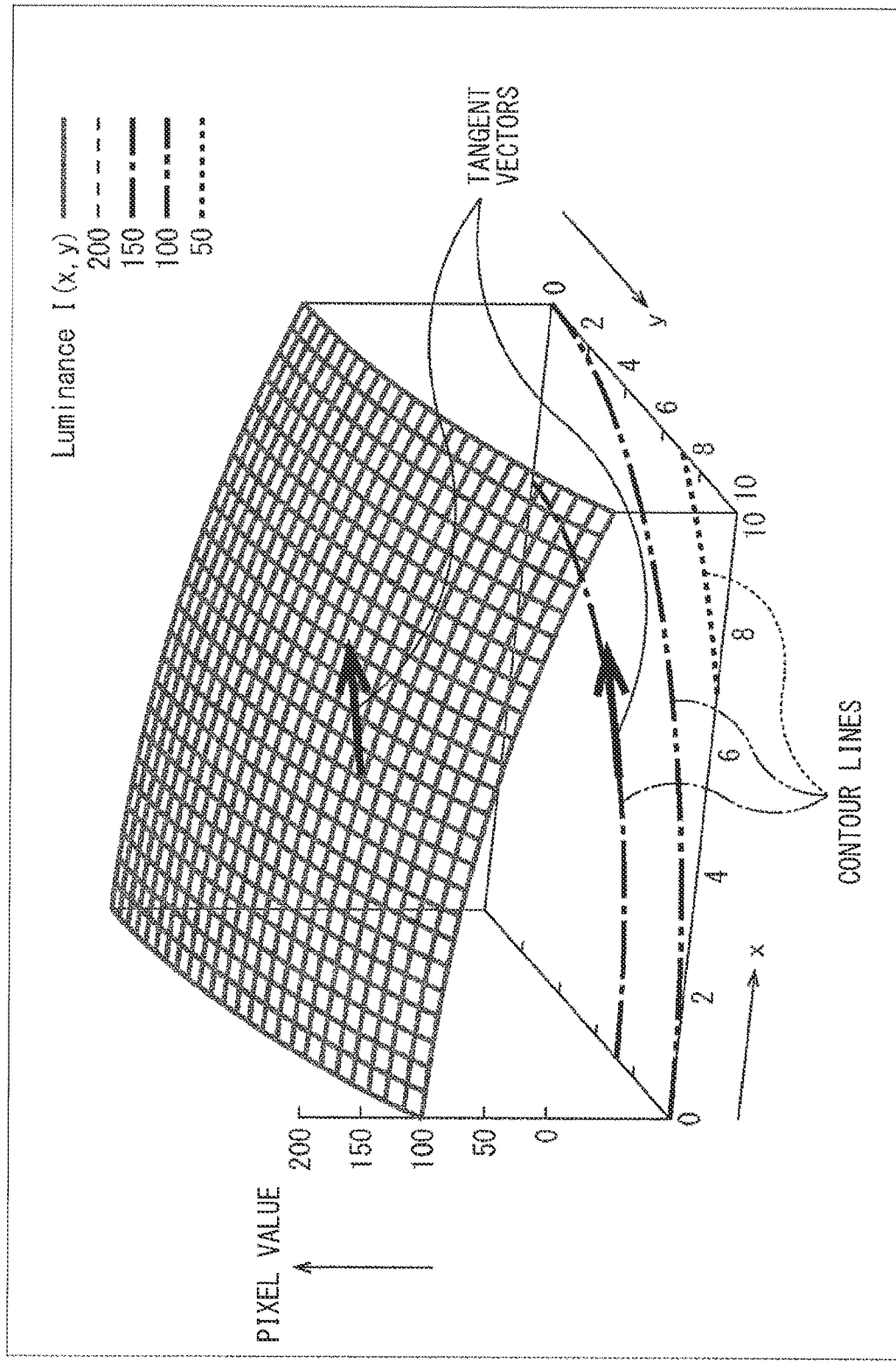
FIG. 12 is a diagram describing an outline of an inclination feature amount serving as the feature amount of the pixel of interest.

FIG. 12 is a diagram describing the outline of an inclination feature amount serving as the feature amount of the pixel of interest.

That is, FIG. 12 illustrates an example of the pixel value (luminance) of the pixel at each position (coordinates) (x, y) in an image (decoding in-progress image).

The inclination feature amount of the pixel of interest indicates the tangent direction of the contour line of the pixel values of the pixel of interest. The inclination feature amount of the pixel of interest thus indicates the direction in which the pixel values do not change from (the position of) the pixel of interest.

Here, in a certain pixel, a vector pointing in the tangent direction of the contour line of the pixel values of the pixel is also referred to as tangent vector.

As the inclination feature amount of the pixel of interest, the direction (tangent direction) of the tangent vector is obtained for the pixel of interest.

Figure 13:
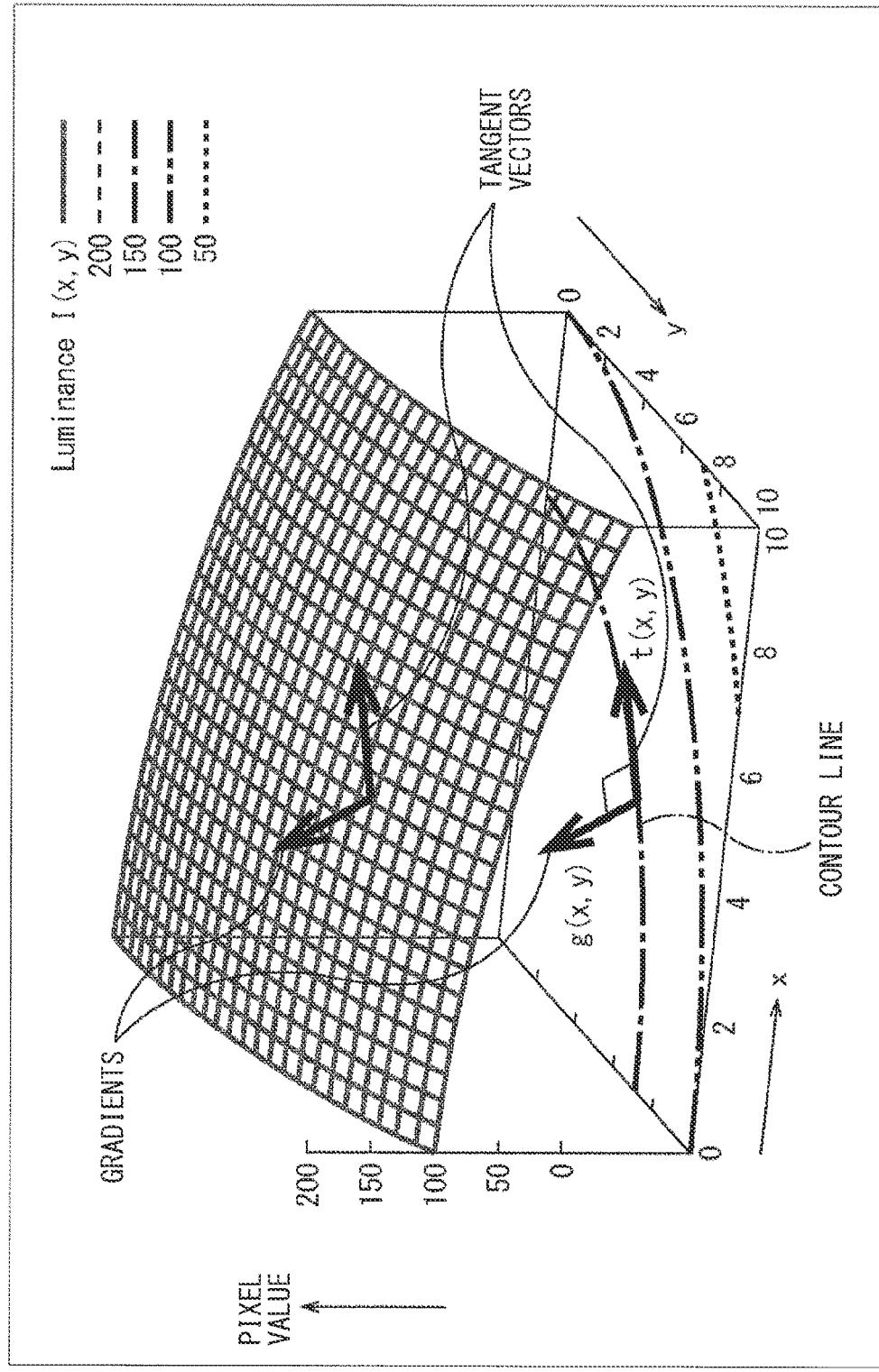
FIG. 13 is a diagram describing an example of a method of obtaining a tangent vector.

FIG. 13 is a diagram describing an example of a method of obtaining a tangent vector.

That is, FIG. 13 illustrates an example of the pixel value of the pixel at each position (x, y) in a decoding in-progress image similarly to FIG. 12.

The classification section 162 first obtains (the vector serving as) a gradient (gradient) g(x, y) of a pixel value I(x, y) of the pixel (that is also referred to as pixel (x, y) below) at a position (x, y) in accordance with Expression (11).

[Expression 11]

$$g(x, y) = \left(\frac{\partial I(x, y)}{\partial x}, \frac{\partial I(x, y)}{\partial y}\right)$$

(11)

In Expression (11), ∂/∂x and ∂/∂y are Sobel filters, and expressed, for example, as Expression (12).

[Expression 12]

$$\frac{\partial}{\partial x} = \begin{pmatrix} -1 & 0 & 1 \\ -2 & 0 & 2 \\ -1 & 0 & 1 \end{pmatrix}$$

$$\frac{\partial}{\partial y} = \begin{pmatrix} -1 & 2 & -1 \\ 0 & 0 & 0 \\ 1 & 2 & 1 \end{pmatrix}$$

(12)

A tangent vector t(x, y) of the pixel (x, y) is a vector having the direction vertical to the gradient g(x, y) of the pixel (x, y). It is possible to obtain the tangent vector t(x, y) of the pixel (x, y) by rotating the gradient g(x, y) by π/2 (radian) in accordance with Expression (13).

[Expression 13]

$$t(x, y) = \begin{bmatrix} 0 & 1 \\ -1 & 0 \end{bmatrix} \begin{bmatrix} g_x \\ g_y \end{bmatrix}$$

(13)

In Expression (13), gx and gy respectively represent an x component and a y component of the gradient g(x, y).

Figure 14:
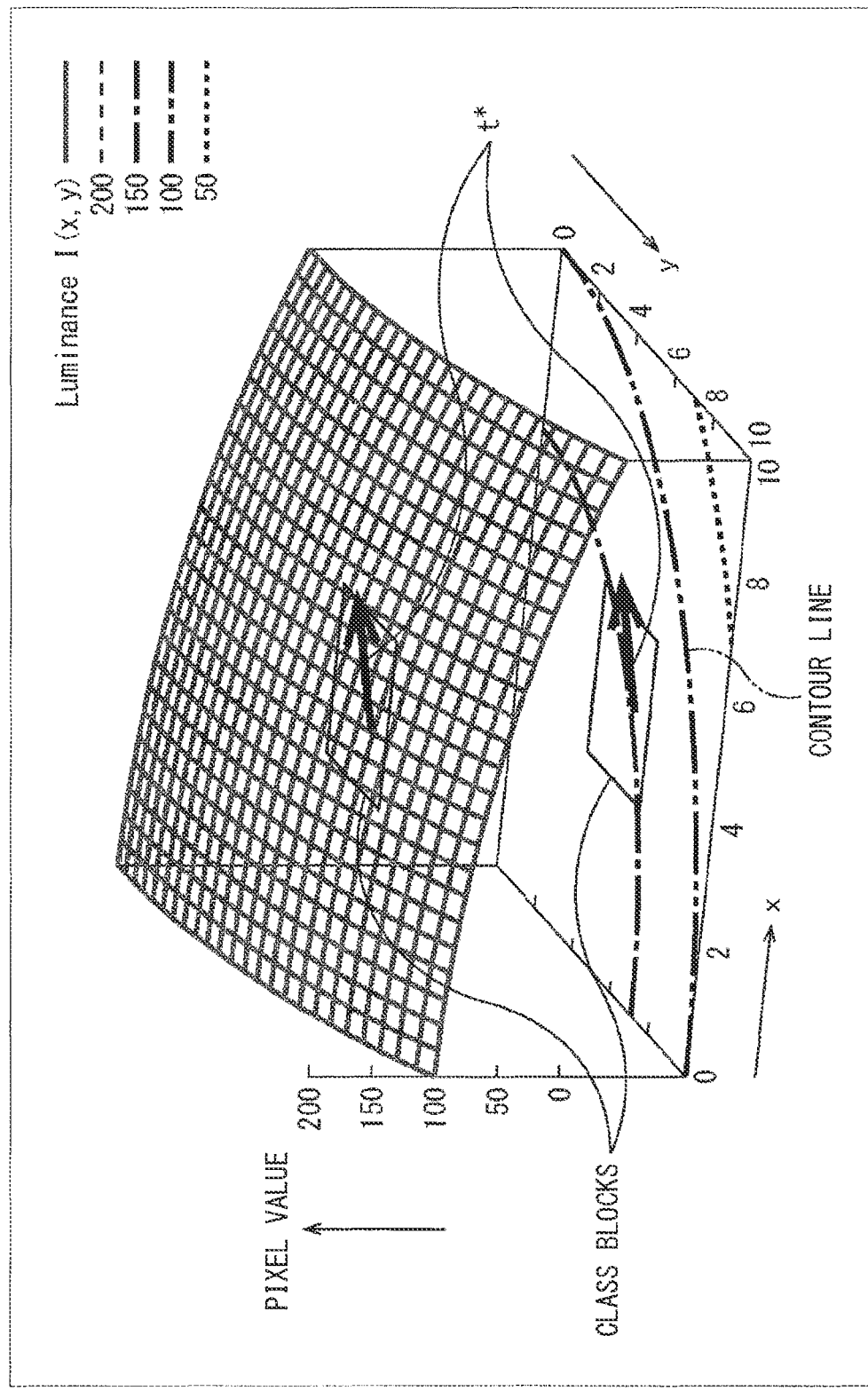
FIG. 14 is a diagram describing a representative vector t* of tangent vectors t(x, y) of pixels in a class block of the pixel of interest.

FIG. 14 is a diagram describing a representative vector t* of tangent vectors t(x, y) of the respective pixels in the class block of the pixel of interest.

That is, FIG. 14 illustrates an example of the pixel value of each pixel (x, y) of a decoding in-progress image similarly to FIG. 12.

Although it is possible to obtain the tangent vector t(x, y) for each pixel of a decoding in-progress image, the direction of the tangent vector t(x, y) of the pixel (x, y) of interest is not adopted as it is in the present embodiment as the inclination feature amount, for example, to secure robustness, but a direction θ* of a representative vector t* is adopted as the inclination feature amount. The representative vector t* represents the tangent vectors t(x, y) of the respective pixels (x, y) in the class block of the pixel of interest.

Figure 15:
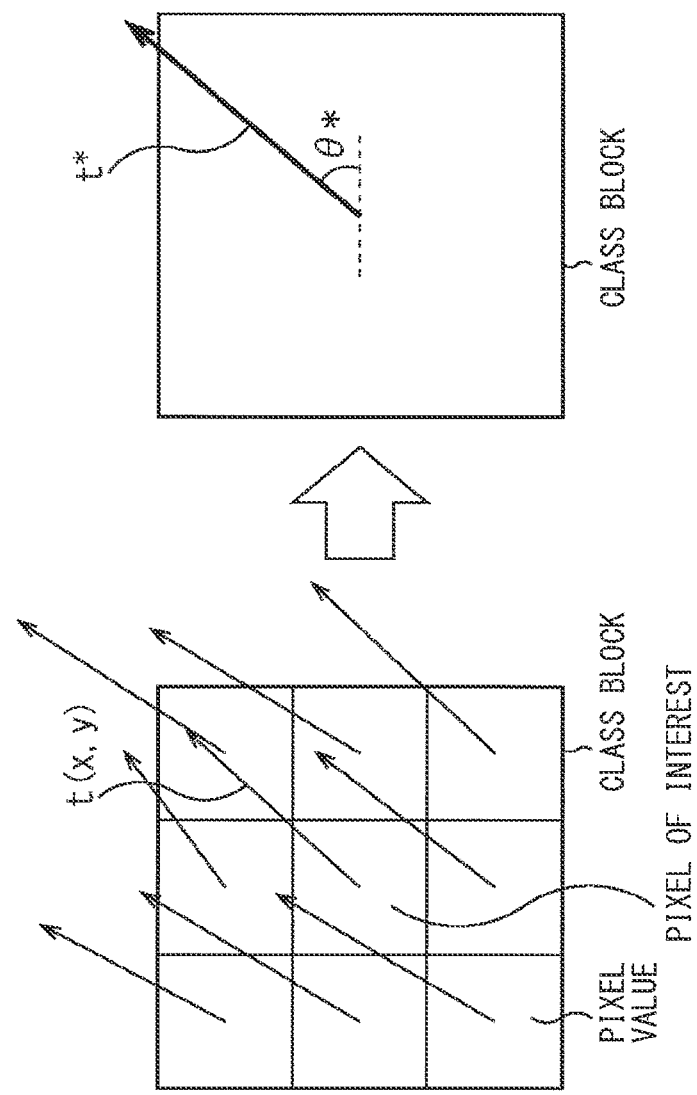
FIG. 15 is a diagram describing the representative vector t* that represents the tangent vectors t(x, y) of respective pixels (x, y) in the class block of the pixel of interest.

FIG. 15 is a diagram describing the representative vector t* that represents the tangent vectors t(x, y) of the respective pixels (x, y) in the class block of the pixel of interest.

The present embodiment defines an evaluation function J(θ) for evaluating the appropriateness for a unit vector e(θ) having a certain direction θ to be the representative vector t* representing the tangent vectors t(x, y) of the respective pixels (x, y) in the class block of the pixel of interest. That is, for example, the certain direction θ is a direction in which the angle to the x axis is θ. The present embodiment sets the unit vector e(θ) having the direction of θ for maximizing the evaluation function J(θ) as the representative vector t*.

FIG. 15 illustrates a block including 3×3 pixels for width×height around the pixel of interest as a class block, and the tangent vectors t(x, y) of the 3×3 pixels included in the class block and the representative vector t* that represents the tangent vectors t(x, y) of the 3×3 pixels.

It is possible to adopt, for example, Expression (14) as the evaluation function J(θ).

[Expression 14]

$$J(\theta) = \sum_{x,y \in S} \langle e(\theta), t(x, y) \rangle^2 \quad (14)$$

In Expression (14). <A, B> represents the inner product of vectors A and B. The unit vector e(θ) is a vector pointing in the direction of the angle θ, and having a norm of 1.

As the direction θ* of the representative vector t* serving as the inclination feature amount, θ for maximizing the evaluation function J(O) is obtained in accordance with Expression (15).

[Expression 15]

$$\theta* = \underset{\theta}{\operatorname{argmax}} \; J(\theta) \quad (15)$$

In Expression (15), argmax (A) represents θ for maximizing A.

Figure 16:
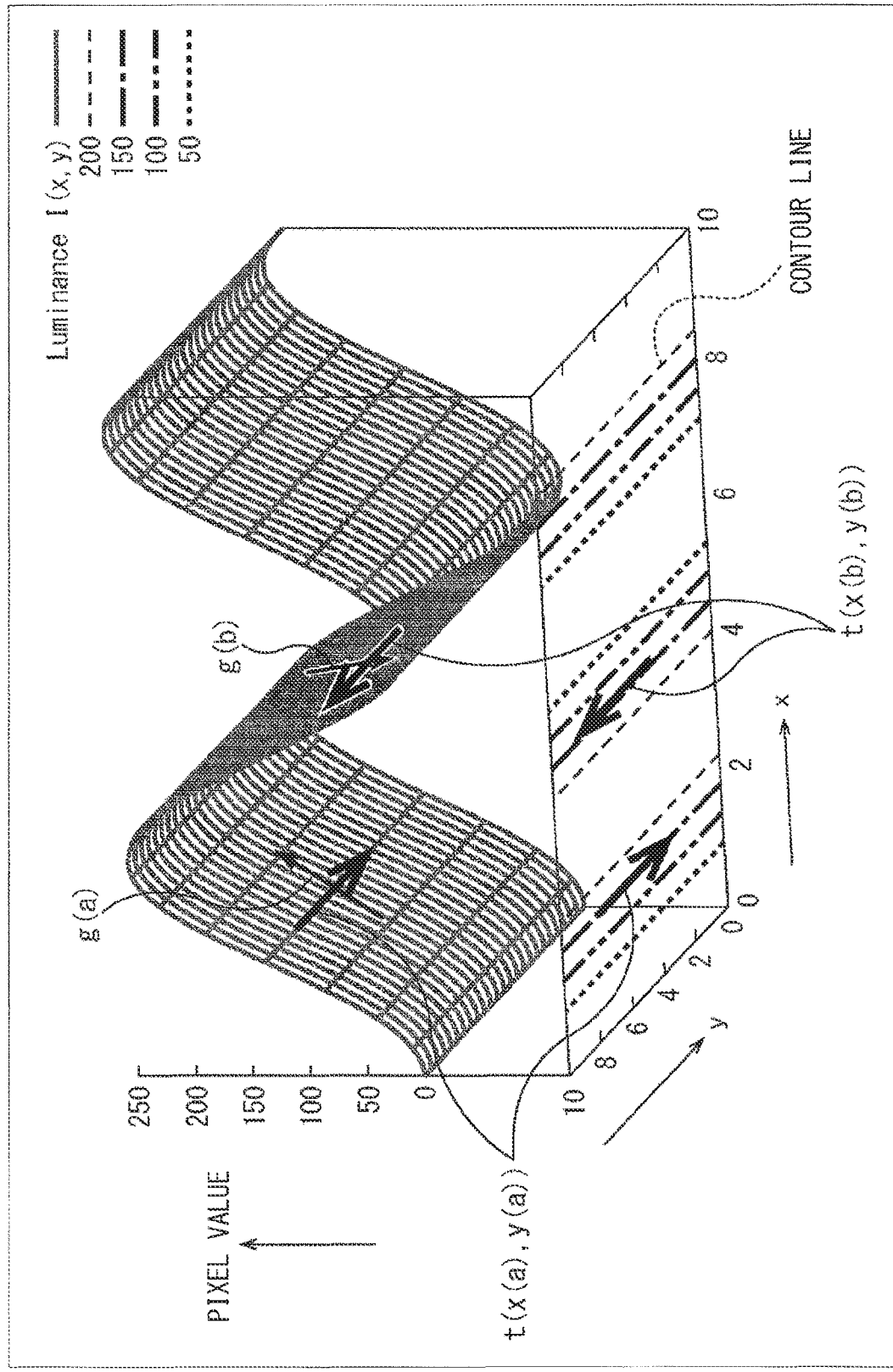
FIG. 16 is a diagram describing an evaluation function $J(\theta)$.

FIG. 16 is a diagram describing the evaluation function J(θ).

That is, FIG. 16 illustrates an example of the pixel value of each pixel (x, y) of a decoding in-progress image similarly to FIG. 12.

In FIG. 16, the pixel values of the decoding in-progress image have the shape of a sin-wave as viewed from the y direction. Then, if the pixel values of the decoding in-progress image are viewed in the positive direction of the x axis, a gradient g(a) of the pixel value of a certain pixel (x(a), y(a)) is an upward gradient (positive gradient). A gradient g(b) of the pixel value of another pixel (x(b), y(b)) is a downward gradient (negative gradient).

If it is assumed now that a change of a pixel value (inclination) indicated by the gradient g(a) and a change of a pixel value indicated by the gradient g(b) have the opposite directions and the same magnitude, a tangent vector t(x(a), y(a)) of the pixel (x(a), y(a)) and a tangent vector t(x(b), y(b)) of the pixel (x(b), y(b)) have the opposite directions and the same magnitude.

According to the evaluation function J(O) of Expression (14), the inner product <e(θ), t(x, y)> of the unit vector e(O) and the tangent vector t(x, y) is squared, and the tangent vectors t(x(a), y(a)) and t(x(b), y(b)) having the opposite directions and the same magnitude are thus treated similarly in the evaluation function J(θ) (are not distinguished from each other).

Figure 17:
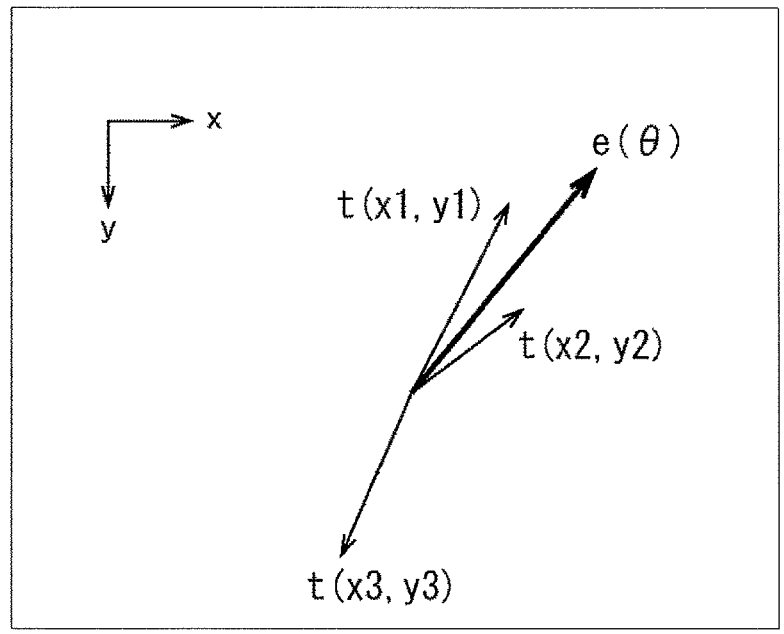
FIG. 17 is a diagram illustrating examples of the tangent vectors t(x, y) of respective pixels (x, y) in the class block and a unit vector $e(\theta)$ having a direction $\theta$.

FIG. 17 is a diagram illustrating examples of the tangent vectors t(x, y) of the respective pixels (x, y) in the class block and the unit vector e(O) having the direction θ.

It is to be noted that FIG. 17 illustrates only tangent vectors t(x1, y1), t(x2, y2), and t(x3, y3) of three pixels (x1, y1), (x2, y2), and (x3, y3) as the tangent vectors t(x, y) of the respective pixels (x, y) in a class block for the sake of simplicity.

The evaluation function J(θ) increases with an increase in the tangent vectors t(x, y) that have a larger number of components in the direction θ (or the opposite direction (direction of θ+π) of the direction θ) of the unit vector e(θ).

Figure 18:
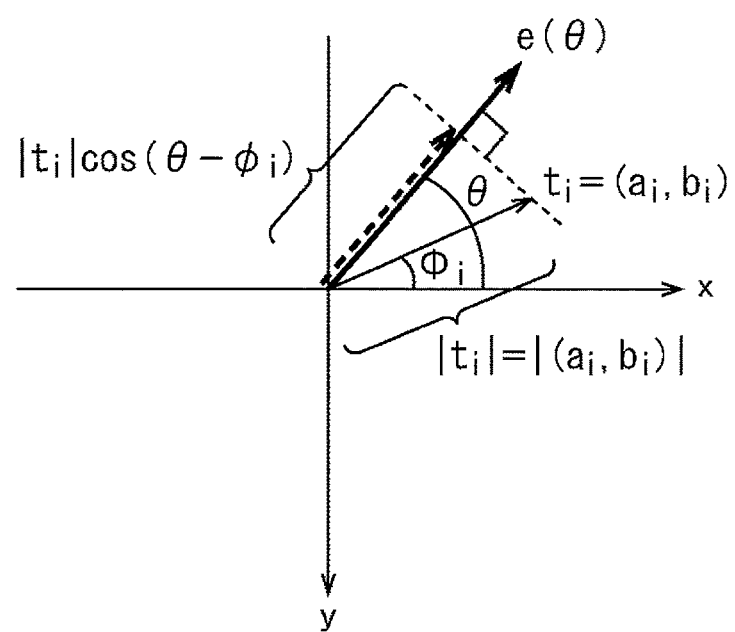
FIG. 18 is a diagram describing calculation of the evaluation function $J(\theta)$.

FIG. 18 is a diagram describing the calculation of the evaluation function J(θ).

That is, FIG. 18 illustrates examples of a tangent vector $t_i$ of the i-th pixel in a class block and the unit vector e(θ).

In FIG. 18, $\varphi_i$ represents the direction (angle) of the tangent vector $t_i$, and $a_i$ and $b_i$ respectively represent an x component and a y component of the tangent vector $t_i$.

It is possible to calculate the evaluation function J(θ) of Expression (14) in accordance with Expression (16).

[Expression 16]

$$J(\theta) = \sum_{x,y \in S} \langle e(\theta), t(x, y) \rangle^2 \quad (16)$$
$$= \sum_i |t_i|^2 \cos^2(\theta - \phi_i)$$

In Expression (16), the summation (Σ) of i indicates that all the pixels in a class block are summed up.

According to Expression (16), as the magnitude $|t_i|$ cos(θ−$\varphi_i$) (portion indicated by the dotted line arrow in FIG. 18) of the component of the tangent vector $t_i$ in the direction θ of the unit vector e(θ) increases, the evaluation function J(θ) increases.

θ* of Expression (15) that is θ for maximizing the evaluation function J(θ) is θ that makes a differential value dJ(θ)/dθ of θ of the evaluation function J(θ) be 0. It is possible to calculate the differential value dJ(θ)/dθ as in Expression (17).

[Expression 17]

$$\frac{dJ(\theta)}{d\theta} = -2\sum_i |t_i|^2 \sin(\theta - \phi_i) \cos(\theta - \phi_i) \quad (17)$$
$$= -\sum_i |t_i|^2 (\sin(\theta - \phi_i + \theta - \phi_i) + \sin(\theta - \phi_1 - \theta + \phi_i))$$
$$= -\sum_i |t_i|^2 (\sin(2\theta - 2\phi_i)) = T \sin(2\theta - 2\phi)$$

In Expression (17), T and φ are expressed as Expression (18).

[Expression 18]

$$T = -\sqrt{\left(\sum_i |t_i|^2 \sin(2\phi)\right) + \left(\sum_i |t_i|^2 \cos(2\phi)\right)} \quad (18)$$

$$\phi = \frac{1}{2} \tan^{-1}\left(\frac{\sum_i |t_i|^2 \sin(-2\phi_i)}{\sum_i |t_i|^2 \cos(-2\phi_i)}\right)$$

Cases where the differential value dJ(θ)/dθ of Expression (17) is 0 include a case of T=0 and a case of θ=φ.

The case of T=0 includes a case of |t_i|=0, but in this case, the tangent vector $t_i$ is a vector having a magnitude of 0, and does not have a direction $\varphi_i$. The case of |t_i|=0 is not thus appropriate to obtain θ* of Expression (15).

In addition, in the case of θ=φ, it is possible to obtain θ* of Expression (15) in accordance with Expression (19) in which p of Expression (18) is replaced with θ*.

[Expression 19]

$$\theta* = \frac{1}{2} \tan^{-1}\left(\frac{\sum_i |t_i|^2 \sin(-2\phi_i)}{\sum_i |t_i|^2 \cos(-2\phi_i)}\right) \quad (19)$$

It is possible to transform Expression (19) as in Expression (20).

[Expression 20]

$$\theta* = \frac{1}{2} \tan^{-1}\left(\frac{\sum_i |t_i|^2 \sin(-2\phi_i)}{\sum_i |t_i|^2 \cos(-2\phi_i)}\right) \quad (20)$$

$$= \frac{1}{2} \tan^{-1}\left(\frac{-2\sum_i |t_i|^2 \sin\phi_i \cos\phi_i}{\sum_i |t_i|^2 (\cos^2(\phi_i) - \sin^2(\phi_i))}\right)$$

Figure 19:
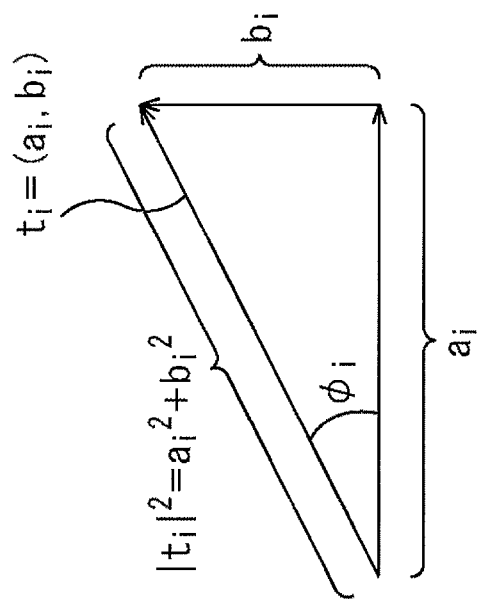
FIG. 19 is a diagram illustrating an example of a tangent vector $t_i$.

FIG. 19 is a diagram illustrating an example of the tangent vector $t_i$.

It is possible to express sin ($\varphi_i$) and cos ($\varphi_i$) of the tangent vector $t_i$ as illustrated in FIG. 19 as Expression (21). The direction of the tangent vector $t_i$ is $\varphi_i$, and the x component and the y component are respectively $a_i$ and $b_i$.

[Expression 21]

$$\sin(\phi_i) = \frac{b_i}{|t_i|}, \quad \cos(\phi_i) = \frac{a_i}{|t_i|} \quad (21)$$

Substituting Expression (21) into Expression (20) makes it possible to obtain θ* in accordance with Expression (22).

[Expression 22]

$$\theta* = \frac{1}{2} \tan^{-1}\left(\frac{\sigma_1}{\sigma_2}\right) \quad (22)$$

In Expression (22), $\sigma_1$ and $\sigma_2$ are expressed as Expression (23).

[Expression 23]

$$\sigma_1 = 2\sum_i a_i b_i \quad (23)$$

$$\sigma_2 = \sum_i (a_i^2 - b_i^2) = \sum_i ((a_i - b_i)(a_i + b_i))$$

The classification section 162 obtains θ* as an inclination feature amount in accordance with Expression (22) and Expression (23).

According to Expression (22) and Expression (23), it is possible to obtain the inclination feature amount θ* from the division using $\sigma_1$ and $\sigma_2$, and the calculation of $\tan^{-1}$ (arctan). $\sigma_1$ and $\sigma_2$ are obtained from an x component at and a y component $b_i$ of the tangent vector $t_i$ of each pixel in a class block.

Here, the inclination feature amount θ* is the direction of the representative vector t* that represents the tangent vectors t(x, y) of the respective pixels (x, y) in a class block. Accordingly, it can be said that the inclination feature amount θ* is a representative value that represents the tangent directions of the contour lines of the pixel values of the respective pixels in a class block.

It is possible to obtain a result of the calculation of $\tan^{-1}$ by not only actually calculating $\tan^{-1}$, but also using LUT.

Figure 20:
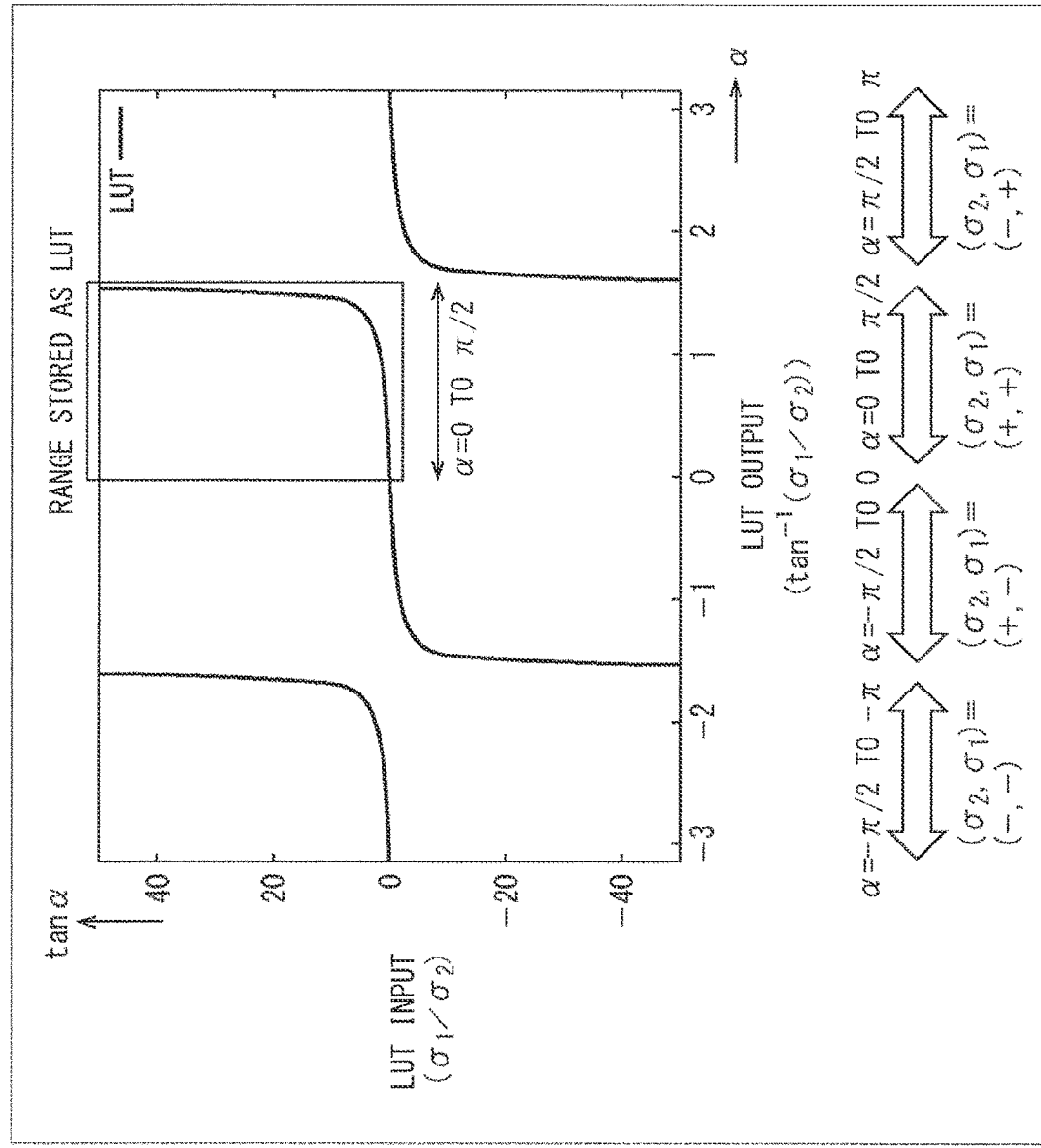
FIG. 20 is a diagram describing an example of LUT used to obtain a result of calculation of $\tan^{-1}$.

FIG. 20 is a diagram describing an example of LUT used to obtain a result of the calculation of $\tan^{-1}$.

That is, FIG. 20 illustrates a graph of tan α. It is to be noted that, in FIG. 20, the horizontal axis represents an angle α, and the vertical axis represents tan α.

It is possible to adopt LUT that has tan α of the vertical axis as input and the angle α of the horizontal axis as output as LUT for obtaining a result of the calculation of $\tan^{-1}$.

In this case, the divided value $\sigma_1/\sigma_2$ using $\sigma_1$ and $\sigma_2$ of Expression (23) is inputted to the LUT, thereby outputting the angle α=$\tan^{-1}$ ($\sigma_1/\sigma\sigma_2$) from the LUT.

It is to be noted that tan α has point symmetry about the origin, and is a periodic function. tan α stored as LUT does not thus have to cover the one-period range of α=−π to +π, but only has to cover, for example, the range (that is also referred to as basic range below) of α=0 to π/2 surrounded by the rectangle in the diagram.

It is possible to obtain the range of α=−π/2 to −π, the range of α=−π/2 to 0, and the range of α=π/2 to π in tan α by point-symmetrically moving the basic range of tan α about the origin or translating the basic range of tan α in the direction of a.

That is, it is possible in actual implementation to obtain the angle α=$\tan^{-1}$ ($\sigma_1/\sigma_2$) by transforming the output of LUT in accordance with the signs of $\sigma_1$ and $\sigma_2$. |$\sigma_1/\sigma_2$| obtained by removing the sign of $\sigma_1/\sigma_2$ is obtained as the input of the LUT in which the basic range is stored.

Here, the signs of $\sigma_1$ and $\sigma_2$ are expressed like $(\sigma_2, \sigma_1) = (+, +)$.

In a case of $(\sigma_2, \sigma_1) = (+, +)$, the angle $\alpha = \tan^{-1}(\sigma_1/\sigma_2)$ has a value within the range of $\alpha = 0$ to $\pi/2$, and is obtainable by adopting the output of the LUT as it is.

In a case of $(\sigma_2, \sigma_{01}) = (+, -)$, the angle $\alpha = \tan^{-1}(\sigma_1/\sigma_2)$ has a value within the range of $\alpha = -\pi/2$ to $0$, and is obtainable by point-symmetrically moving the output of the LUT about the origin.

In a case of $(\sigma_2, \sigma_1) = (-, -)$, the angle $\alpha = \tan^{-1}(\sigma_1/\sigma_2)$ has a value within the range of $\alpha = -\pi/2$ to $-\pi$, and is obtainable by moving the output of the LUT by $-\pi$ in the direction of the angle $\alpha$.

In a case of $(\sigma_2, \sigma_1) = (-, +)$, the angle $\alpha = \tan^{-1}(\sigma_1/\sigma_2)$ has a value within the range of $\alpha = \pi/2$ to $\pi$, and is obtainable by point-symmetrically moving the output of the LUT about the origin and moving the output of the LUT by $+\pi$ in the direction of the angle $\alpha$.

It is to be noted that LUT is adopted here that uses the divided value $\sigma_1/\sigma_2$ as input, and outputs the angle $\alpha = \tan^{-1}(\sigma_1/\sigma_2)$ for the input of the divided value $\sigma_0/\sigma_2$. However, it is additionally possible to adopt LUT that, for example, uses $\sigma_1$ and $\sigma_2$ as input, and outputs the inclination feature amount $\theta^*$ for the input of $\sigma_1$ and $\sigma_2$. The inclination feature amount $\theta^*$ is obtained by performing the calculation of Expression (22).

In addition, for example, it is possible to adopt LUT that outputs a class obtained by using $\sigma_1$ and $\sigma_2$ as input, calculating the inclination feature amount $\theta^*$ of Expression (22) for the input of $\sigma_1$ and $\sigma_2$, and further performing classification by using the inclination feature amount $\theta^*$.

Figure 21:
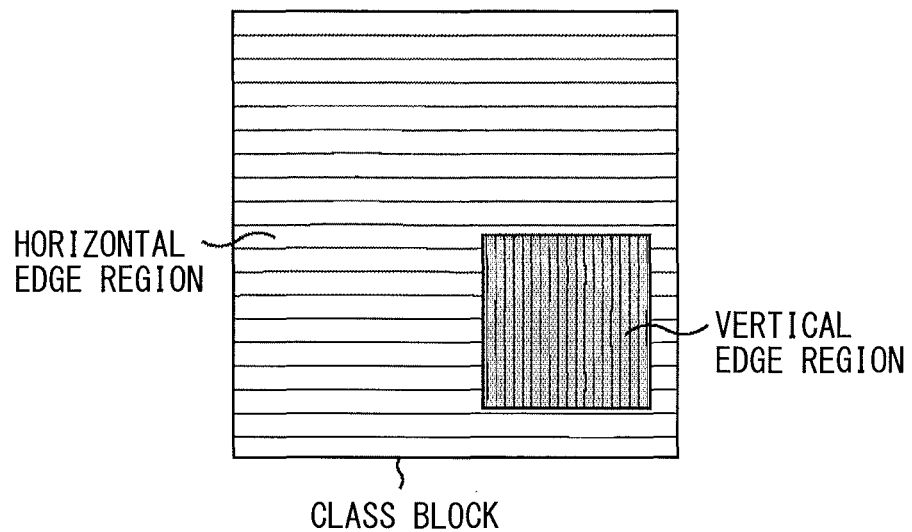
FIG. 21 is a diagram describing reliability of an inclination feature amount $\theta^*$ serving as the feature amount of the pixel of interest.

FIG. 21 is a diagram describing the reliability of the inclination feature amount $\theta^*$ serving as the feature amount of the pixel of interest.

That is, FIG. 21 illustrates an example of a class block.

The class block of FIG. 21 has a bright wood-grained region and a dark wood-grained region. Edges in the horizontal direction (edges extending in the horizontal direction) are dominant in the bright wood-grained region, and edges in the vertical direction are dominant in the dark wood-grained region. The bright wood-grained region is also then referred to as horizontal edge region, and the dark wood-grained region is also referred to as vertical edge region.

In FIG. 21, the lower left partial region of the class block is a vertical edge region, and the other region is a horizontal edge region.

The horizontal edge region thus occupies more than four times as large area as that of the vertical edge region in the class block of FIG. 21.

Reliability tr of the inclination feature amount $\theta^*$ of the pixel of interest is obtained, for example, in accordance with Expression (24).

[Expression 24]

$$t_r = \frac{J(\theta*)}{\sum_i |t_i|^2} \quad (24)$$

According to Expression (24), the reliability tr is obtained with, as an index, the degree the tangent vector $t_i$ of each pixel in a class block contributes to the evaluation function $J(\theta^*)$ offering the inclination feature amount $\theta^*$ or the representative vector $t^* = e(\theta^*)$.

The reliability tr of Expression (24) indicates the degree to which the tangent vectors $t_i$ of the pixels in a class block include no tangent vector $t_i$ having a direction different from the direction $\theta^*$ indicated by the inclination feature amount $\theta^*$ (the degree to which the tangent vectors $t_i$ of the pixels in a class block include a tangent vector $t_i$ having a direction similar to the direction $\theta^*$ indicated by the inclination feature amount $\theta^*$).

The high reliability tr thus indicates that the tangent vectors $t_i$ of the pixels in a class block include a large number of tangent vectors $t_i$ having a direction similar to the direction $\theta^*$ indicated by the inclination feature amount $\theta^*$.

As described above, the horizontal edge region occupies more than four times as large area as that of the vertical edge region in the class block of FIG. 21. Accordingly, a direction close to the horizontal direction in which the horizontal edges extend is obtained as the inclination feature amount $\theta^*$.

That is, according to Expression (15), the horizontal direction is obtained as the inclination feature amount $\theta^*$ if the whole of a class block is a horizontal edge region. If the whole of a class block is a vertical edge region, the vertical direction is obtained as the inclination feature amount $\theta^*$. However, as illustrated in FIG. 21, even if a class block has both a horizontal edge region and a vertical edge region, the inclination feature amount $\theta^*$ is not an oblique direction that is the so-called average of the horizontal direction and the vertical direction. That is, in a case where there are both a horizontal edge region and a vertical edge region as illustrated in FIG. 21, the inclination feature amount $\theta^*$ is the horizontal direction in which the horizontal edges of the horizontal edge region extend. The horizontal edge region is a dominant region in the class block among the horizontal edge region and the vertical edge region.

The class block of FIG. 21, however, has a vertical edge region in addition to a horizontal edge region, and the reliability tr is thus obtained that has a value lowered for the vertical edge region as compared with a class block having only a horizontal edge region.

The classification section 162 (FIG. 6) uses the inclination feature amount $\theta^*$ of the pixel of interest to classify the pixel of interest. This makes it possible to learn a tap coefficient for each class in accordance with (the direction orthogonal to) the direction of the presence of high frequency components around the pixel of interest, and separate tap coefficients for use in the ALF process.

Further, the classification section 162 uses the reliability tr of the inclination feature amount $\theta^*$ of the pixel of interest to classify the pixel of interest. This makes it possible to learn a tap coefficient for each class in accordance with the reliability tr, and separate tap coefficients for use in the ALF process.

As a result, the ALF process offers a filtered image having a small error with respect to the original image. This makes the residual smaller, and makes it possible to improve the coding efficiency.

Figure 22:
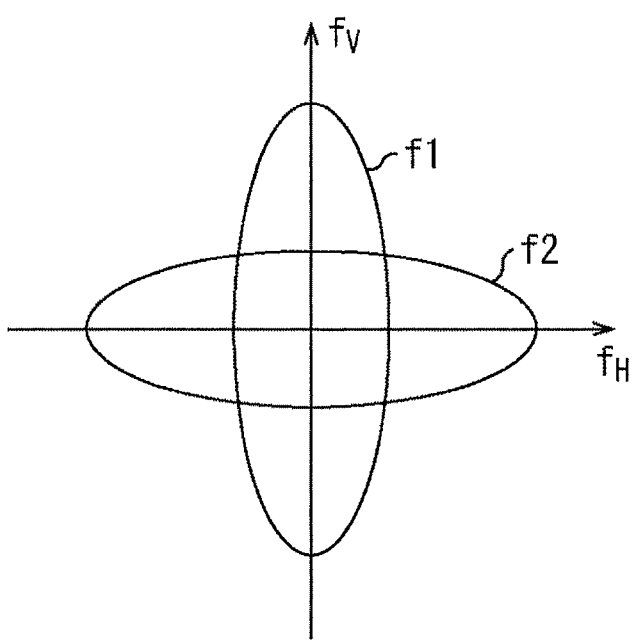
FIG. 22 is a diagram illustrating an example of the frequency characteristic of the image.

FIG. 22 is a diagram illustrating an example of a frequency characteristic of an image.

In FIG. 22, the horizontal axis represents a frequency $f_H$ in the horizontal direction, and the vertical axis represents a frequency $f_V$ in the vertical direction. FIG. 22 uses the frequency $f_H$ in the horizontal direction and the frequency $f_V$ in the vertical direction as axes to indicate the distribution of the frequency components of an image.

In FIG. 22, an ellipse-shaped frequency characteristic f1 that is vertically long is a frequency characteristic of an image having a large number of high frequency components in the vertical direction, and a small number of high frequency components in the horizontal direction. That is, for example, the frequency characteristic f1 is a frequency characteristic of an image having a large number of horizontal edge regions in which edges in the horizontal direction are dominant. In addition, an ellipse-shaped frequency characteristic f2 that is horizontally long is a frequency characteristic of an image having a small number of high frequency components in the vertical direction, and a large number of high frequency components in the horizontal direction. That is, for example, the frequency characteristic f2 is a frequency characteristic of an image having a large number of vertical edge regions in which edges in the vertical direction are dominant.

According to the classification using the inclination feature amount θ*, it is possible to classify, into respective different classes, the pixels of interest of an image having a horizontal edge region like an image having the frequency characteristic f1 and an image having a vertical edge region like an image having the frequency characteristic f2 even if the images have high frequency components in the class blocks of the respective pixels of interest to the same degree.

Figure 23:
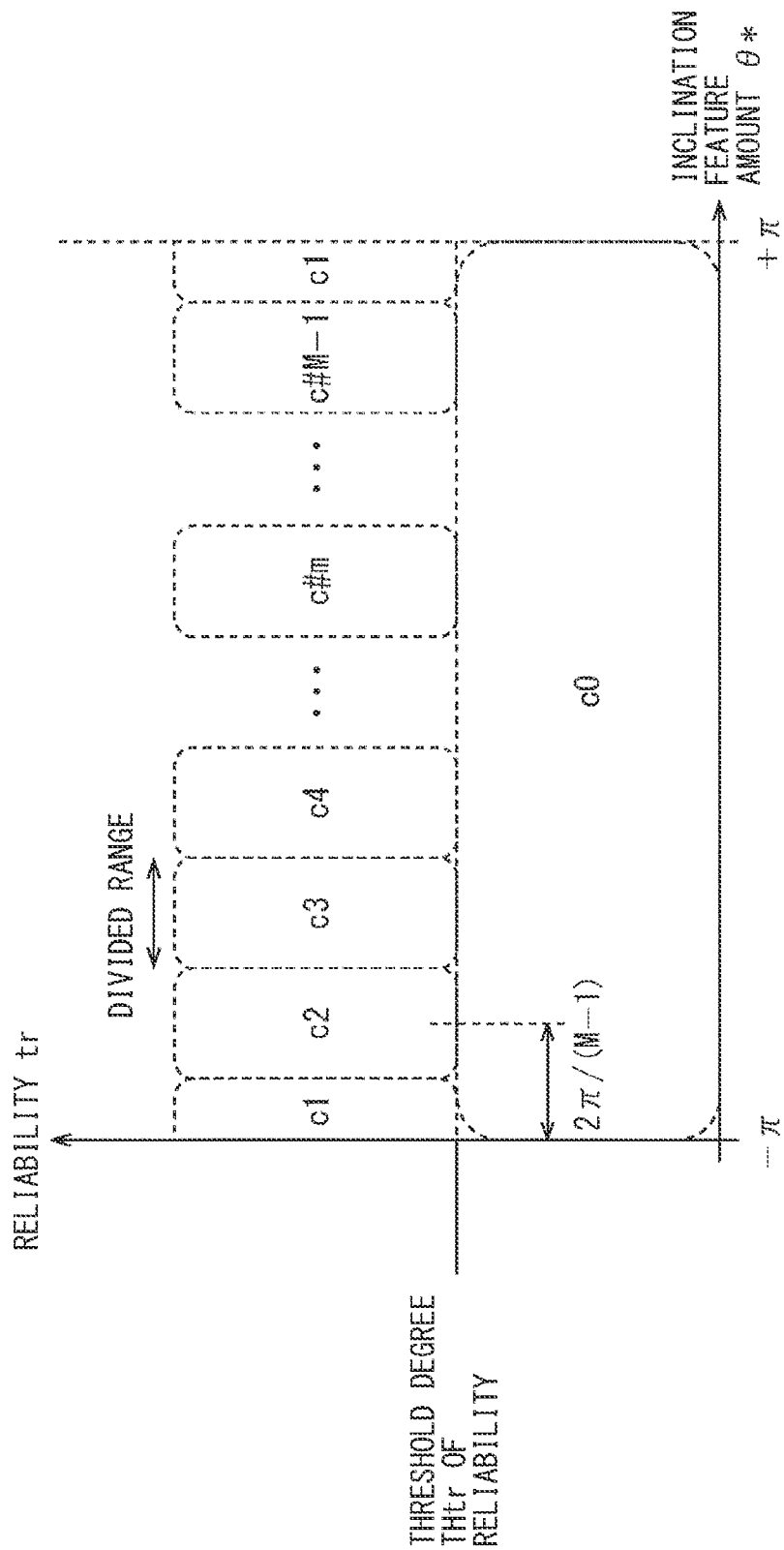
FIG. 23 is a diagram describing an example of classification using the inclination feature amount $\theta^*$ and reliability tr.

FIG. 23 is a diagram describing an example of classification using the inclination feature amount θ* and the reliability tr.

In FIG. 23, the horizontal axis represents the inclination feature amount θ*, and the vertical axis represents the reliability tr.

The classification section 162 (FIG. 6) compares the reliability tr of the inclination feature amount θ* of the pixel of interest with a threshold THtr of the reliability tr that is a type of classification parameters.

Then, in a case where the reliability tr of the inclination feature amount θ* of the pixel of interest is not greater than or equal to the threshold THtr, the classification section 162 classifies the pixel of interest into a class c0 that is not dependent on the inclination feature amount θ*.

In contrast, in a case where the reliability tr of the inclination feature amount θ* of the pixel of interest is greater than or equal to the threshold THtr, the classification section 162 classifies the pixel of interest into any of classes c1 to c #M−1 in accordance with the inclination feature amount θ* of the pixel of interest. The classes c1 to c #M−1 are dependent on the inclination feature amount θ*.

Here, in FIG. 23, the total number of classes is M. In addition, in FIG. 23, the classes c1 to c #M−1 that are dependent on the inclination feature amount θ* are classes corresponding to the inclination feature amount θ*.

That is, in FIG. 23, the range of −π to +π that the direction (angle) serving as the inclination feature amount θ* may have is equally divided into the M−1 classes c1 to c #M−1 that are dependent on the inclination feature amount θ*. The M−1 divided ranges obtained by dividing the range of −π to +n are then respectively allocated to the M−1 classes c1 to c #M−1.

In FIG. 23, the range of −π to +π is equally divided into the M−1 divided ranges, and thus both the width of one divided range and the distance between the center of a certain divided range and the center of the divided range adjacent to the certain divided range are 2π/(M−1).

In addition, with respect to the direction indicated within the range of −π to +π, the direction of −π and the direction of +π are the same. Accordingly, in FIG. 23, divided ranges having the width 2π/(M−1) about the direction of −π and the direction of +π are allocated to the same class c1.

In FIG. 23, a pixel having the inclination feature amount θ* for a direction within the range of the angle of 2π/(M−1) about the direction of −π+(m−1)×2π/(M−1) is classified into a class c #m (where m=1, 2 . . . , M−1 in m=0, 1 . . . , M−1).

This classifies the pixel of interest into the class c #m in a case where the class block of the pixel of interest includes a large number of pixels having the tangent vectors $t_i$ having the direction of −π+(m−1)×2π/(M−1) or a direction close to the direction (in a case where the class block of the pixel of interest has a large number of high frequency components in the direction orthogonal to the direction of −π+(m−1)×2π/(M−1) or a direction close to the direction).

The class c #m is also referred to as class for the direction of −π+(m−1)×2π/(M−1).

According to the classification using the inclination feature amount θ* and the reliability tr as described above, the pixel of interest is classified into the class c0 in a case where the reliability tr of the inclination feature amount θ* of the pixel of interest is not greater than or equal to the threshold THtr.

For example, in a case where the class block of the pixel of interest is an image having not the ellipse-shaped frequency characteristic f1 or f2 illustrated in FIG. 22, but a circle-shaped frequency characteristic in a plane with the frequency $f_H$ in the horizontal direction and the frequency $f_V$ in the vertical direction used as axes, the class block of the pixel of interest is not an image having a larger number of high frequency components in a specific direction than high frequency components in another direction. This decreases the reliability tr of the inclination feature amount θ* of pixel of interest, and classifies the pixel of interest into the class c0.

In addition, in a case where the reliability tr of the inclination feature amount θ* of the pixel of interest is greater than or equal to the threshold THtr, the pixel of interest is classified into any of the class c1 to the class c #M−1 in accordance with the inclination feature amount θ*. Here, each of the classes c1 to c #M−1 is also referred to as class for the direction indicated by the inclination feature amount θ*.

For example, in a case where the class block of the pixel of interest is an image having the ellipse-shaped frequency characteristic f1 or f2 illustrated in FIG. 22 in a plane with the frequency $f_H$ in the horizontal direction and the frequency $f_V$ in the vertical direction used as axes, the class block of the pixel of interest is an image having a larger number of high frequency components in a specific direction than high frequency components in another direction. Accordingly, as the inclination feature amount θ* of the pixel of interest, the direction orthogonal to the specific direction is obtained, and the reliability tr further increases.

As a result, of the classes c1 to c #M−1, the pixel of interest is classified into the class for the direction (direction orthogonal to the direction of high frequency components) indicated by the inclination feature amount θ* of the pixel of interest.

It is to be noted that FIG. 23 equally divides the range of −π to +n. Accordingly, the M−1 respective divided ranges to which the classes c1 to c #M−1 are allocated have the same width. It is, however, possible to adopt different width for each divided range as the width of a divided range.

In addition, FIG. 23 classifies the pixel of interest into the class c0 irrespective of the inclination feature amount θ* of the pixel of interest in a case where the reliability tr of the inclination feature amount θ* of the pixel of interest is not greater than or equal to the threshold THtr. However, similarly to a case where the reliability tr of the inclination feature amount θ* of the pixel of interest is greater than or equal to the threshold THtr, it is possible to classify the pixel of interest into any of a plurality of classes in accordance with the inclination feature amount θ* even in a case where the reliability tr of the inclination feature amount θ* of the pixel of interest is not greater than or equal to the threshold THtr.

Figure 24:
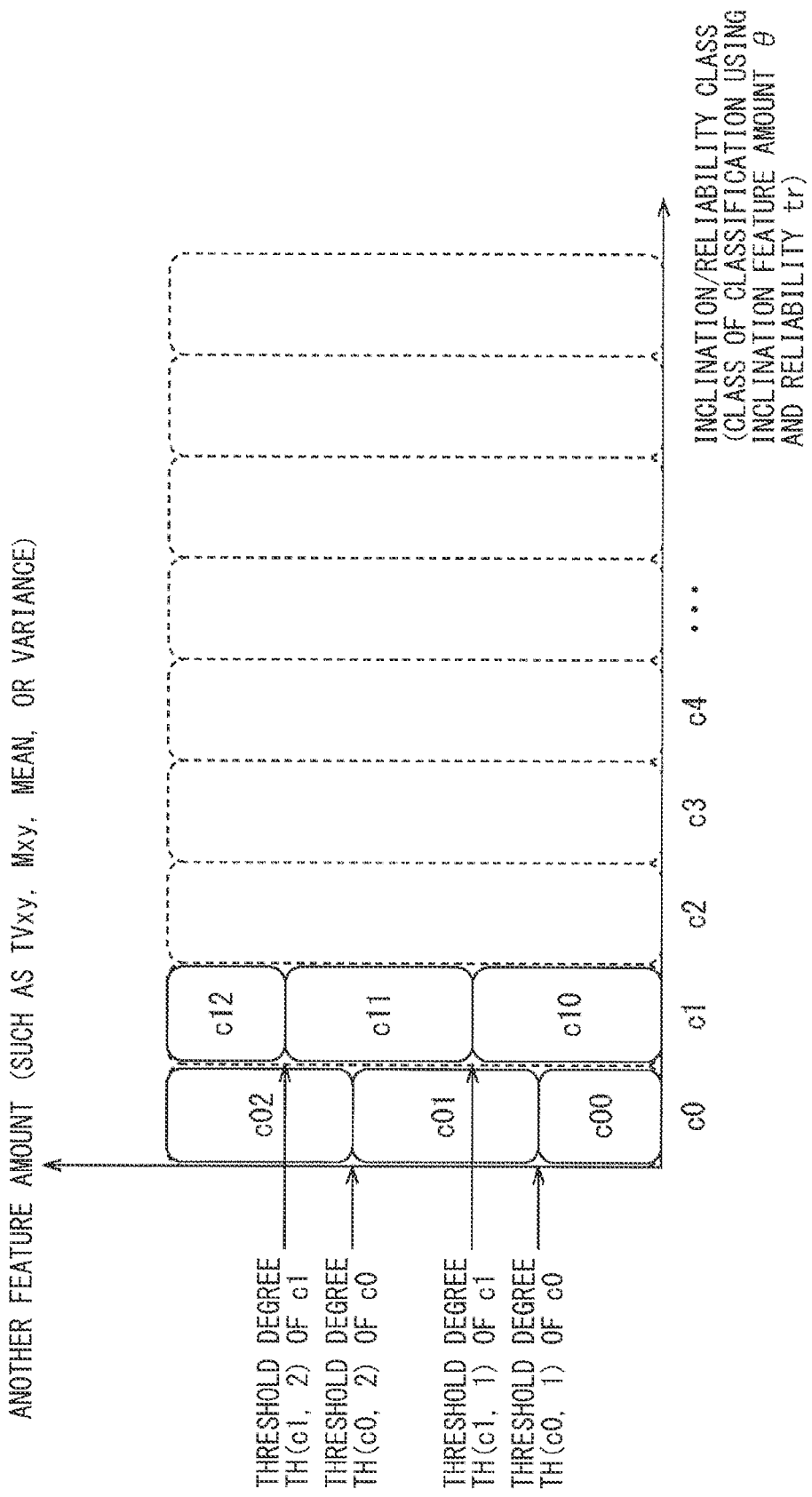
FIG. 24 is a diagram describing an example of classification using the inclination feature amount $\theta^*$ and the reliability tr, and another feature amount.

FIG. 24 is a diagram describing an example of classification using the inclination feature amount θ* and the reliability tr, and another feature amount.

In FIG. 24, the horizontal axis represents the class c #m obtained from the classification using the inclination feature amount θ* and the reliability tr, and the vertical axis represents another feature amount.

Here, the class c #m obtained from the classification using the inclination feature amount θ* and the reliability tr is also referred to as inclination/reliability class c #m.

It is possible to adopt the mean or variance, TV norm TVxy, maximum differential absolute value Mxy, or the like described above as the other feature amount. It is assumed here, for example, that the TV norm TVxy (or maximum differential absolute value Mxy) indicating the high frequency components of (the class block of) the pixel of interest is used as the other feature amount to perform classification.

The classification section 162 (FIG. 6) classifies the pixel of interest into the inclination/reliability class c #m, and then classifies the pixel of interest in the inclination/reliability class c #m into a final class c #m #j in accordance with the TV norm TVxy serving as another feature amount of the pixel of interest. The final class c #m #j is a final class.

That is, in FIG. 24, two thresholds TH(c #m, 0) and TH(c #m, 1) are set for the inclination/reliability class c #m as thresholds (that are also referred to as thresholds of the inclination/reliability class c #m below) of the TV norm TVxy. The TV norm TVxy serves as another feature amount of the pixel of interest in the inclination/reliability class c #m.

The thresholds TH(c #m, 0) and TH(c #m, 1) of the inclination/reliability class c #m are types of the other classification parameters.

The classification section 162 compares the TV norm TVxy of the pixel of interest in the inclination/reliability class c #m with the thresholds TH(c #m, 0) and TH(c #m, 1) of the inclination/reliability class c #m, and classifies the pixel of interest in the inclination/reliability class c #m into the final class c #m #j in accordance with a result of the comparison.

That is, it is assumed that the thresholds TH(c #m, 0) and TH(c #m, 1) of the inclination/reliability class c #m satisfy the expression TH(c #m, 0)<TH(c #m, 1).

In this case, when the TV norm TVxy of the pixel of interest in the inclination/reliability class c #m satisfies the expression TVxy<TH(c #m, 0), the pixel of interest is classified into a final class c #m0.

In addition, when the TV norm TVxy of the pixel of interest in the inclination/reliability class c #m satisfies the expression TH(c #m, 0)<=TVxy<TH(c #m, 1), the pixel of interest is classified into a final class c #m1.

Further, when the TV norm TVxy of the pixel of interest in the inclination/reliability class c #m satisfies the expression TH(c #m, 1)<=TVxy, the pixel of interest is classified into a final class c #m2.

As described in FIG. 23, according to the classification using the inclination feature amount θ* and the reliability tr, the pixel of interest is classified into the inclination/reliability class c #m for the direction indicated by the inclination feature amount θ* of the pixel of interest.

The pixel of interest in the inclination/reliability class c #m is then classified by using the TV norm TVxy serving as another feature amount. This allows the pixel of interest to be classified into the final class c #m #j in accordance with the degree of high frequency components in the direction orthogonal to the direction indicated by the inclination feature amount θ* of the pixel of interest.

It is to be noted that, in FIG. 24, each inclination/reliability class c #m is provided with the two thresholds TH(c #m, 0) and TH(c #m, 1), but each inclination/reliability class c #m may be provided with any number of thresholds other than two.

Further, it is possible to provide a certain inclination/reliability class c #m and another inclination/reliability class c #m' with thresholds different in number.

The pixel of interest in the inclination/reliability class c #m provided with J thresholds TH(c #m, 0), TH(c #m, 1), . . . . TH(c #m, J) is classified into any of J+1 final classes c #m0, c #m1, . . . , c #m #J+1 in accordance with the TV norm TVxy of the pixel of interest.

Figure 25:
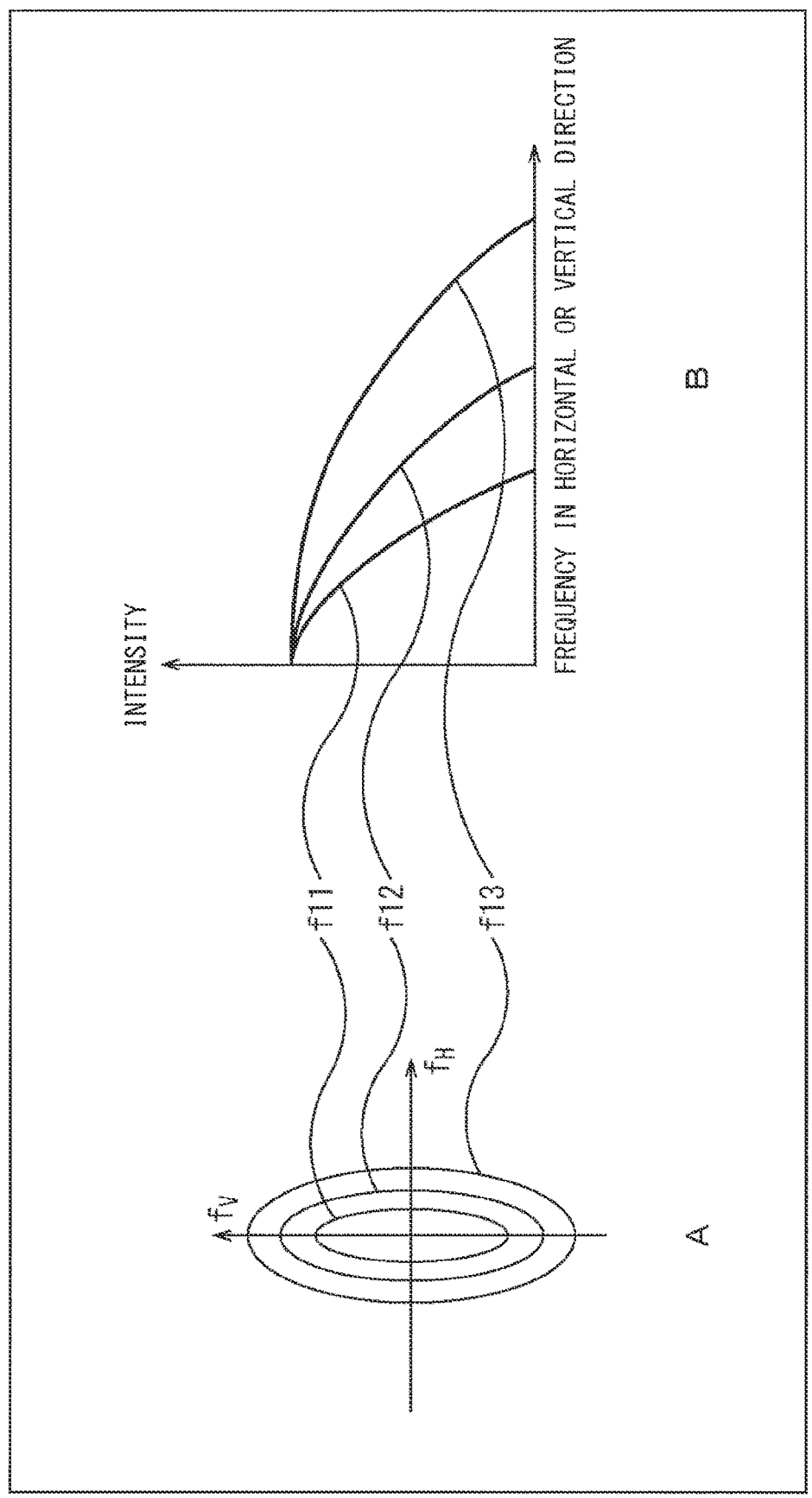
FIG. 25 is a diagram illustrating an example of the frequency characteristic of the image.

FIG. 25 is a diagram illustrating an example of a frequency characteristic of an image.

That is, A of FIG. 25 illustrates the distribution of frequency components of an image with the frequency $f_H$ in the horizontal direction used as the horizontal axis and the frequency $f_V$ in the vertical direction used as the vertical axis similarly to FIG. 22. B of FIG. 25 illustrates a frequency characteristic of an image with the frequency (in the horizontal direction or the vertical direction) used as the horizontal axis and the intensity of frequency components used as the vertical axis similarly to FIG. 10.

In A of FIG. 25, each of ellipse-shaped frequency characteristics f11, f12, and f13 that are vertically long is a frequency characteristic of an image having a large number of high frequency components in the vertical direction, and a small number of high frequency components in the horizontal direction. That is, for example, each of the frequency characteristics f11, f12, and f13 is a frequency characteristic of an image having a large number of horizontal edge regions in which edges in the horizontal direction are dominant.

The frequency characteristics f11, f12, and f13 are, however, frequency characteristics with a larger number of higher frequency components in the order of f13, f12, and f11.

Images having the respective frequency characteristics f11, f12, and f13 each have a large number of horizontal edge regions, and high frequency components in the vertical direction. However, the image having the frequency characteristic f12 has higher frequency components in the vertical direction than those of the image having the frequency characteristic f11, and the image having the frequency characteristic f13 has higher frequency components in the vertical direction than those of the image having the frequency characteristic f12.

Classifying the pixel of interest in the inclination/reliability class c #m into the final class c #m #j by using the TV norm TVxy allows the pixel of interest of even an image having high frequency components in the same direction to be classified into a different class in accordance with the frequency of the high frequency components of the image.

As a result, even in a case where an image has high frequency components in the same direction, it is possible to learn a tap coefficient for each class whenever the frequency of the high frequency components is different, and separate tap coefficients for use in the ALF process.

Figure 26:
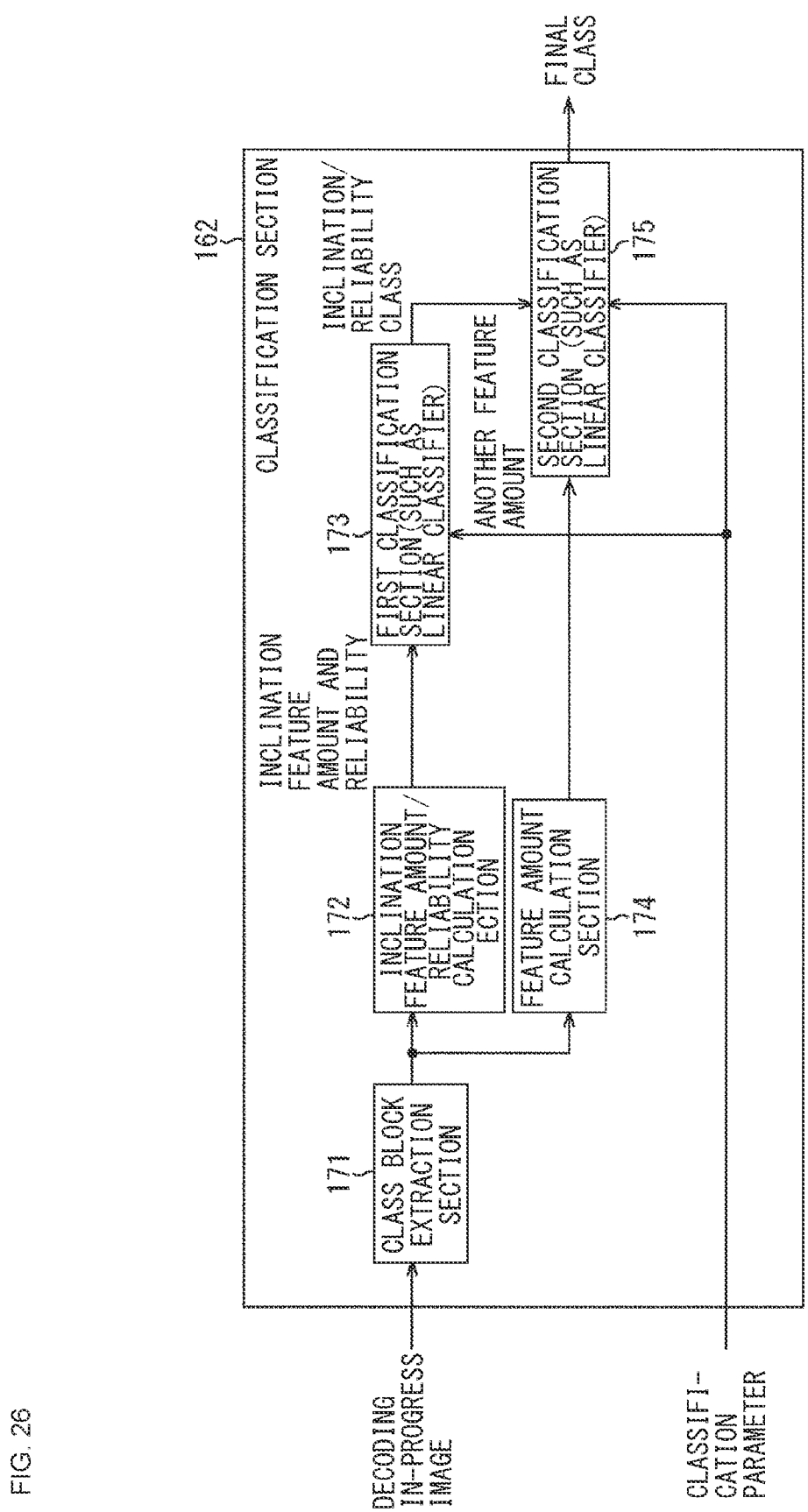
FIG. 26 is a block diagram illustrating a configuration example of a classification section 162.

FIG. 26 is a block diagram illustrating a configuration example of the classification section 162 of FIG. 6.

In FIG. 26, the classification section 162 includes a class block extraction section 171, an inclination feature amount/ reliability calculation section 172, a first classification section 173, a feature amount calculation section 174, and a second classification section 175.

The class block extraction section 171 is supplied with the decoding in-progress image from the SAO 109 (FIG. 4). The class block extraction section 171 extracts (the pixels serving as) the class block of the pixel of interest from the decoding in-progress image from the SAO 109, and supplies the inclination feature amount/reliability calculation section 172 and the feature amount calculation section 174 therewith.

The inclination feature amount/reliability calculation section 172 uses the class block of the pixel of interest from the class block extraction section 171 to calculate the inclination feature amount θ* and the reliability tr of the inclination feature amount θ*, and supplies the first classification section 173 therewith. The inclination feature amount θ* serves as the (image) feature amount of the pixel of interest.

The first classification section 173 includes, for example, a linear classifier and the like. The first classification section 173 uses the inclination feature amount θ* of the pixel of interest from the inclination feature amount/reliability calculation section 172 and the reliability tr of the inclination feature amount θ* to classify the pixel of interest, and supplies the second classification section 175 with the inclination/reliability class of the pixel of interest resulting from the classification.

It is to be noted that the first classification section 173 is supplied with the threshold THtr (FIG. 23) of the reliability tr from the classification parameter generation unit 131. The threshold THtr serves as a classification parameter. The first classification section 173 compares the reliability tr with the threshold THtr of the reliability tr to classify the pixel of interest, for example, as described in FIG. 23.

The feature amount calculation section 174 uses the class block of the pixel of interest from the class block extraction section 171 to calculate, for example, the TV norm TVxy serving as another feature amount of the pixel of interest, and supplies the second classification section 175 therewith.

The second classification section 175 includes, for example, a linear classifier and the like. The second classification section 175 uses the TV norm TVxy of the pixel of interest supplied from the feature amount calculation section 174 to classify the pixel of interest in the inclination/reliability class supplied from the first classification section 173, and outputs the final class of the pixel of interest resulting from the classification (to the summing section 163 (FIG. 6)).

It is to be noted that the second classification section 175 is supplied with the threshold TH(c #m, j) (FIG. 24) of the inclination/reliability class c #m from the classification parameter generation unit 131. The threshold TH(c #m, j) serves as a classification parameter. The second classification section 175 compares the TV norm TVxy of the pixel of interest with the threshold TH(c #m, j) of the inclination/reliability class c #m of the pixel of interest to classify the pixel of interest in the inclination/reliability class c #m, for example, as described in FIG. 24.

Here, it is possible to perform the classification by using not only the (image) feature amount of the pixel of interest, but also encoding information of the pixel of interest, for example, QP. CBF, or the like of the pixel of interest.

<Configuration Example of ALF Processing Unit 133>

Figure 27:
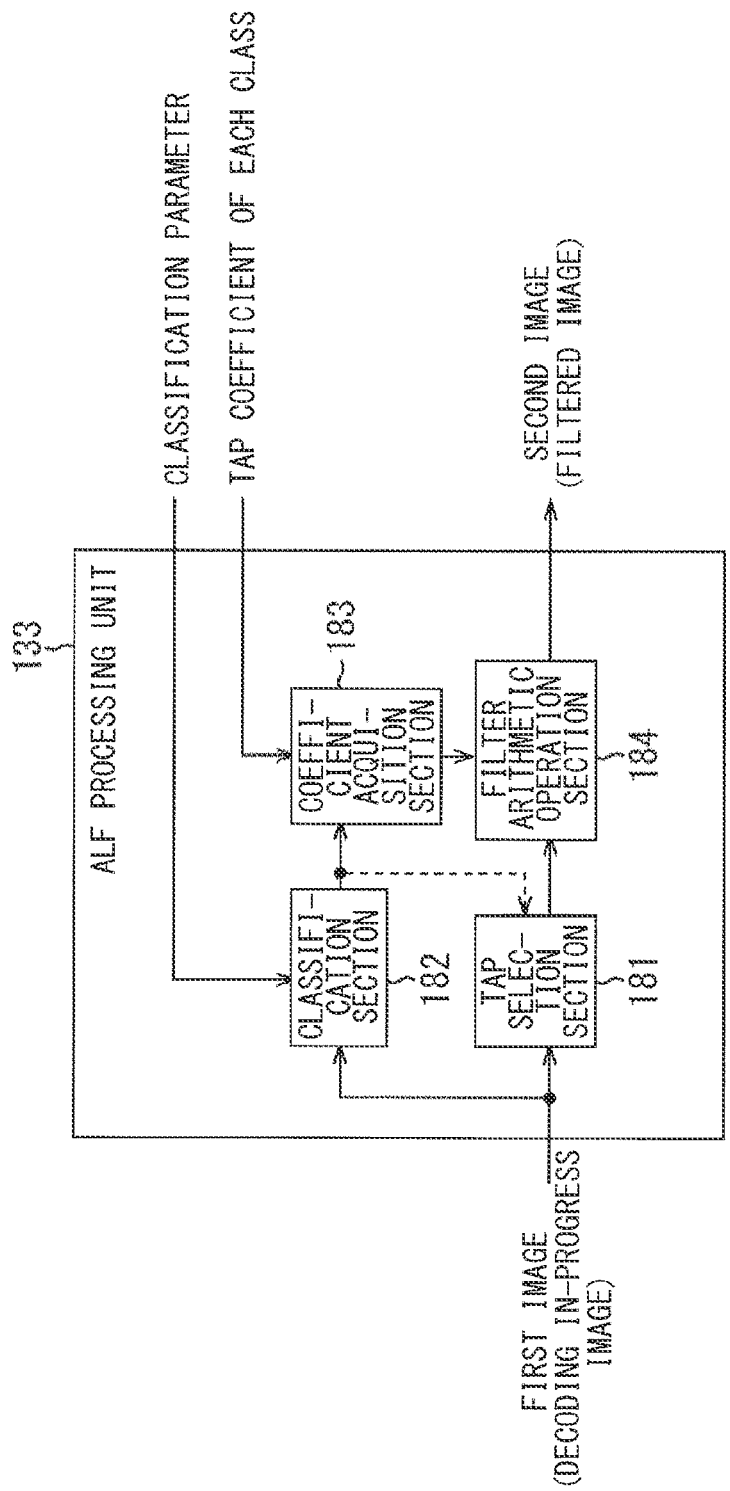
FIG. 27 is a block diagram illustrating a configuration example of an ALF processing unit 133.

FIG. 27 is a block diagram illustrating a configuration example of the ALF processing unit 133 of FIG. 5.

In FIG. 27, the ALF processing unit 133 includes a tap selection section 181, a classification section 182, a coefficient acquisition section 183, and a filter arithmetic operation section 184.

The tap selection section 181 to the filter arithmetic operation section 184 perform the respective processes similar to those of the tap selection section 21 to the filter arithmetic operation section 24 of the ALF processing unit 20 of FIG. 2.

That is, the ALF processing unit 133 is supplied with a decoding in-progress image similar to the decoding in-progress image supplied to the learning unit 132 (FIG. 5). The decoding in-progress image serves as the first image. The ALF processing unit 133 uses the decoding in-progress image serving as the first image to perform an ALF process similar to that of the ALF processing unit 20 of FIG. 2, and obtains a filtered image serving as (the predicted value of) the second image corresponding to the original image.

The ALF processing unit 133 is, however, supplied with a classification parameter from the classification parameter generation unit 131 (FIG. 5), and supplied with a tap coefficient for each class (final class) from the learning unit 132.

In the ALF processing unit 133, the tap selection section 181 selects the pixel of interest from the decoding in-progress image. Further, the tap selection section 181 selects a pixel serving as a prediction tap from the decoding in-progress image for the pixel of interest. This configures a prediction tap having the same tap structure as that in a case of the tap selection section 161 of the learning unit 132 (FIG. 6), and supplies the coefficient acquisition section 183 therewith.

The classification section 182 uses the decoding in-progress image and the classification parameter from the classification parameter generation unit 131 to perform the same classification for the pixel of interest as that in a case of the classification section 162 of the learning unit 132 (FIG. 6), and supplies the coefficient acquisition section 183 with the final class of the pixel of interest resulting from the classification.

The coefficient acquisition section 183 stores the tap coefficients supplied from the learning unit 132 (FIG. 5), acquires (reads out), from the tap coefficients, the tap coefficient of the final class of the pixel of interest supplied from the classification section 182, and supplies the filter arithmetic operation section 184 therewith.

The filter arithmetic operation section 184 uses the prediction tap of the pixel of interest supplied from the tap selection section 181 and the tap coefficient of the class of the pixel of interest supplied from the coefficient acquisition section 183 to perform the filter arithmetic operation of Expression (1), and obtains and outputs the pixel value (predicted value of the pixel value of the pixel of the original image that corresponds to the pixel of interest) of the corresponding pixel of the filtered image similarly to the filter arithmetic operation section 24 of FIG. 2.

It is to be noted that, as described in FIG. 6, in a case where the learning unit 132 supplies the class of the pixel of interest obtained by the classification section 162 to the tap selection section 161, and the tap selection section 161 changes the tap structure of the prediction tap in accordance with the class of the pixel of interest, the class (final class) of the pixel of interest is also supplied from the classification section 182 to the tap selection section 181 in the ALF processing unit 133 as indicated by the dotted line in FIG. 27, and the tap selection section 181 changes the tap structure of the prediction tap in accordance with the class of the pixel of interest. In a case where the tap structure of the prediction tap is changed in accordance with the class, that is, in a case where each class has a different tap structure for the prediction tap, the tap structure of the tap coefficient used for a filter arithmetic operation with (the pixel value of) a pixel serving as the prediction tap is also different in accordance with the class.

Figure 28:
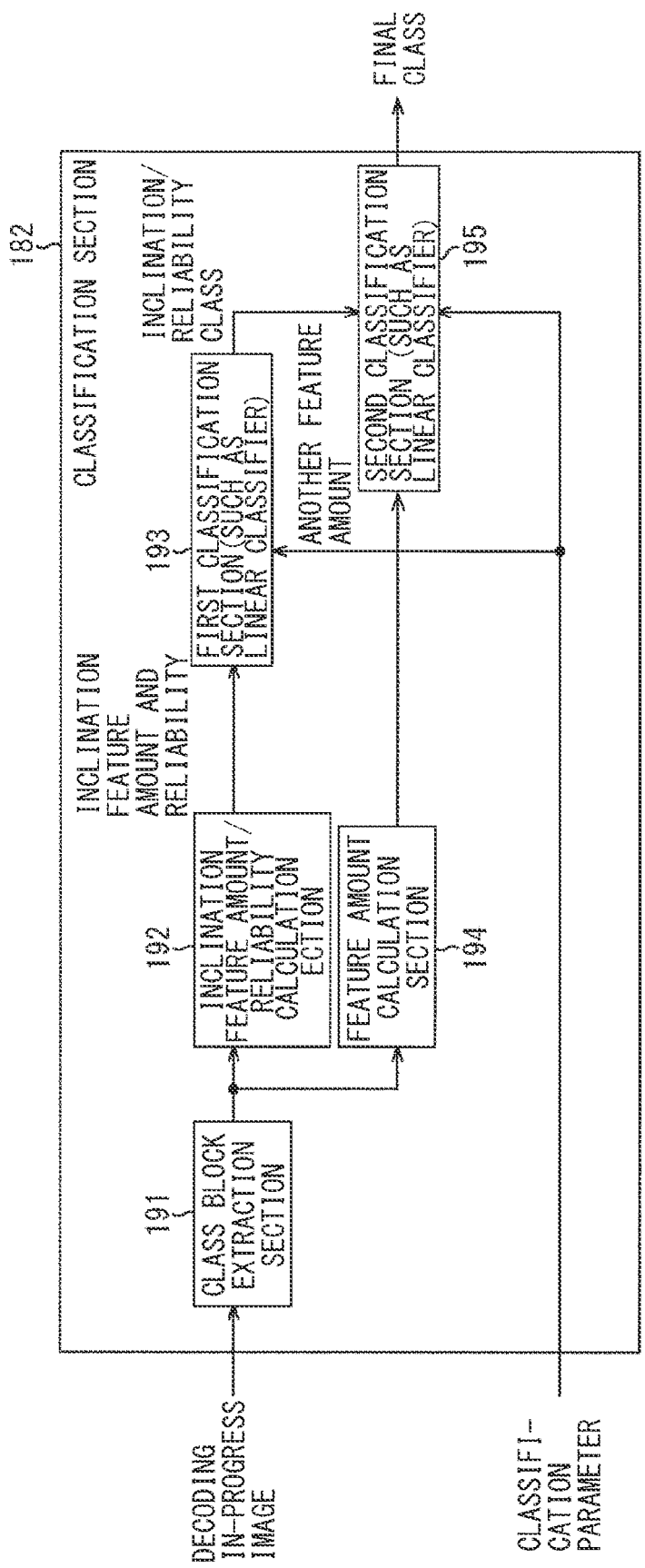
FIG. 28 is a block diagram illustrating a configuration example of a classification section 182.

FIG. 28 is a block diagram illustrating a configuration example of the classification section 182 of FIG. 27.

In FIG. 28, the classification section 182 includes a class block extraction section 191, an inclination feature amount/reliability calculation section 192, a first classification section 193, a feature amount calculation section 194, and a second classification section 195.

In the classification section 182, the class block extraction section 191 to the second classification section 195 are configured in a manner similar to that of the class block extraction section 171 to the second classification section 175 of the classification section 162 of FIG. 26. This causes the classification section 182 to perform classification similar to that of the classification section 162 of FIG. 26 for the pixel of interest.

<Encoding Process>

Figure 29:
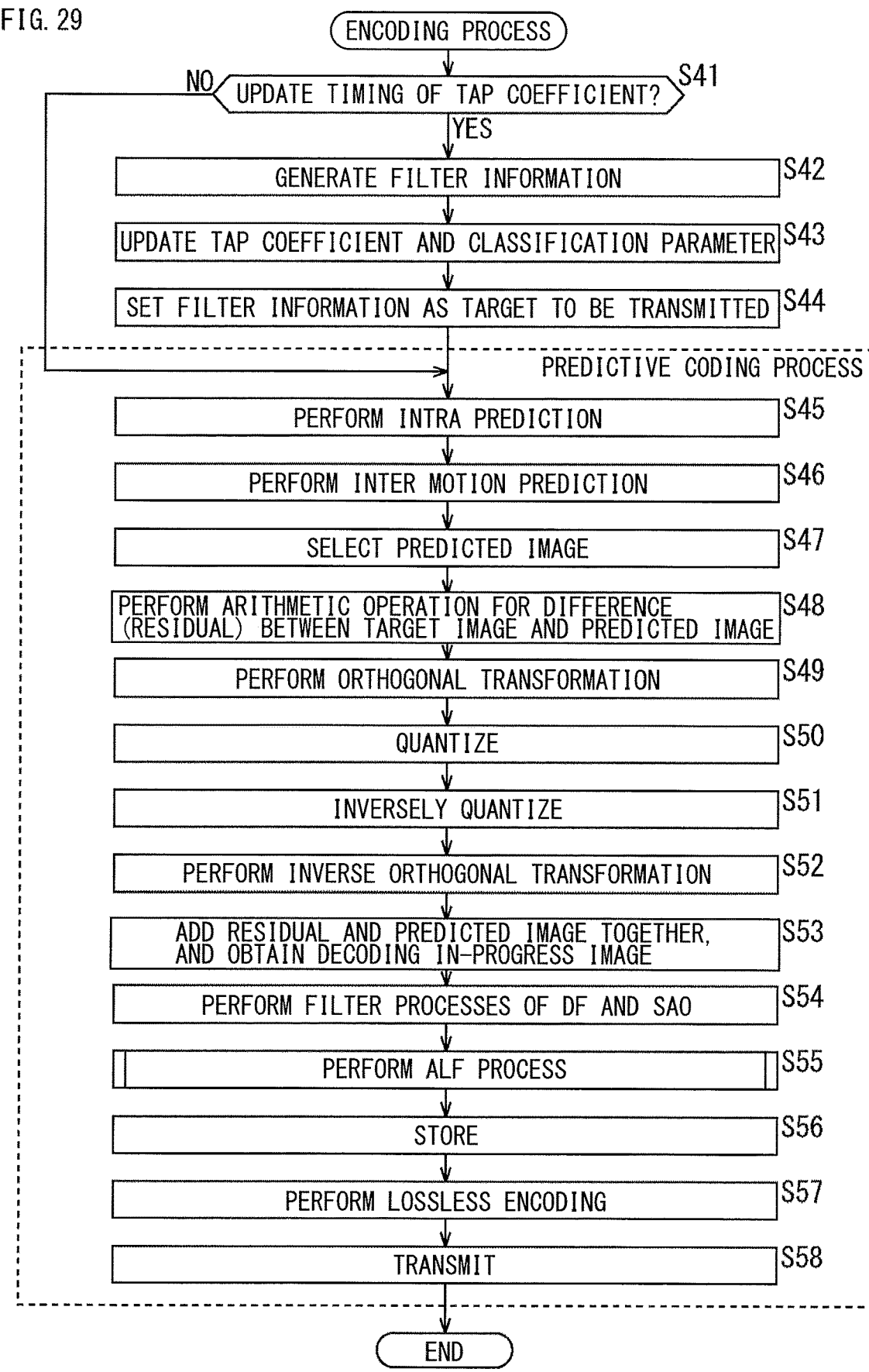
FIG. 29 is a flowchart describing an example of an encoding process of the image encoding device 100.

FIG. 29 is a flowchart describing an example of an encoding process of the image encoding device 100 of FIG. 4.

It is to be noted that the order of the respective steps of the encoding process illustrated in FIG. 29 is an order for the convenience of the description, and the respective steps of the encoding process are actually performed in parallel in a necessary order as appropriate.

In the image encoding device 100, the classification parameter generation unit 131 (FIG. 5) of the ALF 110 generates a classification parameter used for tap coefficient learning or classification of an ALF process as necessary. Similarly, the learning unit 132 (FIG. 5) of the ALF 110 uses a decoding in-progress image that is supplied thereto as a student image, and uses the original image corresponding to the decoding in-progress image as a teacher image to perform tap coefficient learning as necessary. The decoding in-progress image has an update unit, for example, a plurality of frames, one frame, a block, or the like of the decoding in-progress image. It is to be noted that the classification of tap coefficient learning by the learning unit 132 is performed by using the latest classification parameter generated by the classification parameter generation unit 131.

In step S41, the learning unit 132 determines whether or not the current timing is update timing serving as predetermined timing for updating a tap coefficient. That is, the learning unit 132 determines whether or not the current timing is the timing of the end point or start point of an update unit, for example, a plurality of frames, one frame, a block, or the like.

In a case where it is determined in step S41 that it is not update timing of the tap coefficient, the process skips step S42 to S44 and proceeds to step S45.

In addition, in a case where it is determined in step S41 that it is update timing of the tap coefficient, the process proceeds to step S42.

In step S42, the ALF 110 generates filter information and supplies the lossless encoding unit 104 (FIG. 4) therewith, and the process proceeds to step S43. The filter information includes the latest classification parameter generated by the classification parameter generation unit 131 and the tap coefficient for each class (final class) generated by the learning unit 132 through the latest tap coefficient learning.

It is to be noted that the ALF 110 detects the correlation of the original image in the time direction. Only in a case where the correlation is low (in a case where the correlation is less than or equal to a threshold), it is possible to generate the filter information in step S42 at the update timing and perform the processes of steps S43 and S44 described below.

In step S43, the ALF processing unit 133 (FIG. 5) updates the classification parameter used by the classification section 182 (FIG. 27) for classification by using the latest classification parameter generated by the classification parameter generation unit 131. Further, the ALF processing unit 133 updates the tap coefficient for each class (final class) stored in the coefficient acquisition section 183 (FIG. 27) by using the tap coefficient generated by the learning unit 132 through the latest tap coefficient learning, and the process proceeds to step S44 from step S43.

In step S44, the lossless encoding unit 104 sets the filter information supplied from the ALF 110 in the immediately previous step S42 as a target to be transmitted, and the process proceeds to step S45. The filter information set as a target to be transmitted is encoded and included in the encoded data for transmission in step S57 described below.

In step S45 and the following steps, the predictive encoding process of the original image is performed.

That is, in step S45, the prediction unit 112 performs an intra prediction process in the intra prediction mode, and the process proceeds to step S46. In step S46, the prediction unit 112 performs an inter motion prediction process of performing motion prediction or motion compensation in the inter prediction mode, and the process proceeds to step S47.

In the intra prediction process of the prediction unit 112 and the inter motion prediction process of the prediction unit 112, arithmetic operations are performed on the cost functions of various prediction modes, and predicted images are generated.

In step S47, the prediction unit 112 determines an optimal prediction mode on the basis of the cost function. The prediction unit 112 then selects and outputs a predicted image of the optimal prediction mode, and the process proceeds to step S48 from step S47.

In step S48, the arithmetic operation unit 101 performs an arithmetic operation for a residual between the original image that is an image to be encoded and the predicted image to be outputted from the prediction unit 112 and supplies the orthogonal transform unit 102 therewith, and the process proceeds to step S49.

In step S49, the orthogonal transform unit 102 performs orthogonal transformation on the residual from the arithmetic operation unit 101, and supplies the resultant transformation coefficient to the quantization unit 103, and the process proceeds to step S50.

In step S50, the quantization unit 103 quantizes the transformation coefficient from the orthogonal transform unit 102, and supplies a quantization coefficient obtained from the quantization to the lossless encoding unit 104 and the inverse quantization unit 105, and the process proceeds to step S51.

In step S51, the inverse quantization unit 105 inversely quantizes the quantization coefficient from the quantization unit 103, and supplies the resultant transformation coefficient to the inverse orthogonal transform unit 106, and the process proceeds to step S52. In step S52, the inverse orthogonal transform unit 106 performs inverse orthogonal transformation on the transformation coefficient from the inverse quantization unit 105, and supplies the resultant residual to the arithmetic operation unit 107, and the process proceeds to step S53.

In step S53, the arithmetic operation unit 107 adds the residual from the inverse orthogonal transform unit 106 and the predicted image outputted by the prediction unit 112 together, and generates a decoding in-progress image corresponding to the original image for which an arithmetic operations is performed on the residual in the arithmetic operation unit 101. The arithmetic operation unit 107 supplies the decoding in-progress image to the DF 108, and the process proceeds to step S54 from step S53.

In step S54, the DF 108 performs a filter process of DF on the decoding in-progress image from the arithmetic operation unit 107, and supplies the SAO 109 therewith. Further, in step S54, the SAO 109 performs a filter process of SAO on the decoding in-progress image from the DF 108 and supplies the ALF 110 therewith, and the process proceeds to step S55.

In step S55, the ALF 110 performs an ALF process on the decoding in-progress image from the SAO 109 and supplies a filtered image resulting from the ALF process to the DPB 111, and the process proceeds to step S56 from step S55.

In step S56, the DPB 111 stores the filtered image supplied from the ALF 110 as a decoded image, and the process proceeds to step S57. The decoded image stored in the DPB 111 is used as necessary in the following step S45 or S46 as a reference image from which a predicted image is generated.

In step S57, the lossless encoding unit 104 encodes the quantization coefficient from the quantization unit 103. Further, the lossless encoding unit 104 encodes encoding information such as the quantization parameter QP used for quantization by the quantization unit 103, a prediction mode obtained in an intra prediction process by the prediction unit 112, a prediction mode obtained in an inter motion prediction process by the prediction unit 112, or motion information as necessary, and includes the encoding information in encoded data.

In addition, the lossless encoding unit 104 encodes the filter information set in step S44 as a target to be transmitted and includes the filter information in the encoded data, and the process proceeds to step S58 from step S57.

In step S58, the lossless encoding unit 104 transmits the encoded data, and the encoding process ends.

Figure 30:
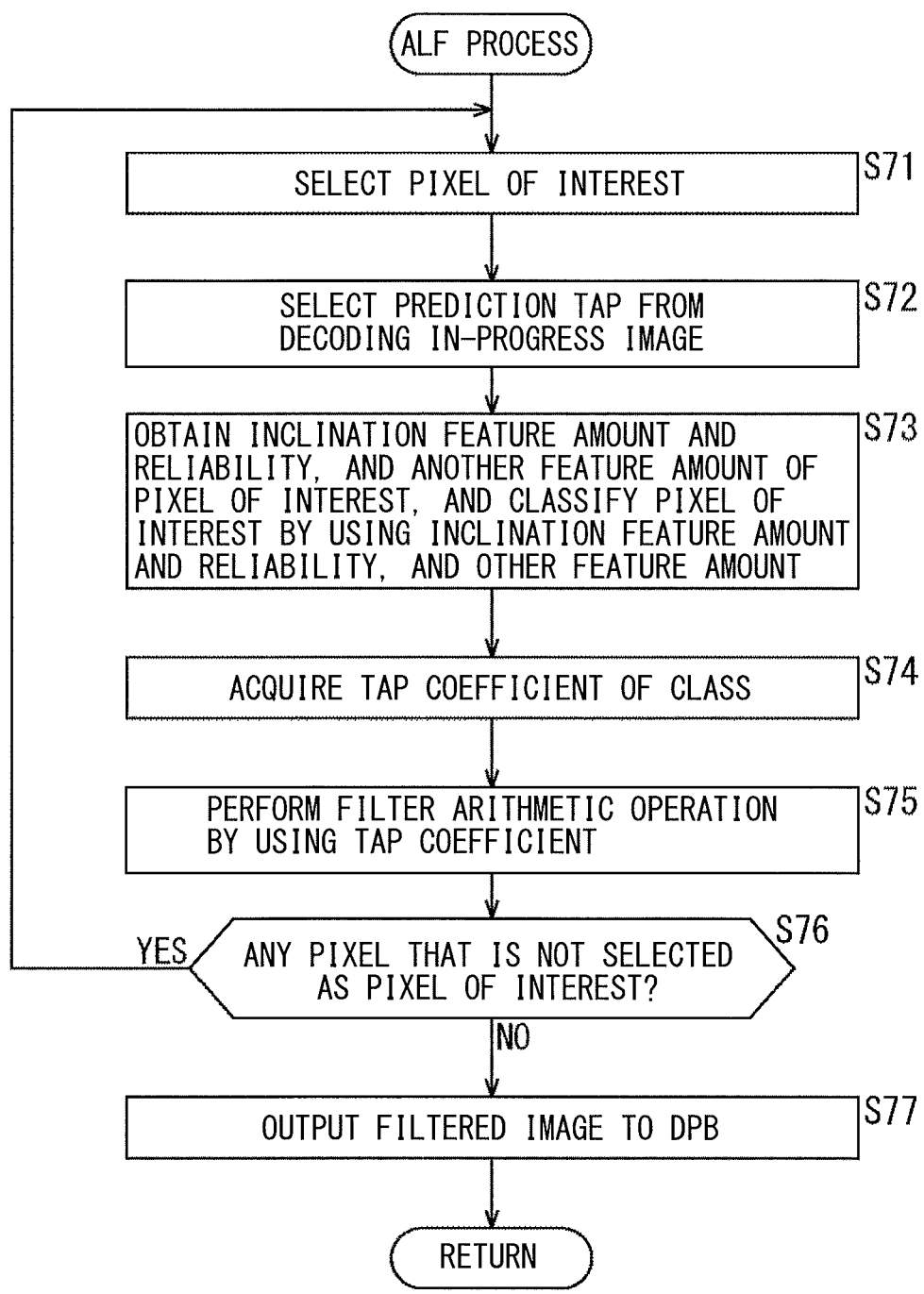
FIG. 30 is a flowchart describing an example of the ALF process.

FIG. 30 is a flowchart describing an example of the ALF process performed in step S55 of FIG. 29.

In the ALF processing unit 133 (FIG. 27) of the ALF 110, in step S71, the tap selection section 181 selects, as a pixel of interest, one of pixels that have not yet been pixels of interest from the pixels of (the block serving as) the decoding in-progress image supplied from the SAO 109 (FIG. 4), and the process proceeds to step S72.

In step S72, the tap selection section 181 selects pixels serving as the prediction tap for the pixel of interest from the decoding in-progress image supplied from the SAO 109, and configures the prediction tap. The tap selection section 181 then supplies the prediction tap to the filter arithmetic operation section 184, and the process proceeds to step S73.

In step S73, the classification section 182 obtains, for example, an inclination feature amount and the reliability of the inclination feature amount, and the TV norm or the like serving as another feature amount for the pixel of interest. Further, the classification section 182 uses the inclination feature amount and the reliability of the inclination feature amount of the pixel of interest, the TV norm or the like, and the classification parameter from the classification parameter generation unit 131 (FIG. 5) to classify the pixel of interest. The classification section 182 supplies the class (final class) of the pixel of interest obtained from the classification to the coefficient acquisition section 183, and the process proceeds from step S73 to step S74.

Here, the classification parameter used for the classification of step S73 is the classification parameter that is updated in the latest step S43 in FIG. 29.

In step S74, the coefficient acquisition section 183 acquires the tap coefficient of the class of the pixel of interest from the classification section 182 from the stored tap coefficients of the respective classes and supplies the filter arithmetic operation section 184 therewith, and the process proceeds to step S75.

Here, the coefficient acquisition section 183 stores the tap coefficient of each class updated in the latest step S43 in FIG. 29.

In step S75, the filter arithmetic operation section 184 uses the prediction tap from the tap selection section 181 and the tap coefficients from the coefficient acquisition section 183 to perform Expression (1) filter process. Accordingly, the filter arithmetic operation section 184 obtains the predicted value of the pixel value of the corresponding pixel of the original image as the pixel value of the filtered image, and the process proceeds to step S76. The corresponding pixel of the original image corresponds to the pixel of interest.

In step S76, the tap selection section 181 determines whether or not the pixels of the decoding in-progress image from the SAO 109 include a pixel that has not yet been a pixel of interest. In a case where it is determined in step S76 that there is a pixel that has not yet been a pixel of interest, the process returns to step S71, and hereinafter, the similar processes are repeated.

In addition, in a case where it is determined in step S76 that there is no pixel that has not yet been a pixel of interest, the process proceeds to step S77. The filter arithmetic operation section 184 supplies the DPB 111 (FIG. 4) with a filtered image including a pixel value obtained for the decoding in-progress image from the SAO 109. Then, the ALF process is ended, and the process returns.

As described above, the image encoding device 100 performs classification of classifying a pixel of interest of the decoding in-progress image into any of a plurality of classes by using an inclination feature amount indicating the tangent direction of a contour line of the pixel values of the pixel of interest, and performs a filter arithmetic operation with the decoding in-progress image by using the tap coefficient of the class of the pixel of interest among the tap coefficients of the respective classes. Thus, the pixel of interest is classified in accordance with the direction (in which direction high frequency components are present) of high frequency components, making it possible to perform a filter arithmetic operation using the tap coefficient appropriate for the direction of the high frequency component of the pixel of interest. Further, the filter arithmetic operation offers a filtered image having a small error with respect to the original image. This makes it possible to improve the coding efficiency.

<Configuration Example of Image Decoding Device 200>

Figure 31:
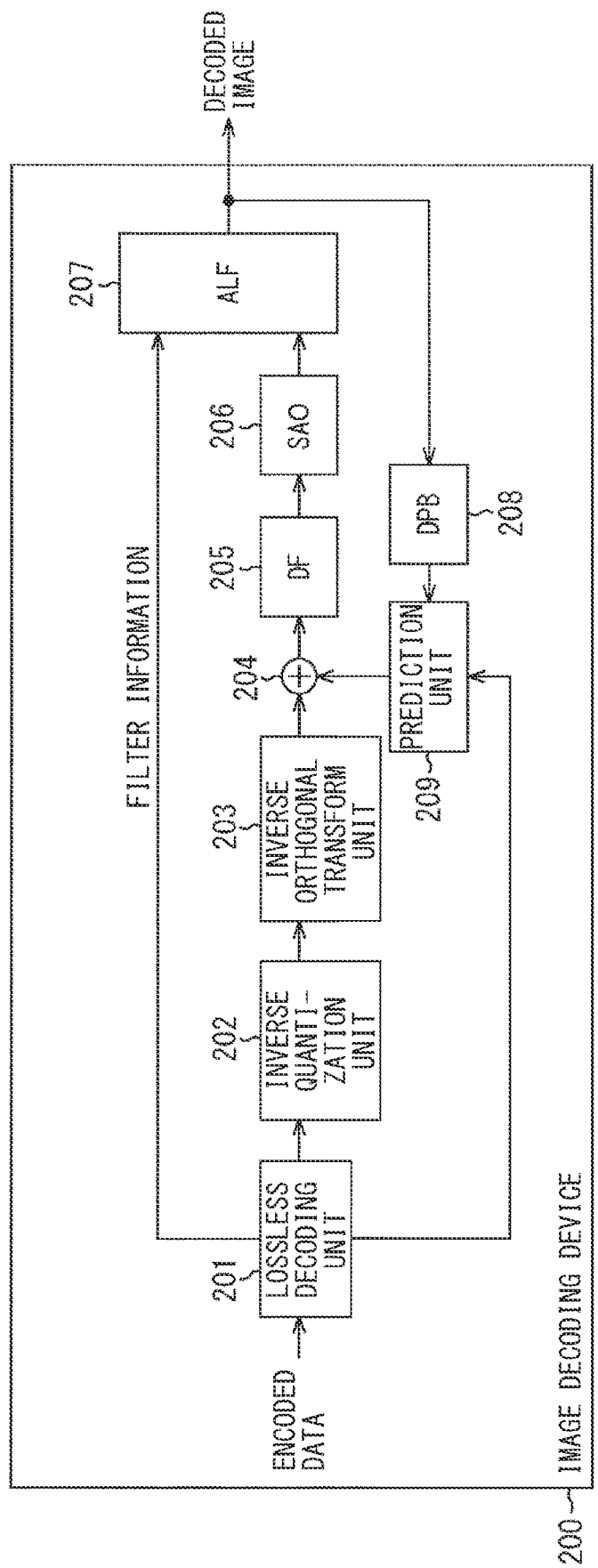
FIG. 31 is a block diagram illustrating a configuration example of an image decoding device 200.

FIG. 31 is a block diagram illustrating a configuration example of the image decoding device 200 of FIG. 1.

In FIG. 31, the image decoding device 200 includes a lossless decoding unit 201, an inverse quantization unit 202, an inverse orthogonal transform unit 203, an arithmetic operation unit 204, DF 205, SAO 206, ALF 207, DPB 208, and a prediction unit 209.

The lossless decoding unit 201 receives encoded data transmitted from the image encoding device 100, thereby acquiring the encoded data. This causes the lossless decoding unit 201 to function as an accepting unit that accepts the encoded data transmitted from the image encoding device 100, and a tap coefficient of each class and a classification parameter that serve as filter information included in the encoded data.

The lossless decoding unit 201 decodes the encoded data with the system corresponding to the coding system of the lossless encoding unit 104 of FIG. 4.

Then, the lossless decoding unit 201 supplies the quantization coefficient obtained by decoding the encoded data to the inverse quantization unit 202.

In addition, in a case where the encoding information or the filter information is obtained by decoding the encoded data, the lossless decoding unit 201 supplies necessary encoding information to the prediction unit 209 or other necessary blocks.

Further, the lossless decoding unit 201 supplies the filter information to the ALF 207.

The inverse quantization unit 202 inversely quantizes the quantization coefficient from the lossless decoding unit 201 with a system corresponding to the quantization system of the quantization unit 103 of FIG. 4, and supplies the transformation coefficient obtained from the inverse quantization to the inverse orthogonal transform unit 203.

The inverse orthogonal transform unit 203 performs inverse orthogonal transformation on the transformation coefficient supplied from the inverse quantization unit 202 with a system corresponding to the orthogonal transformation system of the orthogonal transform unit 102 of FIG. 4, and supplies the resultant residual to the arithmetic operation unit 204.

The arithmetic operation unit 204 is supplied with the residual from the inverse orthogonal transform unit 203, and supplied with the predicted image from the prediction unit 209.

The arithmetic operation unit 204 adds the residual from the inverse orthogonal transform unit 203 and the predicted image from the prediction unit 209 together to generate a decoding in-progress image, and supplies the DF 205 therewith.

The DF 205 performs a filter process similar to that of the DF 108 (FIG. 4) on the decoding in-progress image from the arithmetic operation unit 204, and supplies the SAO 206 with the decoding in-progress image that has been subjected to the filter process.

The SAO 206 performs a filter process similar to that of the SAO 109 (FIG. 4) on the decoding in-progress image from the DF 205, and supplies the ALF 207 therewith.

The ALF 207 uses the decoding in-progress image from the SAO 206 as the first image to perform an ALF process similar to that of the ALF 110 (FIG. 4). This transforms the decoding in-progress image serving as the first image into a filtered image serving as (the predicted value of) the second image corresponding to the original image (generates a filtered image), and outputs the filtered image. The ALF process uses the tap coefficient of each class included in the filter information from the lossless decoding unit 201.

Here, the classification of the ALF process performed by the ALF 207 is performed by using the classification parameter included in the filter information from the lossless decoding unit 201.

The filtered image outputted from the ALF 207 is an image similar to the filtered image outputted from the ALF 110. The filtered image outputted from the ALF 207 is outputted as a decoded image, and supplied to the DPB 208.

The DPB 208 temporarily stores the filtered image supplied from the ALF 207 as a decoded image. Further, the DPB 208 supplies the decoded image to the prediction unit 209 as a reference image used to generate a predicted image.

The prediction unit 209 uses the reference image supplied from the DPB 208 to perform intra prediction in the intra prediction mode used by the prediction unit 112 of FIG. 4 in accordance with the prediction mode included in the encoding information supplied from the lossless decoding unit 201.

In addition, the prediction unit 209 uses the reference image supplied from the DPB 208 to perform inter prediction in the inter prediction mode used by the prediction unit 112 of FIG. 4 in accordance with the prediction mode included in the encoding information supplied from the lossless decoding unit 201. The inter prediction is performed by using the motion information or the like included in the encoding information supplied from the lossless decoding unit 201 as necessary.

The prediction unit 209 supplies the predicted image resulting from the intra prediction or the inter prediction to the arithmetic operation unit 204.

<Configuration Example of ALF 207>

Figure 32:
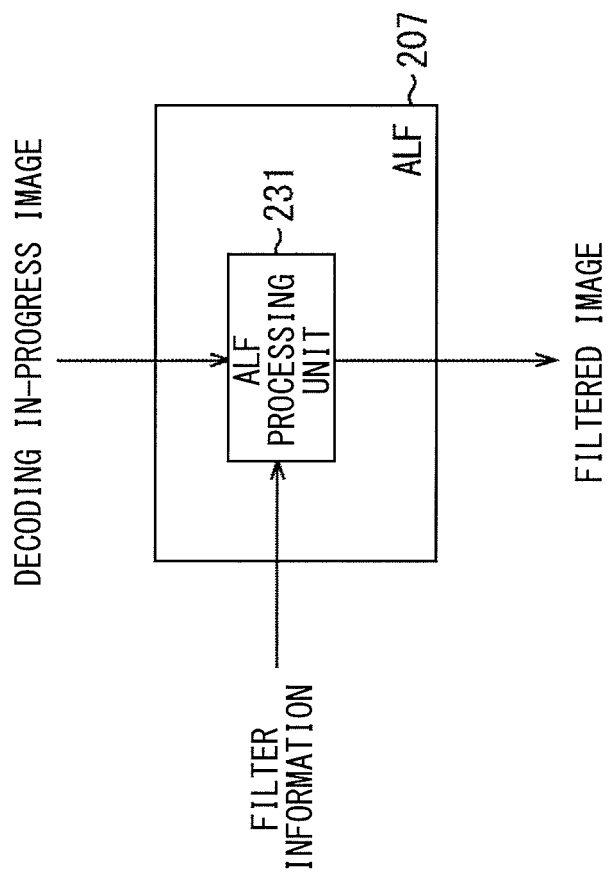
FIG. 32 is a block diagram illustrating a configuration example of ALF 207.

FIG. 32 is a block diagram illustrating a configuration example of the ALF 207 of FIG. 31.

In FIG. 32, the ALF 207 includes an ALF processing unit 231.

The ALF processing unit 231 is supplied with a decoding in-progress image from the SAO 206 (FIG. 31), and supplied with filter information from the lossless decoding unit 201.

The ALF processing unit 231 performs an ALF process similar to that of the ALF processing unit 133 of FIG. 5.

That is, the ALF processing unit 231 uses the decoding in-progress image as the first image to perform the same classification as the classification performed by the ALF processing unit 133 with the classification parameter included in the filter information. Further, the ALF processing unit 231 performs a filter arithmetic operation using the tap coefficient of the class resulting from the classification among the tap coefficients of the respective classes included in the filter information, thereby transforming the decoding in-progress image serving as the first image into a filtered image serving as (the predicted value of) the second image corresponding to the original image (generating a filtered image), and outputting the filtered image as a decoded image and supplying the DPB 208 (FIG. 31) therewith.

<Configuration Example of ALF Processing Unit 231>

Figure 33:
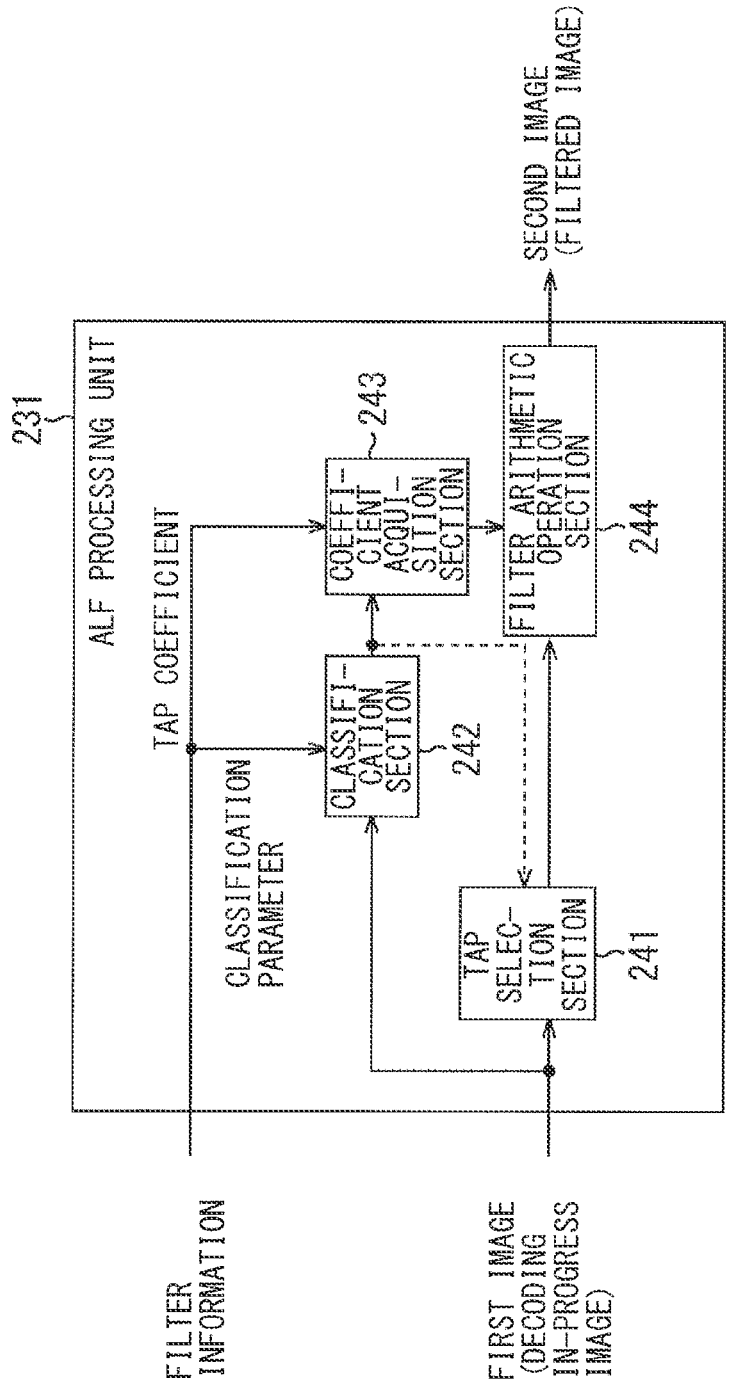
FIG. 33 is a block diagram illustrating a configuration example of an ALF processing unit 231.

FIG. 33 is a block diagram illustrating a configuration example of the ALF processing unit 231 of FIG. 32.

In FIG. 33, the ALF processing unit 231 includes a tap selection section 241, a classification section 242, a coefficient acquisition section 243, and a filter arithmetic operation section 244.

The tap selection section 241 to the filter arithmetic operation section 244 are respectively configured in a manner similar to that of the tap selection section 181 to the filter arithmetic operation section 184 included in the ALF processing unit 133 (FIG. 27).

That is, the decoding in-progress image is supplied to the tap selection section 241 from the SAO 206 (FIG. 31).

The tap selection section 241 uses the decoding in-progress image from the SAO 206 as the first image, and sequentially selects the pixels of the decoding in-progress image serving the first image as pixels of interest.

Further, the tap selection section 241 selects the prediction tap having the same structure as that of the prediction tap selected by the tap selection section 181 of FIG. 27 from the decoding in-progress image for the pixels of interest, and supplies the filter arithmetic operation section 244 therewith.

The classification section 242 is supplied with the filter information from the lossless decoding unit 201 (FIG. 31), and supplied with the decoding in-progress image from the SAO 206.

The classification section 242 performs classification similar to that of the classification section 182 (FIG. 27) for the pixel of interest by using the classification parameter included in the filter information from the lossless decoding unit 201 and (the class block of the pixel of interest obtained from) the decoding in-progress image from the SAO 206, and supplies the resulting class of the pixel of interest to the coefficient acquisition section 243.

The coefficient acquisition section 243 stores the tap coefficient for each class (final class) included in the filter information from the lossless decoding unit 201 (FIG. 31), acquires the tap coefficient of the class of the pixel of interest from the classification section 242 from the tap coefficients of the respective classes, and supplies the filter arithmetic operation section 244 therewith.

The filter arithmetic operation section 244 uses the prediction tap from the tap selection section 241 and the tap coefficient from the coefficient acquisition section 243 to perform the filter arithmetic operation of Expression (1). The filter arithmetic operation section 244 obtains the predicted value of the pixel value of the corresponding pixel of the second image serving as the original image as the pixel value of a pixel of the filtered image, and outputs the predicted value. The corresponding pixel of the second image corresponds to the pixel of interest of the decoding in-progress image.

It is to be noted that, as described in FIG. 27, in a case where the ALF processing unit 133 supplies the class of the pixel of interest from the classification section 182 to the tap selection section 181, and the tap selection section 181 changes the tap structure of the prediction tap in accordance with the class of the pixel of interest, the class of the pixel of interest is also supplied from the classification section 242 to the tap selection section 241 in the ALF processing unit 231 as indicated by the dotted line in FIG. 33, and the tap selection section 241 changes the tap structure of the prediction tap in accordance with the class of the pixel of interest. In a case where the tap structure of the prediction tap is changed in accordance with the class, that is, in a case where each class has a different tap structure for the prediction tap, the tap structure of the tap coefficient used for a filter arithmetic operation with (the pixel value of) a pixel serving as the prediction tap is also different in accordance with the class.

Figure 34:
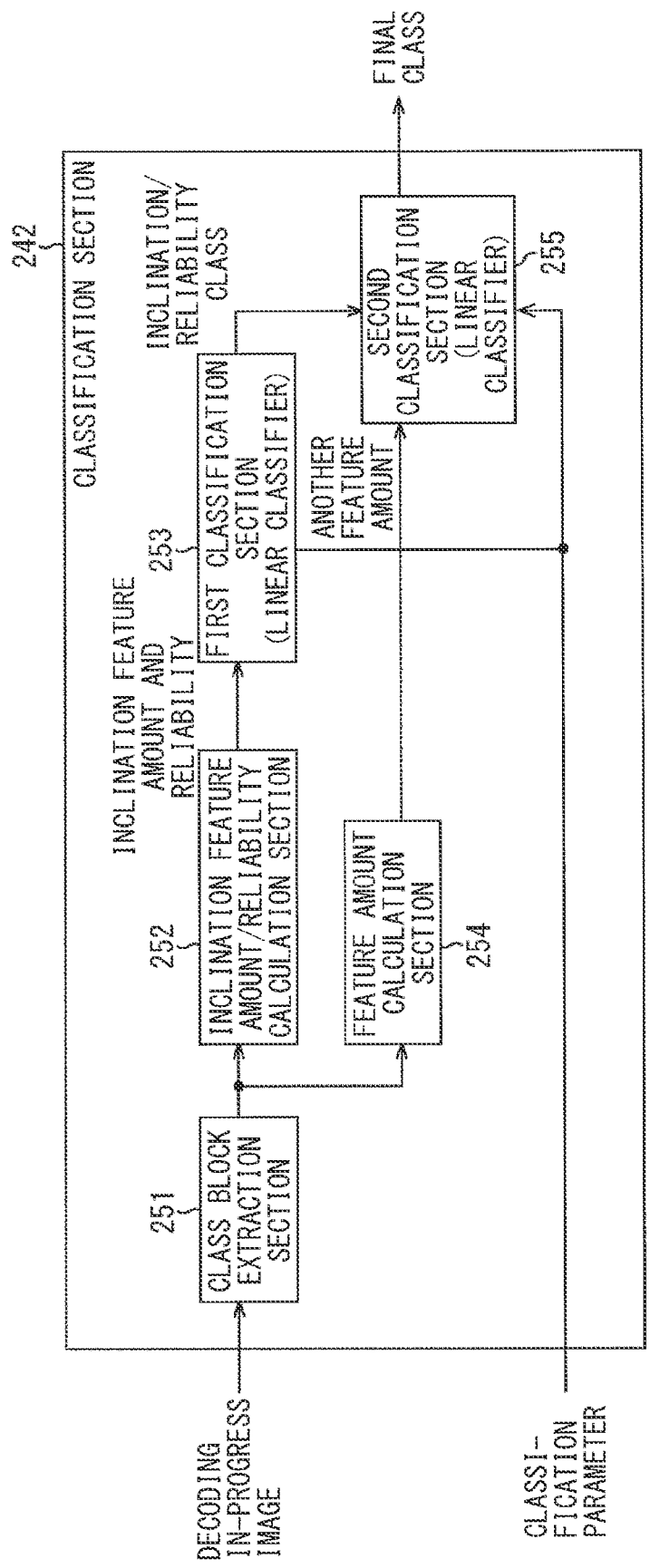
FIG. 34 is a block diagram illustrating a configuration example of a classification section 242.

FIG. 34 is a block diagram illustrating a configuration example of the classification section 242 of FIG. 33.

In FIG. 34, the classification section 242 includes a class block extraction section 251, an inclination feature amount/reliability calculation section 252, a first classification section 253, a feature amount calculation section 254, and a second classification section 255.

In the classification section 242, the class block extraction section 251 to the second classification section 255 are configured in a manner similar to that of the class block extraction section 191 to the second classification section 195 of the classification section 182 of FIG. 28. This causes the classification section 242 to perform classification similar to that of the classification section 182 of FIG. 28 for the pixel of interest.

<Decoding Process>

Figure 35:
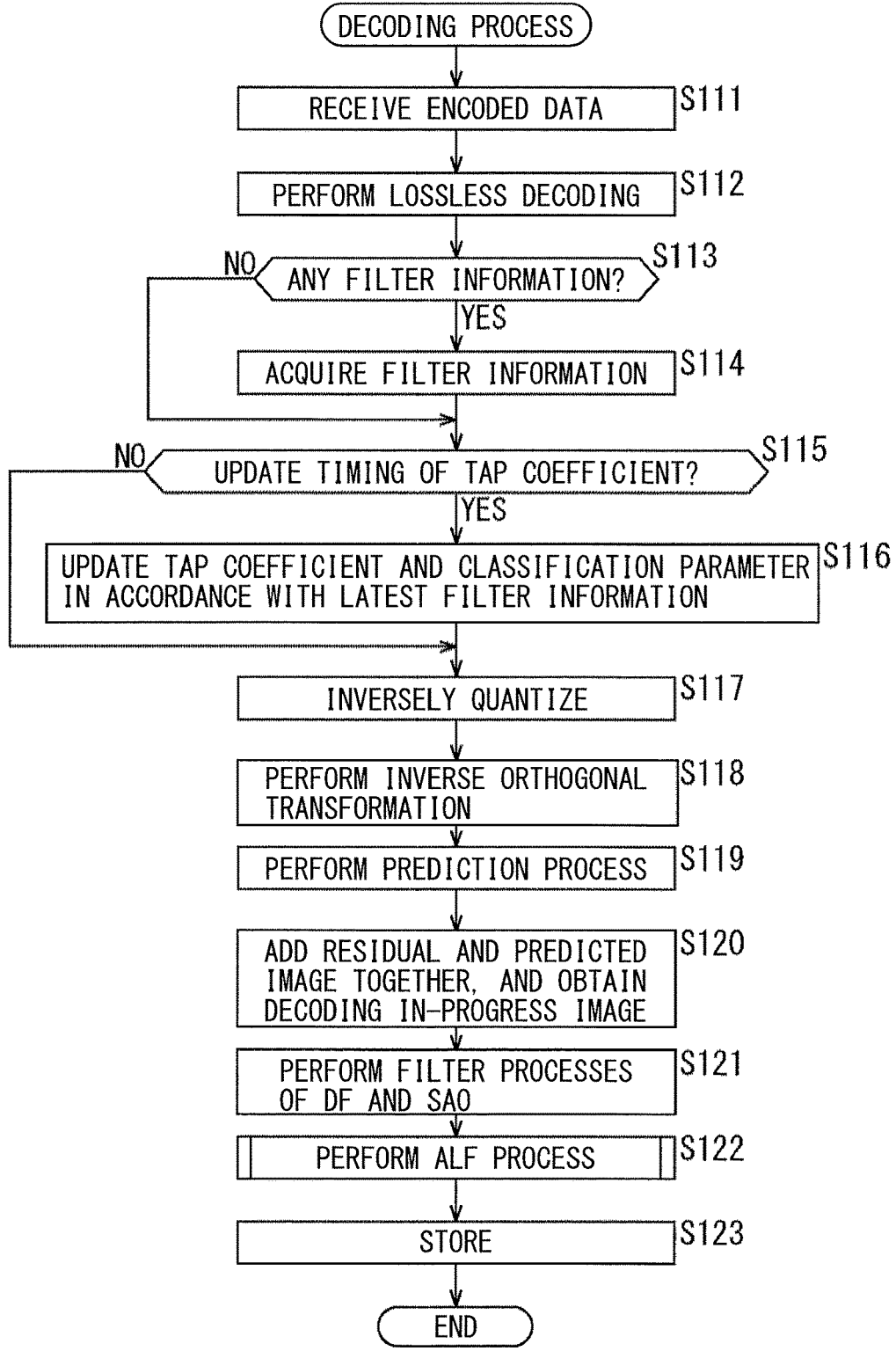
FIG. 35 is a flowchart describing an example of a decoding process of the image decoding device 200.

FIG. 35 is a flowchart describing an example of a decoding process of the image decoding device 200 of FIG. 31.

It is to be noted that the order of the respective steps of the decoding process illustrated in FIG. 35 is an order for the convenience of the description, and the respective steps of the decoding process are actually performed in parallel in a necessary order as appropriate.

In the decoding process, in step S111, the lossless decoding unit 201 receives encoded data transmitted from the image encoding device 100, and the process proceeds to step S112.

In step S112, the lossless decoding unit 201 decodes the encoded data and supplies the quantization coefficient obtained from the decoding to the inverse quantization unit 202.

In addition, in a case where the encoding information or the filter information is obtained by decoding the encoded data, the lossless decoding unit 201 supplies necessary encoding information to the prediction unit 209 or other necessary blocks.

Further, the lossless decoding unit 201 supplies the filter information to the ALF 207.

Afterwards, the process proceeds to step S113 from step S112, and the ALF 207 determines whether or not the filter information is supplied from the lossless decoding unit 201.

In a case where it is determined in step S113 that the filter information is not supplied, the process skips step S114 and proceeds to step S115.

In addition, in a case where it is determined in step S113 that the filter information is supplied, the process proceeds to step S114. The ALF processing unit 231 (FIG. 33) of the ALF 207 acquires (stores) the filter information from the lossless decoding unit 201, and the process proceeds to step S115.

In step S115, the ALF processing unit 231 determines whether or not it is the update timing of a tap coefficient and a classification parameter. That is, the ALF processing unit 231 determines whether or not it is the timing of the end point or start point of an update unit, for example, a plurality of frames, one frame, a block, or the like.

Here, the update unit is recognizable, for example, from the tier (e.g., Sequence parameter set syntax, Picture parameter set syntax, Slice data syntax, or the like) of the encoded data in which the filter information is disposed (included).

For example, in a case where the filter information is disposed as the Picture parameter set syntax of the encoded data, the update unit is recognizable as one frame.

In addition, it is possible to predefine the update unit between the image encoding device 100 and the image decoding device 200.

In a case where it is determined in step S115 that it is not the update timing of a tap coefficient and a classification parameter, the process skips step S116 and proceeds to step S117.

In addition, in a case where it is determined in step S115 that it is update timing of the tap coefficient and the classification parameter, the process proceeds to step S116.

In step S116, the ALF processing unit 231 (FIG. 33) uses the tap coefficient of each class included in the filter information acquired in the immediately previous step S114 to update the tap coefficient of each class stored in the coefficient acquisition section 243. Further, the ALF processing unit 231 uses the classification parameter included in the filter information acquired in the immediately previous step S114 to update the classification parameter that is used by the classification section 242 for classification, and the process proceeds to step S117 from step S116.

In step S117, the inverse quantization unit 202 inversely quantizes the quantization coefficient from the lossless decoding unit 201, and supplies the resultant transformation coefficient to the inverse orthogonal transform unit 203, and the process proceeds to step S118.

In step S118, the inverse orthogonal transform unit 203 performs inverse orthogonal transformation on the transformation coefficient from the inverse quantization unit 202, and supplies the resultant residual to the arithmetic operation unit 204, and the process proceeds to step S119.

In step S119, the prediction unit 209 uses the reference image supplied from the DPB 208 and the encoding information supplied from the lossless decoding unit 201 to perform a prediction process of generating a predicted image. The prediction unit 209 then supplies the predicted image obtained in the prediction process to the arithmetic operation unit 204, and the process proceeds to step S120 from step S119.

In step S120, the arithmetic operation unit 204 adds the residual from the inverse orthogonal transform unit 203 and the predicted image from the prediction unit 209 together, thereby generating a decoding in-progress image. The arithmetic operation unit 204 then supplies the decoding in-progress image to the DF 205, and the process proceeds to step S121 from step S120.

In step S121, the DF 205 performs a filter process of DF on the decoding in-progress image from the arithmetic operation unit 204, and supplies the SAO 206 therewith. Further, in step S121, the SAO 206 performs a filter process of SAO on the decoding in-progress image from the DF 205 and supplies the ALF 207 therewith, and the process proceeds to step S122.

In step S122, the ALF 207 uses the tap coefficient of each class updated in the immediately previous step S116 and the classification parameter to perform an ALF process on the decoding in-progress image from the SAO 206, outputs the filtered image obtained in the ALF process as a decoded image, and supplies the DPB 208 therewith, and the process proceeds to step S123.

In step S123, the DPB 208 stores the filtered image from the ALF 207 as a decoded image, and the decoding process ends. The decoded image stored in the DPB 208 is used as necessary in the following prediction process of step S119 as a reference image from which a predicted image is generated.

Figure 36:
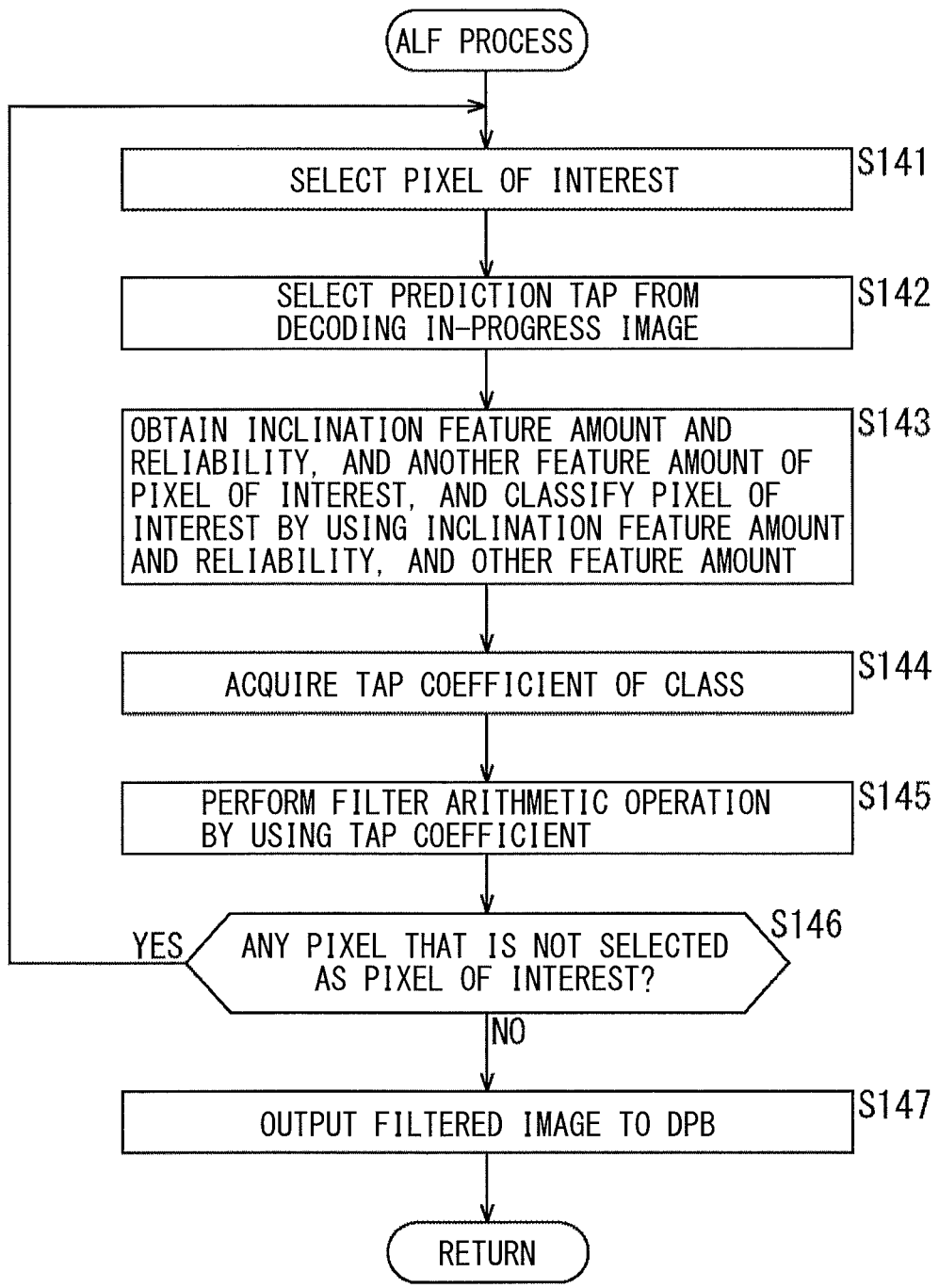
FIG. 36 is a flowchart describing an example of the ALF process.

FIG. 36 is a flowchart describing an example of the ALF process performed in step S122 of FIG. 35.

In the ALF processing unit 231 (FIG. 33) of the ALF 207, in step S141, the tap selection section 241 selects, as a pixel of interest, one of pixels that have not yet been pixels of interest from the pixels of the decoding in-progress image supplied from the SAO 206 (FIG. 31), and the process proceeds to step S142.

In step S142, the tap selection section 241 selects pixels serving as the prediction tap for the pixel of interest from the decoding in-progress image supplied from the SAO 206, and configures the prediction tap. The tap selection section 241 then supplies the prediction tap to the filter arithmetic operation section 244, and the process proceeds from step S142 to step S143.

In step S143, the classification section 242 obtains, for example, an inclination feature amount and the reliability of the inclination feature amount, and the TV norm or the like serving as another feature amount for the pixel of interest. Further, the classification section 242 uses the inclination feature amount and the reliability of the inclination feature amount of the pixel of interest, the TV norm or the like, and the classification parameter to classify the pixel of interest. The classification section 242 supplies the class (final class) of the pixel of interest obtained from the classification to the coefficient acquisition section 243, and the process proceeds from step S143 to step S144.

Here, the classification parameter used for the classification of step S143 is the classification parameter that is updated in the latest step S116 in FIG. 35.

In step S144, the coefficient acquisition section 243 acquires the tap coefficient of the class of the pixel of interest from the classification section 242 from the stored tap coefficients of the respective classes and supplies the filter arithmetic operation section 244 therewith, and the process proceeds to step S145.

Here, the coefficient acquisition section 243 stores the tap coefficient of each class updated in the latest step S116 in FIG. 35.

In step S145, the filter arithmetic operation section 244 uses the prediction tap from the tap selection section 241 and the tap coefficients from the coefficient acquisition section 243 to perform Expression (1) filter process. Accordingly, the filter arithmetic operation section 244 obtains the predicted value of the pixel value of the corresponding pixel of the original image as the pixel value of the filtered image, and the process proceeds to step S114. The corresponding pixel of the original image corresponds to the pixel of interest.

In step S146, the tap selection section 241 determines whether or not the pixels of the decoding in-progress image from the SAO 206 include a pixel that has not yet been a pixel of interest. In a case where it is determined in step S146 that there is a pixel that has not yet been a pixel of interest, the process returns to step S141, and hereinafter, the similar processes are repeated.

In addition, in a case where it is determined in step S146 that there is no pixel that has not yet been a pixel of interest, the process proceeds to step S147. The filter arithmetic operation section 244 outputs, as a decoded image, a filtered image including a pixel value obtained for the decoding in-progress image from the SAO 206, and supplies the DPB 208 (FIG. 31) therewith. Then, the ALF process is ended, and the process returns.

As described above, similarly to the image encoding device 100, the image decoding device 200 performs classification of classifying a pixel of interest of the decoding in-progress image into any of a plurality of classes by using an inclination feature amount indicating the tangent direction of a contour line of the pixel values of the pixel of interest, and performs a filter arithmetic operation with the decoding in-progress image by using the tap coefficient of the class of the pixel of interest among the tap coefficients of the respective classes. Thus, the pixel of interest is classified in accordance with the direction (in which direction high frequency components are present) of high frequency components, making it possible to perform a filter arithmetic operation using the tap coefficient appropriate for the direction of the high frequency component of the pixel of interest. Further, the filter arithmetic operation offers a filtered image having a small error with respect to the original image or a decoded image having favorable S/N (Signal to Noise ratio) and high image quality.

<Efficient Encoding Method of Tap Coefficient>

Figure 37:
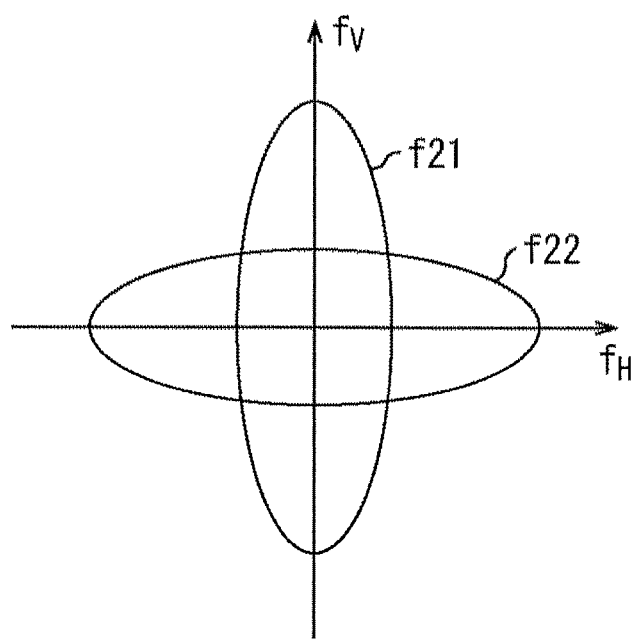
FIG. 37 is a diagram describing an encoding method of efficiently encoding a tap coefficient of each class in a case where classification using an inclination feature amount is performed.

FIG. 37 is a diagram describing an encoding method of efficiently encoding a tap coefficient of each class in a case where the classification using the inclination feature amount is performed.

In the image encoding device 100 (FIG. 4), the ALF 110 performs tap coefficient learning as appropriate. Further, the lossless encoding unit 104 encodes (filter information including) the tap coefficient of each class obtained through the tap coefficient learning, and includes (the filter information including) the tap coefficient for each class in encoded data for transmission.

The tap coefficient of each class is thus the overhead of the encoded data. Accordingly, efficiently encoding the tap coefficient of each class and decreasing the amount of data contribute to improvement in the coding efficiency.

The lossless encoding unit 104 encodes differential coefficients instead of tap coefficients of the class for the second direction into which a pixel having the inclination feature amount indicating the second direction is classified, thereby efficiently encoding the tap coefficients of the respective classes. The differential coefficients include differences between tap coefficients of the class for the first direction into which a pixel having the inclination feature amount indicating the first direction is classified and the tap coefficients of the class for the second direction. The tap coefficients of the class for the first direction are reordered in accordance with the rotational symmetry of the tap coefficients of the class for the first direction and the tap coefficients of the class for the second direction.

Here, for the sake of simplicity, as the classification of tap coefficient learning (and ALF process), classification is adopted in which pixels are classified into any of the M−1 inclination/reliability classes c1 to c #M−1 described in FIGS. 23 and 24 in accordance with the inclination feature amount of the pixels.

FIG. 37 schematically illustrates examples of a frequency characteristic f21 of an image including pixels classified into an inclination/reliability class c #H serving as a class for a first direction, and a frequency characteristic 122 of an image including pixels classified into an inclination/reliability class c #V serving as a class for a second direction.

In FIG. 37, the horizontal axis represents a frequency $f_H$ in the horizontal direction, and the vertical axis represents a frequency $f_V$ in the vertical direction. FIG. 37 uses the frequency $f_H$ in the horizontal direction and the frequency $f_V$ in the vertical direction as axes to indicate the distribution of the frequency components of an image.

In FIG. 37, an ellipse-shaped frequency characteristic f21 that is vertically long is a frequency characteristic of an image having a large number of high frequency components in the vertical direction, and a small number of high frequency components in the horizontal direction. That is, for example, the frequency characteristic f21 is a frequency characteristic of an image having a large number of horizontal edge regions. In addition, an ellipse-shaped frequency characteristic f22 that is horizontally long is a frequency characteristic of an image having a small number of high frequency components in the vertical direction, and a large number of high frequency components in the horizontal direction. That is, for example, the frequency characteristic f22 is a frequency characteristic of an image having a large number of vertical edge regions.

For the pixels of an image having the frequency characteristic f21 or an image having a large number of horizontal edge regions, the inclination feature amount indicating the horizontal direction (first direction) is obtained. As a result, the pixels are classified into the inclination/reliability class c #H for the horizontal direction (class for the first direction).

Meanwhile, for the pixels of an image having the frequency characteristic f22 or an image having a large number of vertical edge regions, the inclination feature amount indicating the vertical direction (second direction) is obtained. As a result, the pixels are classified into the inclination/reliability class c #V for the vertical direction (class for the second direction).

An image including pixels classified into the inclination/reliability class c #H for the horizontal direction and an image including pixels classified into the inclination/reliability class c #V for the vertical direction highly tend to have rotational symmetry of $\pi/2$.

Therefore, tap coefficients (group) of the inclination/reliability class c #H for the horizontal direction and tap coefficients (group) of the inclination/reliability class c #V for the vertical direction are tap coefficients that tend to have rotational symmetry of $\pi/2$.

Here, tap coefficients (group) of a certain class that are disposed at the positions of the pixels of the prediction tap corresponding to the tap coefficients or the pixels of the prediction tap multiplied by the tap coefficients are referred to as tap coefficients disposed in a tap structure.

When tap coefficients of a certain inclination/reliability class and tap coefficients of another inclination/reliability class have rotational symmetry of a predetermined angle, this means that, in a case where one of the tap coefficients of the certain inclination/reliability class or the tap coefficients of the other inclination/reliability class that are disposed in a tap structure are rotated by the predetermined angle, the rotated tap coefficients have high correlation with (tend to have substantially the same values as those of) the other tap coefficients disposed in a tap structure.

It is to be noted that, to provide tap coefficients of a certain inclination/reliability class and tap coefficients of another inclination/reliability class with rotational symmetry of a predetermined angle, it is necessary for one of the tap structure of the tap coefficients of the certain inclination/reliability class or the tap structure of the tap coefficients of the other inclination/reliability class to be the same as the other of the two tap structures when the one of the tap structures is rotated by the predetermined angle.

As described above, tap coefficients of the inclination/reliability class (that is also referred to as horizontal class below) c #H for the horizontal direction and tap coefficients of the inclination/reliability class (that is also referred to as vertical class below) c #V for the vertical direction are tap coefficients that tend to have rotational symmetry of $\pi/2$. Accordingly, for example, the rotated tap coefficients obtained by rotating, by $\pi/2$, tap coefficients of the horizontal class c #H that are disposed in a tap structure are substantially the same as tap coefficients of the vertical class c #V that are disposed in a tap structure.

The lossless encoding unit 104 then encodes tap coefficients w(c #H) of the horizontal class c #H as they are, and transmits the tap coefficients w(c #H).

Afterwards, with respect to the tap coefficients w(c #V) of the vertical class c #V, the lossless encoding unit 104 encodes and transmits differential coefficients δw(c #H) instead of the tap coefficients w(c #V) of the vertical class c #V. The differential coefficients δw(c #H) are differences between tap coefficients R{w(c #H)} of the horizontal class c #H and the tap coefficients w(c #V) of the vertical class c #V. The tap coefficients R{w(c #H)} is obtained by reordering corresponding to the rotational symmetry of the tap coefficients w(c #H) of the horizontal class and the tap coefficients w(c #V) of the vertical class c #V.

That is, the lossless encoding unit 104 reorders the tap coefficients w(c #H) of the horizontal class c #H to obtain the rotated tap coefficients obtained by rotating, by $\pi/2$, the tap coefficients w(c #H) of the horizontal class c #H that are disposed in a tap structure (reorders a plurality of tap coefficients serving as the tap coefficient group w(c #H) of the horizontal class c #H).

These reordered tap coefficients w(c #H) of the horizontal class c #H are described as the tap coefficients R{w(c #H)}. The tap coefficients R{w(c #H)} are the same plurality of tap coefficients as a plurality of tap coefficients serving as the tap coefficient group w(c #H) of the horizontal class c #H, but have a different tap structure (arrangement of a plurality of tap coefficients) from that of the tap coefficient group w(c #H).

The lossless encoding unit 104 subtracts the tap coefficients R{w(c #H)} from the tap coefficients w(c #V) of the vertical class c #V to obtain the differential coefficients δw(c #H). The tap coefficients R(w(c #H)) are obtained by reordering the tap coefficients w(c #H) of the horizontal class c #H.

That is, the tap coefficients w(c #V) of the vertical class c #V are a plurality of tap coefficients, and the plurality of tap coefficients is sequentially represented as V1, V2, . . . from the head. In addition, the tap coefficients R{w(c #H)} are also a plurality of tap coefficients, and the plurality of tap coefficients is sequentially represented as R1, R2, . . . from the head.

The lossless encoding unit 104 subtracts tap coefficients R #i from tap coefficients V #i to obtain subtracted values (group) V1-R1, V2-R2, . . . as the differential coefficients δw(c #H). The tap coefficients V #i occupy the respective places of the plurality of tap coefficients V1, V2, . . . serving as the tap coefficients w(c #V) of the vertical class c #V The tap coefficient R #i occupy the respective corresponding places of the plurality of tap coefficients R1, R2, . . . serving as the tap coefficients R{w(c #H)}.

As described above, the rotated tap coefficients R(w(c #H)) are substantially the same as the tap coefficients w(c #V) of the vertical class c #V that are disposed in a tap structure, and the differential coefficients δw(c #H) thus have small values that are substantially equal to 0 or the like. The rotated tap coefficients R{w(c #H)} are obtained by rotating, by π/2, the tap coefficients of the horizontal class c #H that are disposed in a tap structure.

Thus, the lossless encoding unit 104 encodes the differential coefficients δw(c #H) instead of the tap coefficients w(c #V) of the vertical class c #V, thereby making it possible to efficiently encodes the tap coefficients of the respective classes and improve the coding efficiency.

It is to be noted that, in a case where the lossless encoding unit 104 of the image encoding device 100 encodes and transmits the tap coefficients w(c #H) of the horizontal class c #H and the differential coefficients δw(c #H) as described above, the lossless decoding unit 201 of the image decoding device 200 decodes the tap coefficients w(c #H) of the horizontal class c #H, and further decodes the differential coefficients δw(c #H). Afterwards, the lossless decoding unit 201 of the image decoding device 200 reorders the tap coefficients w(c #H) of the horizontal class c #H, and adds the tap coefficients R{w(c #H)} obtained from the reordering and the differential coefficients δw(c #H) together in accordance with Expression (25), thereby making it possible to decode the differential coefficients δw(c #H) into the tap coefficients w(c #V) of the vertical class c #V.

[Expression 25]

$$w(c\ \#V) = R\{w(c\ \#H)\} + \delta w(c\ \#H) \quad (25)$$

Here, it is possible in the image encoding device 100 (FIG. 4) to calculate the differential coefficients δw(c #H) in not the lossless encoding unit 104, but the ALF 110. In addition, it is possible in the image decoding device 200 (FIG. 31) to decode (restore) the tap coefficients w(c #V) of the vertical class c #V from the differential coefficients δw(c #H) in not the lossless decoding unit 201, but the ALF 207.

Further, in the case described above, the tap coefficients R{w(c #H)} are subtracted from the tap coefficients w(c #V) of the vertical class c #V, thereby obtaining the differential coefficients δw(c #H). The tap coefficients R{w(c #H)} are obtained by reordering the tap coefficients w(c #H) of the horizontal class c #H. Conversely, the differential coefficients δw(c #V) may be, however, obtained by subtracting the tap coefficients R{w(c #V)} from the tap coefficients w(c #H) of the horizontal class c #H. The tap coefficients R{w(c #V)} are obtained by reordering the tap coefficients w(c #V) of the vertical class c #V.

In addition, the predetermined angle for rotational symmetry is not limited to π/2.

<Change in Tap Structure Corresponding to Class>

Figure 38:
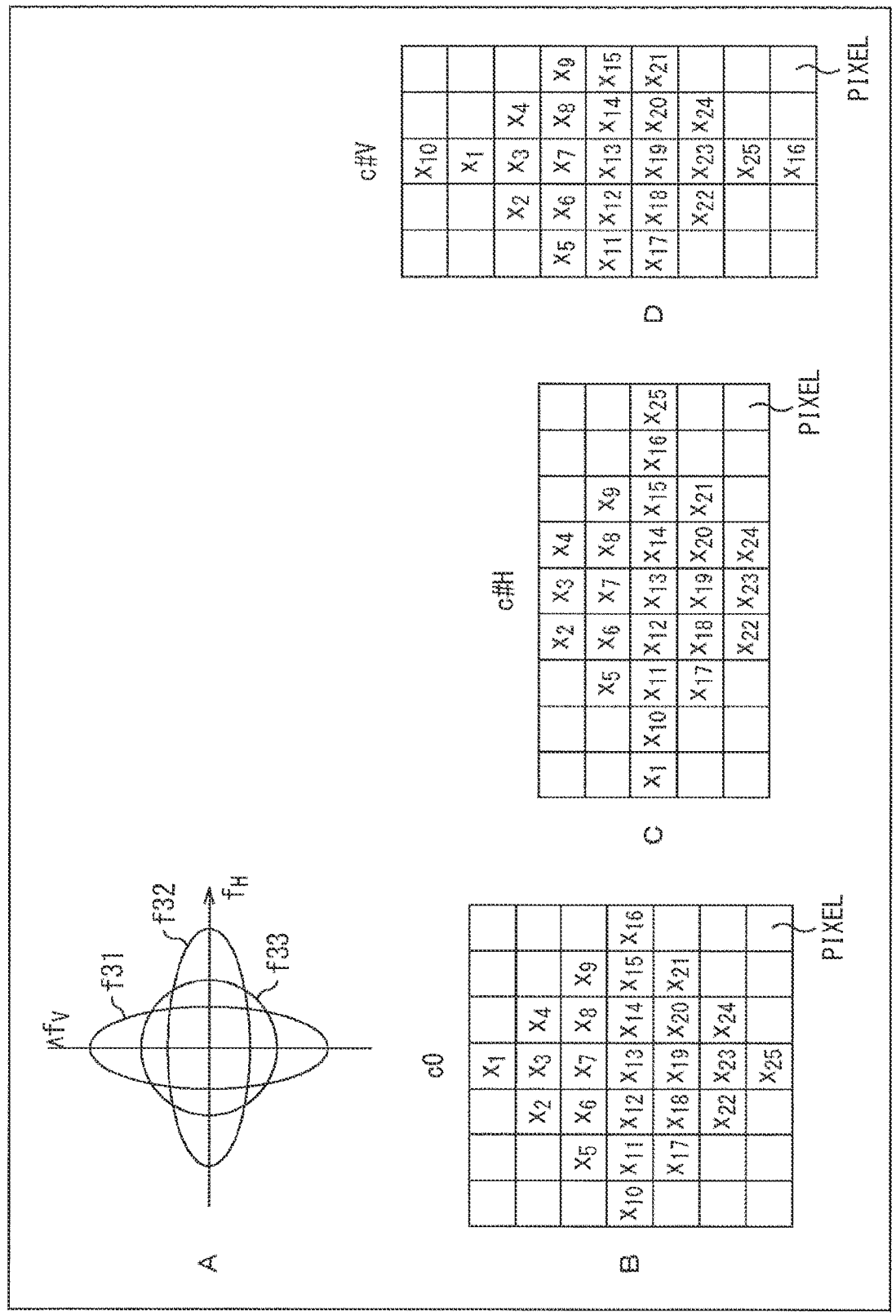
FIG. 38 is a diagram describing that a tap structure is changed in accordance with the class.

FIG. 38 is a diagram describing that a tap structure is changed in accordance with the class.

As described in FIGS. 6, 27, and 33, it is possible to change the tap structure of a prediction tap in accordance with a class.

That is, it is possible to change a pixel $x_n$ in accordance with a class. The pixel $x_n$ is included in a prediction tap to be subjected to the filter arithmetic operation of Expression (1) by using the tap coefficient $w_n$.

It is to be noted that, for the sake of simplicity, as the classification of tap coefficient learning and ALF process, classification is here adopted in which pixels are classified into any of the M inclination/reliability classes c0 to c #M−1 described in FIGS. 23 and 24 in accordance with the inclination feature amount of the pixels and the reliability.

A of FIG. 38 schematically illustrates frequency characteristics of an image.

In A of FIG. 38, the horizontal axis represents a frequency $f_H$ in the horizontal direction, and the vertical axis represents a frequency $f_V$ in the vertical direction. A of FIG. 38 uses the frequency $f_H$ in the horizontal direction and the frequency $f_V$ in the vertical direction as axes to indicate the distribution of the frequency components of an image.

In A of FIG. 38, a frequency characteristic f31 indicates a frequency characteristic of an image including pixels classified in the horizontal class c #H. A frequency characteristic f32 indicates a frequency characteristic of an image including pixels classified into vertical class c #V. In addition, a frequency characteristic f33 indicates a frequency characteristic of an image including pixels classified into the inclination/reliability class c0.

The frequency characteristic f31 is a vertically long ellipse-shaped frequency characteristic of an image having a large number of high frequency components in the vertical direction, and a small number of high frequency components in the horizontal direction. That is, for example, the frequency characteristic f31 is a frequency characteristic of an image having a large number of horizontal edge regions. The frequency characteristic f32 is a horizontally long ellipse-shaped frequency characteristic of an image having a small number of high frequency components in the vertical direction, and a large number of high frequency components in the horizontal direction. That is, for example, the frequency characteristic f32 is a frequency characteristic of an image having a large number of vertical edge regions. The frequency characteristic f33 is a circle-shaped frequency characteristic of an image having high frequency components in the respective directions to the same degree. For example, the noise of an image sensor shooting an original image has a frequency characteristic like the frequency characteristic f33.

For the pixels of an image having the frequency characteristic f31 or an image having a large number of horizontal edge regions, the inclination feature amount indicating the horizontal direction is obtained. As a result, the pixels are classified into the horizontal class c #H.

For the pixels of an image having the frequency characteristic f32 or an image having a large number of vertical edge regions, the inclination feature amount indicating the vertical direction is obtained. As a result, the pixels are classified into the vertical class c #V.

For the pixels of an image having the frequency characteristic f33 or an image having high frequency components in the respective directions to the same degree, the reliability tr of the inclination feature amount decreases (has a value that is not greater than or equal to the threshold THtr). As a result, the pixels are classified into an inclination/reliability class (that is also referred to as non-directional class) c0 that is not dependent on the inclination feature amount.

B of FIG. 38 illustrates an example of the tap structure of a prediction tap configured for pixels in the non-directional class c0.

For example, in a case where a pixel $x_{13}$ is a pixel of interest and the pixel $x_{13}$ of interest is classified into the non-directional class c0, pixels $x_1$ to $x_{25}$ within a square range around the pixel $x_{13}$ of interest are adopted as a prediction tap.

C of FIG. 38 illustrates an example of the tap structure of a prediction tap configured for pixels in the horizontal class c #H.

For example, in a case where a pixel $x_3$ is a pixel of interest and the pixel $x_{13}$ of interest is classified into the horizontal class c #H, pixels $x_1$ to $x_{25}$ within a horizontally long rhombus-shaped range around the pixel $x_{13}$ of interest are adopted as a prediction tap. In this case, a larger number of pixels arranged in the horizontal direction than pixels arranged in the vertical direction as viewed from the pixel $x_{13}$ of interest are used to configure a prediction tap.

In a case where the pixel $x_{13}$ of interest is categorized into the horizontal class c #H, the inclination feature amount of the pixel $x_{13}$ of interest indicates the horizontal direction. For the pixel $x_{13}$ of interest whose inclination feature amount indicates the horizontal direction, a large number of pixels arranged in the horizontal direction indicated by the inclination feature amount of the pixel $x_{13}$ of interest are used to configure a prediction tap, thereby making it possible to obtain a tap coefficient having a smaller error (sum total E of square errors in Expression (4)) in tap coefficient learning, and obtain a filtered image closer to the original image in an ALF process as a result of a filter arithmetic operation using the tap coefficient.

D of FIG. 38 illustrates an example of the tap structure of a prediction tap configured for pixels in the vertical class c #V.

For example, in a case where a pixel $x_{13}$ is a pixel of interest and the pixel $x_{13}$ of interest is classified into the vertical class c #V, pixels $x_1$ to $x_{25}$ within a vertically long rhombus-shaped range around the pixel $x_{13}$ of interest are adopted as a prediction tap. In this case, a larger number of pixels arranged in the vertical direction than pixels arranged in the horizontal direction as viewed from the pixel $x_{13}$ of interest are used to configure a prediction tap.

In a case where the pixel $x_{13}$ of interest is categorized into the vertical class c #V, the inclination feature amount of the pixel $x_{13}$ of interest indicates the vertical direction. For the pixel $x_{13}$ of interest whose inclination feature amount indicates the vertical direction, a large number of pixels arranged in the vertical direction indicated by the inclination feature amount of the pixel $x_{13}$ of interest are used to configure a prediction tap, thereby making it possible to obtain a tap coefficient having a smaller error in tap coefficient learning, and obtain a filtered image closer to the original image in an ALF process as a result of a filter arithmetic operation using the tap coefficient.

Figure 39:
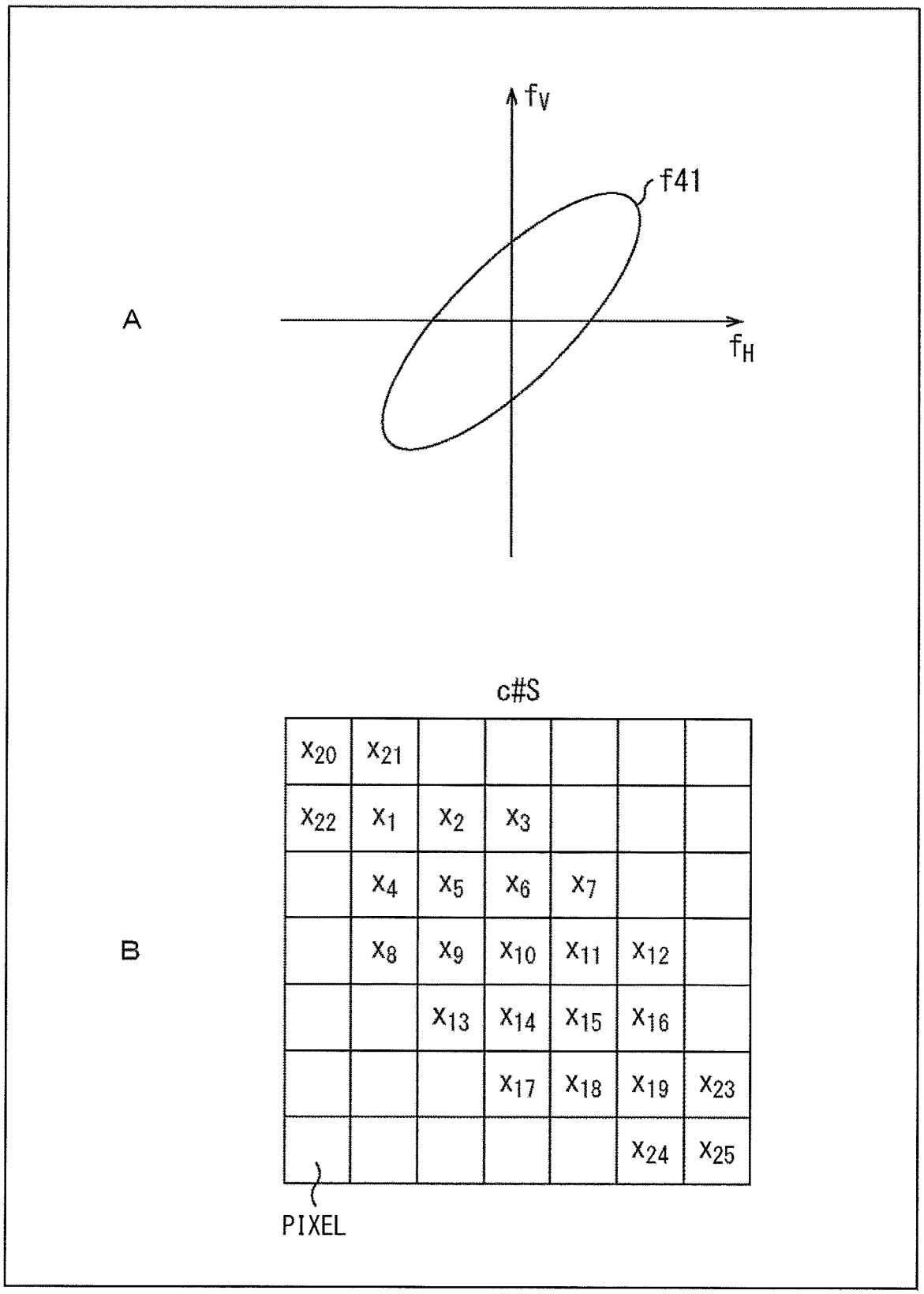
FIG. 39 is a diagram further describing that the tap structure is changed in accordance with the class.

FIG. 39 is a diagram further describing that the tap structure is changed in accordance with the class.

A of FIG. 39 schematically illustrates frequency characteristics of an image.

In A of FIG. 38, the horizontal axis represents a frequency $f_H$ in the horizontal direction, and the vertical axis represents a frequency $f_V$ in the vertical direction similarly to A of FIG. 38.

In A of FIG. 39, a frequency characteristic f41 is an ellipse-shaped frequency characteristic of an image having a large number of high frequency components in the upper right direction and a small number of high frequency components in the upper left (lower right) direction with the longitudinal axis pointing in the upper right (lower left) direction, or, for example, an image having a large number of upper left edge regions and in which edges (edges extending in the upper left direction) in the upper left direction are dominant.

For the pixels of an image having the frequency characteristic f41 or an image having a large number of upper left edge regions, the inclination feature amount indicating the upper left direction is obtained. As a result, the pixels are classified into the inclination/reliability class c #S for the upper left direction.

B of FIG. 39 illustrates an example of the tap structure of a prediction tap configured for pixels in the inclination/reliability class c #S for the upper left direction.

For example, in a case where a pixel $x_{10}$ is a pixel of interest and the pixel $x_{10}$ of interest is classified into an inclination/reliability class c #S for the upper left direction, pixels $x_1$ to $x_{25}$ within a rectangular range around the pixel $x_{10}$ of interest with the upper left (lower right) direction used as the longitudinal direction are adopted as a prediction tap. In this case, a larger number of pixels arranged in the upper left direction and the lower right direction than pixels arranged in the upper right direction and the lower left direction as viewed from the pixel $x_{10}$ of interest are used to configure a prediction tap.

In this case, as described in C and D of FIG. 38, it is possible to obtain a tap coefficient having a smaller error in tap coefficient learning, and obtain a filtered image closer to the original image in an ALF process as a result of a filter arithmetic operation using the tap coefficient.

It is to be noted that, in a case where the tap structure of the prediction tap is changed in accordance with the class as described above, that is, in a case where each class has a different tap structure for the prediction tap, the tap structure of the tap coefficient used for a filter arithmetic operation with (the pixel value of) a pixel serving as the prediction tap is also different in accordance with the class.

In addition, in B to D of FIG. 38 and B of FIG. 39, as the number of pixels included in a prediction tap, 25 pixels are adopted. The number of pixels included in a prediction tap is not, however, limited to 25 pixels.

Further, as the number of pixels included in a prediction tap, it is possible to adopt pixels different in number between the respective classes.

<Classification Parameter>

Figure 40:
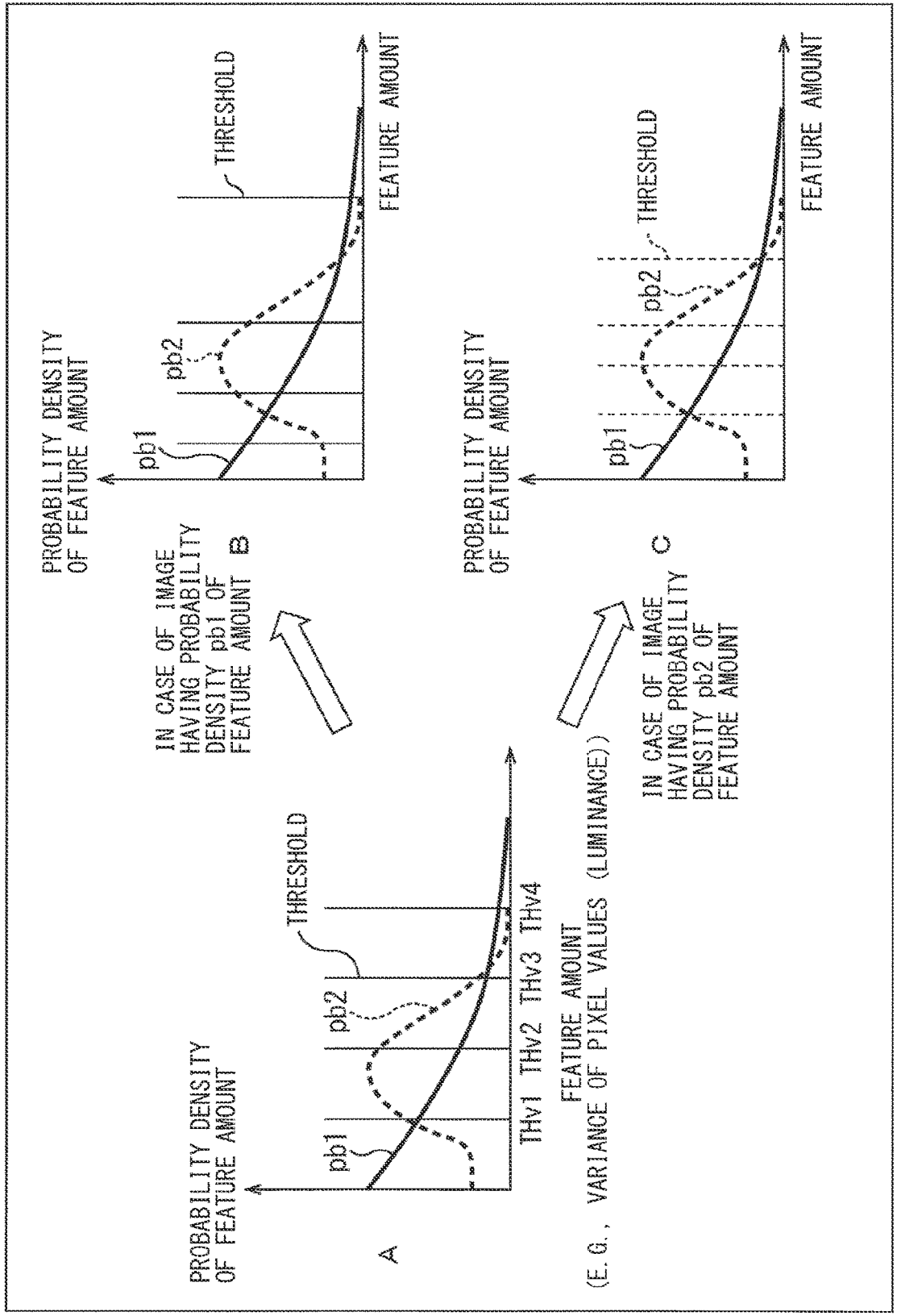
FIG. 40 is a diagram describing an example of generation of a classification parameter.

FIG. 40 is a diagram describing an example in which the classification parameter generation unit 131 (FIG. 5) generates a classification parameter.

The classification parameter generation unit 131 generates a classification parameter to equally allocate the pixels of a decoding in-progress image of one picture to the respective classes, for example. One picture serves as an update unit for updating a tap coefficient.

FIG. 40 illustrates probability density pb1 of the feature amount of each pixel of one certain picture serving as an update unit, and probability density pb2 of the feature amount of each pixel of another picture.

In FIG. 40, the horizontal axis represents the feature amount of a pixel, and the vertical axis represents the probability density of the feature amount.

The probability density pb1 is high in a case of a small feature amount, and the probability density pb1 decreases with an increase in the feature amount. The probability density pb2 is high in a case where the feature amount is an intermediate value, and the probability density pb2 decreases as the feature amount deviates more from the intermediate value.

A of FIG. 40 is a diagram describing classification in a case where a threshold serving as a classification parameter is fixed.

It is to be noted that it is assumed in FIG. 40 for the sake of simplicity that, for example, a variance of pixel values is used as the feature amount of a pixel, the feature amount of a pixel and a threshold serving as a classification parameter are compared with each other in classification, and the pixel is classified into a class corresponding to (the magnitude of) the feature amount on the basis of a result of the comparison.

In A of FIG. 40, thresholds of the feature amount that serve as classification parameters are fixed at THv1, THv2, THv3, and THv4.

Further, in A of FIG. 40, with respect to the probability density pb1, the probability density of a pixel whose feature amount is less than THv1 is higher than the probability density of a pixel whose feature amount is another value. With respect to the probability density pb2, the probability density of a pixel whose feature amount is greater than or equal to THv1 and less than THv2 is higher than the probability density of a pixel whose feature amount is another value.

Therefore, in a case where the thresholds of the feature amount are fixed at THv1 to THv4, an image (image whose probability density of the feature amount is pb1) having the probability density pb1 includes a larger number of pixels classified into a class for a feature amount less than THv1 than pixels classified into another class. Similarly, an image having the probability density pb2 includes a larger number of pixels classified into a class for a feature amount greater than or equal to THv1 and less than THv2 than pixels classified into another class.

As described above, in a case where the thresholds of the feature amount are fixed, a difference in the probability density of the feature amount of an image causes an increase (or a decrease) in pixels classified into a specific class as compared with pixels classified into another class, biasing a result of classification in some manner.

A biased result of classification may curb effects of the classification of the pixel of interest that is performed to determine a tap coefficient. The tap coefficient is used for a filter arithmetic operation when the filter arithmetic operation is performed on the pixel of interest.

Accordingly, for example, the classification parameter generation unit 131 generates a classification parameter to equally allocate the pixels of a decoding in-progress image of one picture to the respective classes, for example. One picture serves as an update unit for updating a tap coefficient.

That is, a threshold that grows the width between adjacent thresholds with an increase in the feature amount as illustrated in B of FIG. 40 is generated as a classification parameter for an image having the probability density pb1 that decreases with an increase in the feature amount. Classifying the respective pixels of an image having the probability density pb1 by using the threshold causes the respective pixels of the image having the probability density pb1 to be equally classified into the respective classes. That is, the respective pixels of an image of the probability density pb1 are appropriately classified.

In addition, a threshold that grows the width between adjacent thresholds as the feature amount deviates more from the intermediate value as illustrated in C of FIG. 40 is generated as a classification parameter for an image having the probability density pb2 that decreases as the feature amount deviates more from the intermediate value. Classifying the respective pixels of an image having the probability density pb2 by using the threshold causes the respective pixels of the image having the probability density pb2 to be equally classified into the respective classes. That is, the respective pixels of an image of the probability density pb2 are appropriately classified.

The classification parameter generation unit 131 uses the original image to generate a classification parameter to equally allocate the pixels of a decoding in-progress image of one picture to the respective classes, for example. One picture serves as an update unit for updating a tap coefficient.

That is, the classification parameter generation unit 131 obtains the probability density of the feature amount from the original image that is an update unit, and generates a classification parameter in accordance with the probability density to equally classify the pixels of a decoding in-progress image that is an update unit into the respective classes.

It is to be noted that the classification parameter generation unit 131 is able to generate a classification parameter in accordance with not the original image that is an update unit, but a decoding in-progress image that is an update unit to equally classify the pixels of the decoding in-progress image that is an update unit into the respective classes. That is, for example, the classification parameter generation unit 131 is able to obtain the feature amount of a decoding in-progress image that is an update unit, and generate a classification parameter from the distribution of the feature amount in accordance with a predetermined rule to equally classify the pixels of the decoding in-progress image that is an update unit into the respective classes.

As described above, in a case where the image encoding device 100 uses a decoding in-progress image to generate a classification parameter, the image decoding device 200 is also able to generate a classification parameter by using a decoding in-progress image. This eliminates the necessity to transmit a classification parameter from the image encoding device 100 to the image decoding device 200, and makes it possible to further improve the coding efficiency.

It is to be noted that it is additionally possible to generate a classification parameter, for example, by using a decoding in-progress image and an original image that are update units. That is, the classification parameter generation unit 131 changes the thresholds of the feature amount used for classification into various values to perform tap coefficient learning. The classification parameter generation unit 131 is able to generate, in the tap coefficient learning, as classification parameters, a threshold of the feature amount for further decreasing the sum total E of square errors in Expression (4) and a threshold of the feature amount for equally classifying the pixels of a decoding in-progress image used for the tap coefficient learning into the respective classes.

<Description of Computer to which the Present Technology is Applied>

It is possible to execute the series of processes described above by hardware, and it is also possible to execute the series of processes described above by software. When the series of processes is executed with software, a program included in the software is installed in a computer. Here, the computer includes a computer incorporated in dedicated hardware, a general-purpose personal computer that is able to execute, for example, various functions by installing various programs, and the like.

Figure 41:
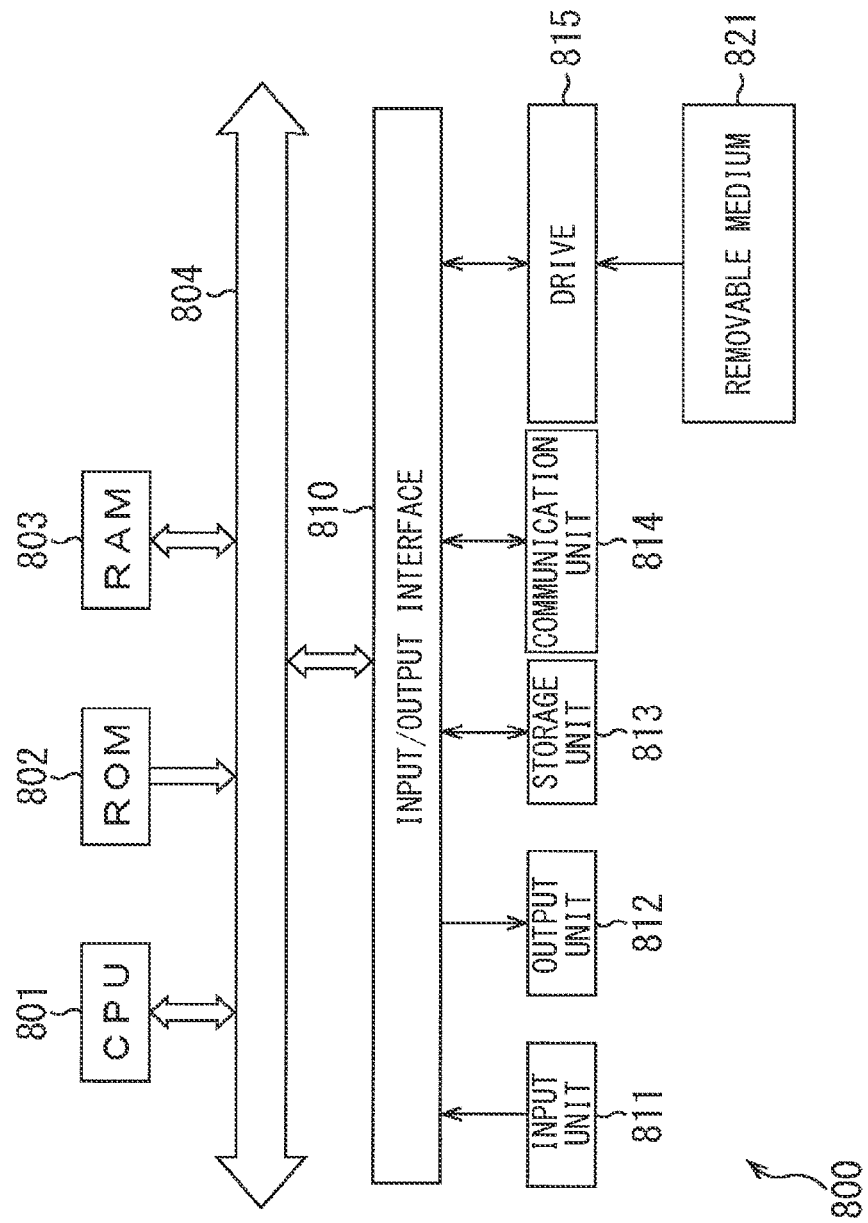
FIG. 41 is a block diagram illustrating a configuration example of hardware of a computer.

FIG. 41 is a block diagram illustrating a configuration example of the hardware of a computer that executes the series of processes described above by using a program.

In a computer 800, CPU (Central Processing Unit) 801, ROM (Read Only Memory) 802, and RAM (Random Access Memory) 803 are coupled to each other by a bus 804.

An input/output interface 810 is further coupled to the bus 804. An input unit 811, an output unit 812, a storage unit 813, a communication unit 814, and a drive 815 are coupled to the input/output interface 810.

The input unit 811 includes a keyboard, a mouse, a microphone, and the like. The output unit 812 includes a display, a speaker, and the like. The storage unit 813 includes a hard disk, a nonvolatile memory, and the like. The communication unit 814 includes a network interface and the like. The drive 815 drives a removable medium 821 such as a magnetic disk, an optical disc, a magneto-optical disk, or a semiconductor memory.

In the computer 800 configured as described above, the CPU 801 loads a program stored, for example, in the storage unit 813 into the RAM 803 via the input/output interface 810 and the bus 804, and executes the program to perform the series of processes described above.

It is possible to record and provide the program executed by the computer 800 (CPU 801), for example, into the removable medium 821 that is a package medium or the like. Further, it is possible to provide the program via a wired or wireless transmission medium such as a local area network, the Internet, or digital satellite broadcasting.

In the computer 800, it is possible to install the program in the storage unit 813 via the input/output interface 810 by mounting the removable medium 821 on the drive 815. In addition, it is possible to receive the program by the communication unit 814 via a wireless or wired transmission medium and install the received program in the storage unit 813. In addition, it is possible to install the program in advance in the ROM 802 or the storage unit 813.

It is to be noted that the program executed by the computer 800 may be a program in which the processes are chronologically performed in the order described herein, and may be a program in which the processes are performed in parallel or at necessary timing like when invoked.

<Television Apparatus>

Figure 42:
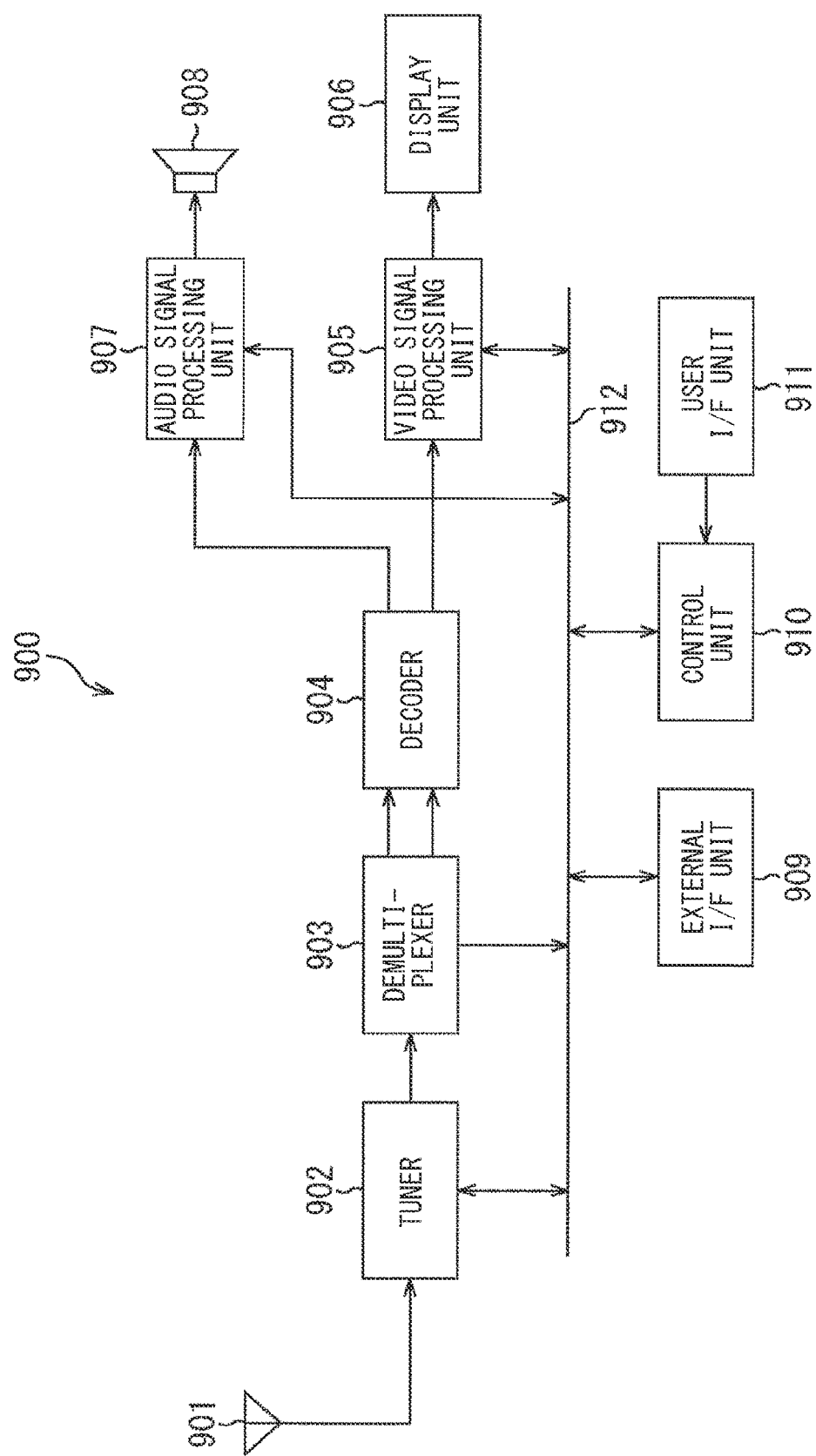
FIG. 42 is a block diagram illustrating an example of a schematic configuration of a television apparatus.

FIG. 42 illustrates an example of a schematic configuration of a television apparatus to which the embodiment described above is applied. A television apparatus 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcasting signal received via the antenna 901, and demodulates the extracted signal. Then, the tuner 902 outputs an encoded bit stream obtained from the demodulation to the demultiplexer 903. That is, the tuner 902 has a role as a transmission unit in the television apparatus 900. The transmission unit receives an encoded stream in which an image is encoded.

The demultiplexer 903 demultiplexes a video stream and an audio stream of a program to be viewed and listened to from an encoded bit stream, and outputs the demultiplexed streams to the decoder 904. In addition, the demultiplexer 903 extracts auxiliary data such as EPG (Electronic Program Guide) from the encoded bit stream, and supplies the extracted data to the control unit 910. It is to be noted that, in a case where the encoded bit stream is scrambled, the demultiplexer 903 may perform descrambling.

The decoder 904 decodes the video stream and the audio stream inputted from the demultiplexer 903. Then, the decoder 904 outputs video data generated in a decoding process to the video signal processing unit 905. In addition, the decoder 904 outputs audio data generated in a decoding process to the audio signal processing unit 907.

The video signal processing unit 905 reproduces the video data inputted from the decoder 904 to cause the display unit 906 to display a video. In addition, the video signal processing unit 905 may cause the display unit 906 to display an application screen supplied via a network. In addition, the video signal processing unit 905 may perform an additional process, for example, noise reduction or the like, on the video data in accordance with the setting. Further, the video signal processing unit 905 may generate an image of GUI (Graphical User Interface), for example, such as a menu, a button, or a cursor, and superimpose the generated image on an output image.

The display unit 906 is driven by a driving signal supplied from the video signal processing unit 905, and displays a video or an image on a video face of a display device (e.g., a liquid crystal display, a plasma display, OELD (Organic ElectroLuminescence Display) (organic EL display), or the like).

The audio signal processing unit 907 performs a reproduction process such as D/A conversion and amplification on the audio data inputted from the decoder 904, and causes the speaker 908 to output a sound. In addition, the audio signal processing unit 907 may perform an additional process such as noise reduction on the audio data.

The external interface unit 909 is an interface for coupling the television apparatus 900, and an external apparatus or a network to each other. For example, a video stream or an audio stream received via the external interface unit 909 may be decoded by the decoder 904. That is, the external interface unit 909 also has a role as a transmission unit in the television apparatus 900. The transmission unit receives an encoded stream in which an image is encoded.

The control unit 910 includes a processor such as CPU, and a memory such as RAM and ROM. The memory stores a program executed by the CPU, program data, EPG data, data acquired via a network, and the like. The program stored in the memory is read and executed by the CPU, for example, when the television apparatus 900 is started. The CPU executes the program to control the operation of the television apparatus 900 in accordance with an operation signal inputted, for example, from the user interface unit 911.

The user interface unit 911 is coupled to the control unit 910. The user interface unit 911 includes a button and a switch for allowing, for example, a user to operate the television apparatus 900, a reception unit for a remote controlling signal, and the like. The user interface unit 911 detects an operation by the user via these components and generates an operation signal, and outputs the generated operation signal to the control unit 910.

The bus 912 couples the tuner 902, the demultiplexer 903, the decoder 904, the video signal processing unit 905, the audio signal processing unit 907, the external interface unit 909, and the control unit 910 to each other.

In the television apparatus 900 configured in this manner, the decoder 904 may have a function of the image decoding device 200 described above. That is, the decoder 904 may decode encoded data in a method described in each of the embodiments described above. This allows the television apparatus 900 to obtain effects similar to those of each of the embodiments described above.

In addition, in the television apparatus 900 configured in this manner, the video signal processing unit 905 may be able, for example, to encode image data supplied from the decoder 904 and output the obtained encoded data to the outside of the television apparatus 900 via the external interface unit 909. The video signal processing unit 905 may then have the function of the image encoding device 100 described above. That is, the video signal processing unit 905 may encode image data supplied from the decoder 904 in the method described in each of the embodiments described above. This allows the television apparatus 900 to obtain effects similar to those of each of the embodiments described above.

<Mobile Phone>

Figure 43:
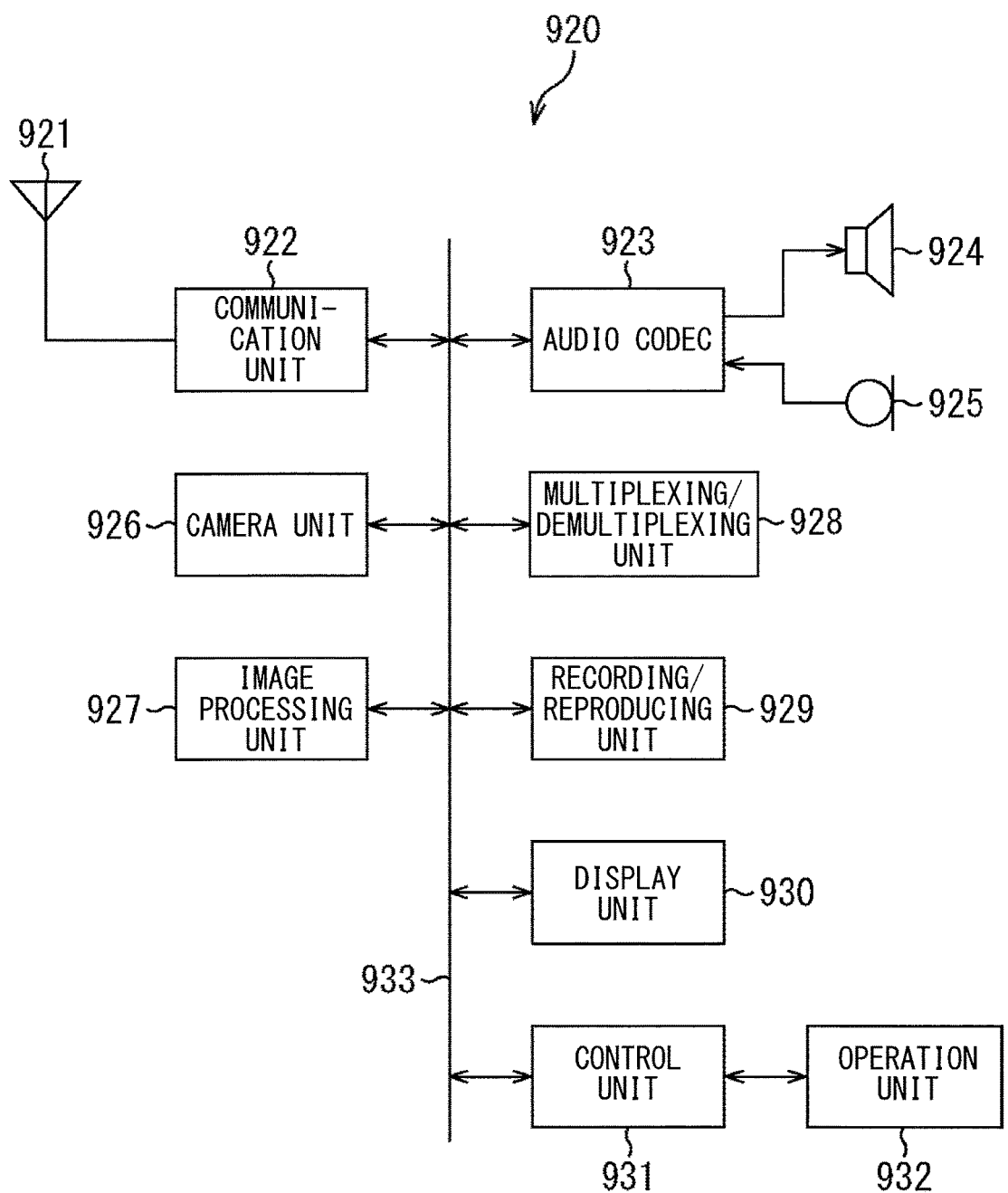
FIG. 43 is a block diagram illustrating an example of a schematic configuration of a mobile phone.

FIG. 43 illustrates an example of a schematic configuration of a mobile phone to which the embodiment described above is applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is coupled to the communication unit 922. The speaker 924 and the microphone 925 are coupled to the audio codec 923. The operation unit 932 is coupled to the control unit 931. The bus 933 coupled the communication unit 922, the audio codec 923, the camera unit 926, the image processing unit 927, the multiplexing/demultiplexing unit 928, the recording/reproducing unit 929, the display unit 930, and the control unit 931 to each other.

The mobile phone 920 performs an operation such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the audio data. The audio codec 923 then outputs the compressed audio data to the communication unit 922. The communication unit 922 encodes and modulates the audio data to generate a transmission signal. Then, the communication unit 922 transmits the generated transmission signal to a base station (not illustrated) via the antenna 921. In addition, the communication unit 922 amplifies a wireless signal received via the antenna 921, converts the frequency of the wireless signal, and acquires a reception signal. The communication unit 922 then demodulates and decodes the reception signal to generate the audio data, and outputs the generated audio data to the audio codec 923. The audio codec 923 expands the audio data, performs D/A conversion on the audio data, and generates an analog audio signal. The audio codec 923 then supplies the generated audio signal to the speaker 924 to output a sound.

In addition, in the data communication mode, for example, the control unit 931 generates character data included in an electronic mail, in accordance with an operation performed by a user via the operation unit 932. In addition, the control unit 931 causes the display unit 930 to display a character. In addition, the control unit 931 generates electronic mail data in accordance with a transmission instruction issued from a user via the operation unit 932, and outputs the generated electronic mail data to the communication unit 922. The communication unit 922 encodes and modulates the electronic mail data to generate a transmission signal. Then, the communication unit 922 transmits the generated transmission signal to a base station (not illustrated) via the antenna 921. In addition, the communication unit 922 amplifies a wireless signal received via the antenna 921, converts the frequency of the wireless signal, and acquires a reception signal. The communication unit 922 then demodulates and decodes the reception signal to restore the electronic mail data, and outputs the restored electronic mail data to the control unit 931. The control unit 931 causes the display unit 930 to display the contents of the electronic mail, and supplies the electronic mail data to the recording/reproducing unit 929 to cause the electronic data to be written into a storage medium thereof.

The recording/reproducing unit 929 includes any storage medium that is readable and writable. For example, the storage medium may be a built-in storage medium such as RAM or a flash memory or an externally attached storage medium such as a hard disk, a magnetic disk, a magneto-optical disk, an optical disc, a USB (Universal Serial Bus) memory, or a memory card.

In addition, the photography mode, for example, the camera unit 926 images an object to generate image data, and outputs the generated image data to the image processing unit 927. The image processing unit 927 encodes the image data inputted from the camera unit 926, and supplies the encoded stream to the recording/reproducing unit 929 to cause the supplied encoded stream to be written into a storage medium thereof.

Further, in the image display mode, the recording/reproducing unit 929 reads an encoded stream recorded on the storage medium and outputs the read encoded stream to the image processing unit 927. The image processing unit 927 decodes the encoded stream inputted from the recording/reproducing unit 929, and supplies the image data to the display unit 930 to cause the image to be displayed.

In addition, in the videophone mode, for example, the multiplexing/demultiplexing unit 928 multiplexes a video stream encoded by the image processing unit 927 and an audio stream inputted from the audio codec 923, and outputs the multiplexed streams to the communication unit 922. The communication unit 922 encodes and modulates the stream to generate a transmission signal. Then, the communication unit 922 transmits the generated transmission signal to a base station (not illustrated) via the antenna 921. In addition, the communication unit 922 amplifies a wireless signal received via the antenna 921, converts the frequency of the wireless signal, and acquires a reception signal. These transmission signal and reception signal may include encoded bit streams. Then, the communication unit 922 demodulates and decodes the reception signal to restore the stream, and outputs the restored stream to the multiplexing/demultiplexing unit 928. The multiplexing/demultiplexing unit 928 demultiplexes the video stream and the audio stream from the inputted stream, and outputs the video stream and the audio stream to the image processing unit 927 and the audio codec 923, respectively. The image processing unit 927 decodes the video stream to generate video data. The video data is supplied to the display unit 930, and the display unit 930 displays a series of images. The audio codec 923 expands the audio stream, performs D/A conversion on the audio data, and generates an analog audio signal. The audio codec 923 then supplies the generated audio signal to the speaker 924 to output a sound.

In the mobile phone 920 configured in this manner, for example, the image processing unit 927 may have the function of the image encoding device 100 described above. That is, the image processing unit 927 may encode image data in a method described in each of the embodiments described above. This allows the mobile phone 920 to obtain effects similar to those of each of the embodiments described above.

In addition, in the mobile phone 920 configured in this manner, for example, the image processing unit 927 may have the function of the image decoding device 200 described above. That is, the image processing unit 927 may decode encoded data in a method described in each of the embodiments described above. This allows the mobile phone 920 to obtain effects similar to those of each of the embodiments described above.

<Recording/Reproducing Apparatus>

Figure 44:
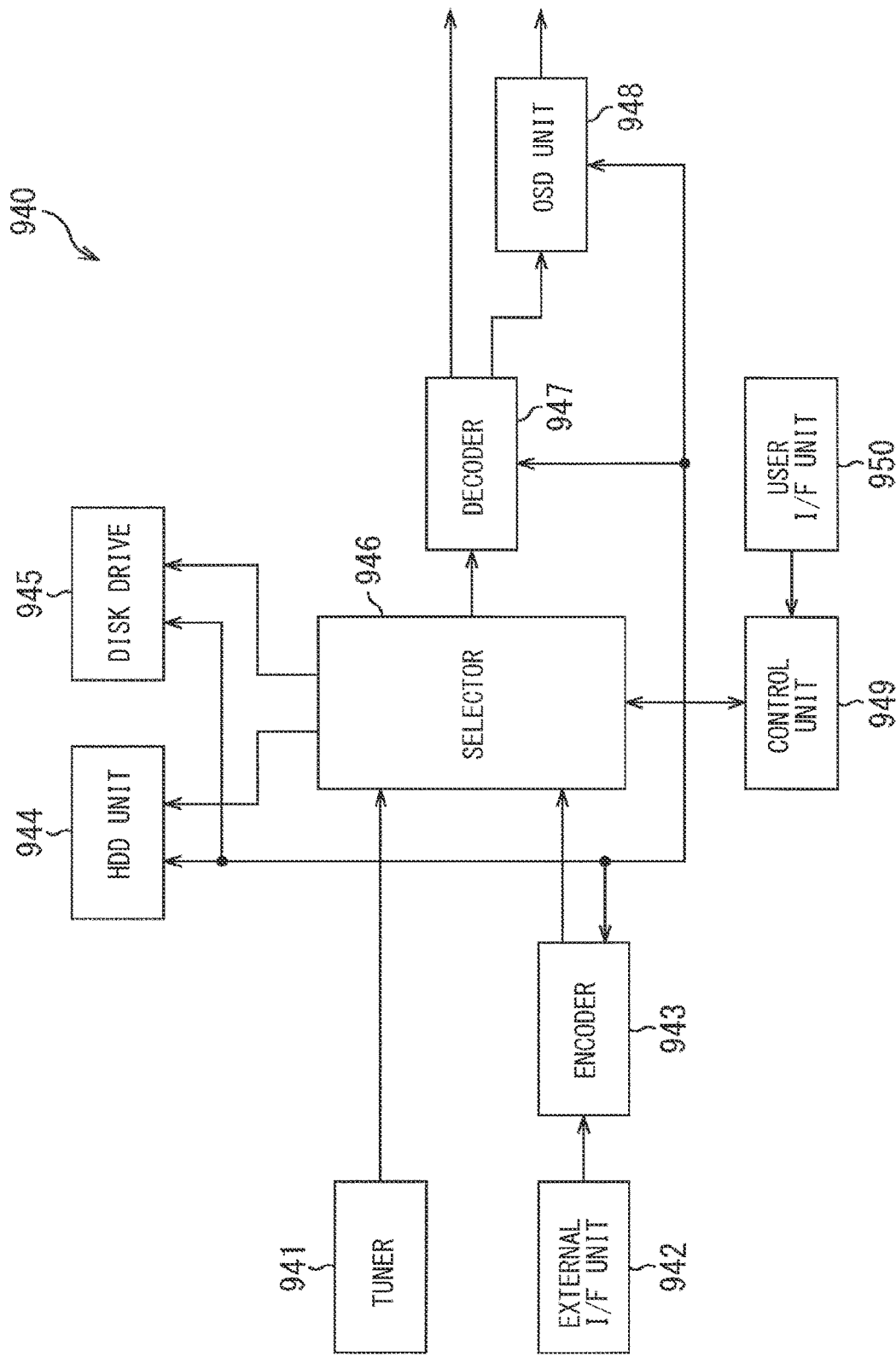
FIG. 44 is a block diagram illustrating an example of a schematic configuration of a recording/reproducing apparatus.

FIG. 44 illustrates an example of a schematic configuration of a recording/reproducing apparatus to which the embodiment described above is applied. A recording/reproducing apparatus 940 encodes audio data and video data of a received broadcast program, and records the encoded data into a recording medium, for example. In addition, the recording/reproducing apparatus 940 may encode audio data and video data acquired from another apparatus, and record the encoded data into the recording medium, for example. In addition, the recording/reproducing apparatus 940 reproduces the data recorded in the recording medium on a monitor and a speaker, for example, in accordance with an instruction of a user. At this time, the recording/reproducing apparatus 940 decodes the audio data and the video data.

The recording/reproducing apparatus 940 includes a tuner 941, an external interface (I/F) unit 942, an encoder 943, an HDD (Hard Disk Drive) unit 944, a disk drive 945, a selector 946, a decoder 947, an OSD (On-Screen Display) unit 948, a control unit 949, and a user interface (I/F) 950.

The tuner 941 extracts a signal of a desired channel from a broadcasting signal received via an antenna (not illustrated), and demodulates the extracted signal. Then, the tuner 941 outputs an encoded bit stream obtained from the demodulation to the selector 946. That is, the tuner 941 has a role as the transmission unit in the recording/reproducing apparatus 940.

The external interface unit 942 is an interface for coupling the recording/reproducing apparatus 940, and an external apparatus or a network to each other. The external interface unit 942 may be, for example, an IEEE (Institute of Electrical and Electronic Engineers) 1394 interface, a network interface, a USB interface, a flash memory interface, or the like. For example, video data and audio data received via the external interface unit 942 are inputted to the encoder 943. That is, the external interface unit 942 has a role as the transmission unit in the recording/reproducing apparatus 940.

In a case where video data and audio data inputted from the external interface unit 942 are not encoded, the encoder 943 encodes the video data and the audio data. The encoder 943 then outputs an encoded bit stream to the selector 946.

The HDD unit 944 records an encoded bit stream in which content data of videos, sounds, and the like is compressed, various programs, and other data on an internal hard disk. Further, the HDD unit 944 reads such data from the hard disk when videos and sounds are reproduced.

The disk drive 945 records and reads data on and from a recording medium mounted thereon. The recording medium to be mounted on the disk drive 945 may be, for example, a DVD (Digital Versatile Disc) disk (DVD-Video, DVD-RAM (DVD-Random Access Memory), DVD-R (DVD-Recordable), DVD-RW (DVD-Rewritable), DVD+R (DVD+Recordable), DVD+RW (DVD+Rewritable), and the like), a Blu-ray (registered trademark) disk, or the like.

When videos and sounds are recorded, the selector 946 selects an encoded bit stream inputted from the tuner 941 or the encoder 943, and outputs the selected encoded bit stream to the HDD unit 944 or the disk drive 945. In addition, when videos and sounds are reproduced, the selector 946 outputs the encoded bit stream inputted from the HDD unit 944 or the disk drive 945 to the decoder 947.

The decoder 947 decodes the encoded bit stream to generate video data and audio data. Then, the decoder 947 outputs the generated video data to the OSD unit 948. In addition, the decoder 947 outputs the generated audio data to the external speaker.

The OSD unit 948 reproduces the video data inputted from the decoder 947 to display a video. In addition, the OSD unit 948 may superimpose an image of GUI such as, for example, a menu, a button, or a cursor on the displayed video.

The control unit 949 includes a processor such as CPU, and a memory such as RAM and ROM. The memory stores a program executed by the CPU, program data, and the like. The program stored in the memory is read and executed by the CPU, for example, when the recording/reproducing apparatus 940 is started. The CPU executes the program to control the operation of the recording/reproducing apparatus 940 in accordance with an operation signal inputted, for example, from the user interface unit 950.

The user interface unit 950 is coupled to the control unit 949. The user interface unit 950 includes a button and a switch for allowing, for example, a user to operate the recording/reproducing apparatus 940, a reception unit for a remote controlling signal, and the like. The user interface unit 950 detects an operation by the user via these components and generates an operation signal, and outputs the generated operation signal to the control unit 949.

In the recording/reproducing apparatus 940 configured in this manner, for example, the encoder 943 may have the function of the image encoding device 100 described above. That is, the encoder 943 may encode image data in a method described in each of the embodiments described above. This allows the recording/reproducing apparatus 940 to obtain effects similar to those of each of the embodiments described above.

In addition, in the recording/reproducing apparatus 940 configured in this manner, for example, the decoder 947 may have the function of the image decoding device 200 described above. That is, the decoder 947 may decode encoded data in a method described in each of the embodiments described above. This allows the recording/reproducing apparatus 940 to obtain effects similar to those of each of the embodiments described above.

<Imaging Apparatus>

Figure 45:
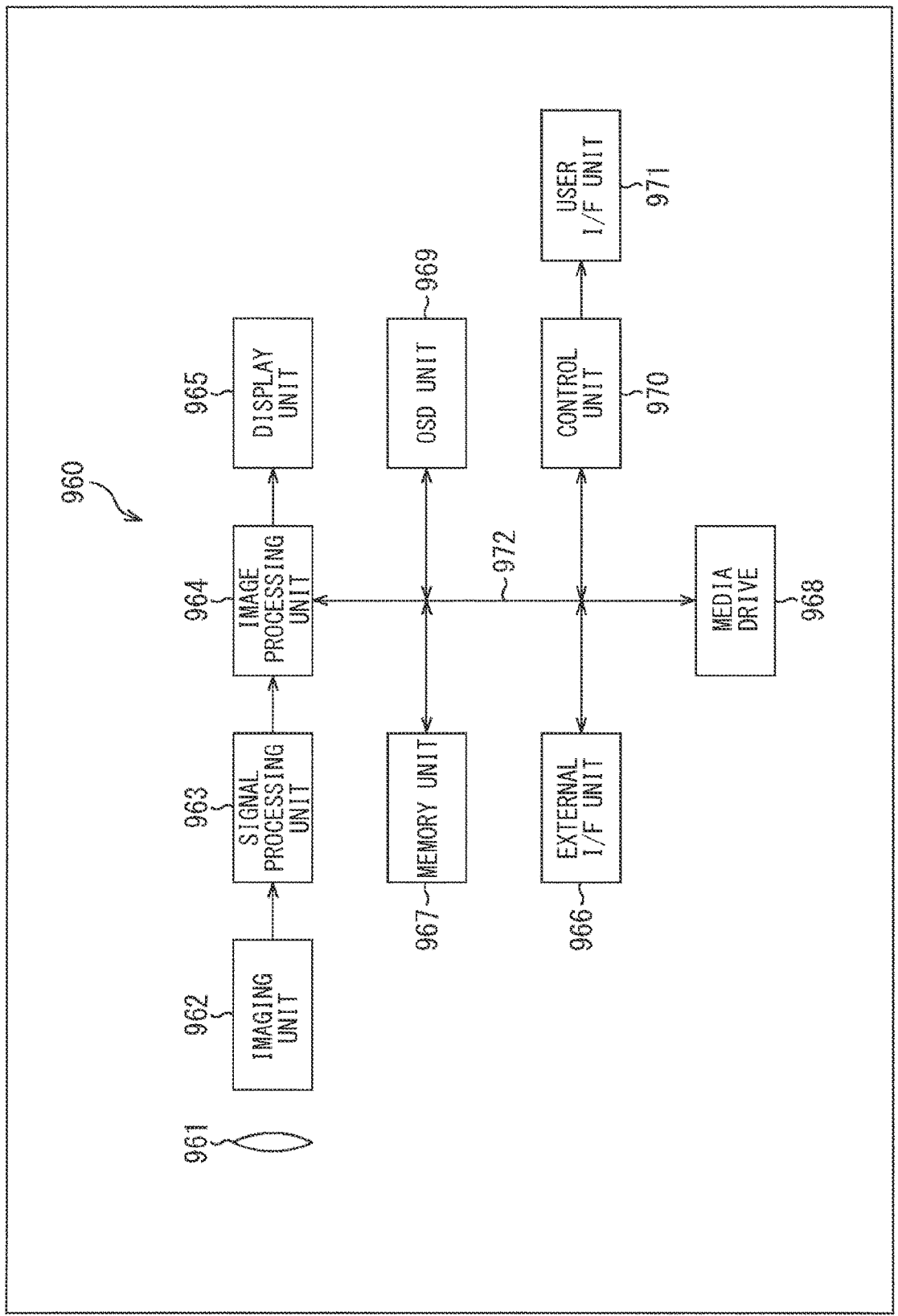
FIG. 45 is a block diagram illustrating an example of a schematic configuration of an imaging apparatus.

FIG. 45 illustrates an example of a schematic configuration of an imaging apparatus to which the embodiment described above is applied. An imaging apparatus 960 images an object to generate an image, encodes image data, and records the image data on a recording medium.

The imaging apparatus 960 includes an optical block 961, an imaging unit 962, a signal processing unit 963, an image processing unit 964, a display unit 965, an external interface (I/F) unit 966, a memory unit 967, a media drive 968, an OSD unit 969, a control unit 970, a user interface (I/F) unit 971, and a bus 972.

The optical block 961 is coupled to the imaging unit 962. The imaging unit 962 is coupled to the signal processing unit 963. The display unit 965 is coupled to the image processing unit 964. The user interface unit 971 is coupled to the control unit 970. The bus 972 coupled the image processing unit 964, the external interface unit 966, the memory unit 967, the media drive 968, the OSD unit 969, and the control unit 970 to each other.

The optical block 961 includes a focus lens, a diaphragm mechanism, and the like. The optical block 961 forms an optical image of an object on an imaging surface of the imaging unit 962. The imaging unit 962 includes an image sensor such as CCD (Charge Coupled Device) or CMOS (Complementary Metal Oxide Semiconductor), and converts an optical image formed on the imaging surface into an image signal in the form of an electric signal by photoelectric conversion. The imaging unit 962 then outputs the image signal to the signal processing unit 963.

The signal processing unit 963 performs various kinds of camera signal processing such as knee correction, gamma correction, and color correction on the image signal inputted from the imaging unit 962. The signal processing unit 963 outputs the image data subjected the camera signal processing to the image processing unit 964.

The image processing unit 964 encodes the image data inputted from the signal processing unit 963, and generates encoded data. Then, the image processing unit 964 outputs the generated encoded data to the external interface unit 966 or the media drive 968. In addition, the image processing unit 964 decodes encoded data inputted from the external interface unit 966 or the media drive 968 to generate image data. The image processing unit 964 then outputs the generated image data to the display unit 965. In addition, the image processing unit 964 may output the image data inputted from the signal processing unit 963 to the display unit 965 to cause the image to be displayed. In addition, the image processing unit 964 may superimpose display data acquired from the OSD unit 969 on the image to be outputted to the display unit 965.

The OSD unit 969 generates an image of GUI such as, for example, a menu, a button, or a cursor, and outputs the generated image to the image processing unit 964.

The external interface unit 966 is configured, for example, as a USB input/output terminal. The external interface unit 966 couples the imaging apparatus 960 and a printer to each other, for example, when an image is printed. In addition, a drive is coupled as necessary to the external interface unit 966. For example, a removable medium such as a magnetic disk or an optical disc is mounted on the drive, and a program read from the removable medium may be installed in the imaging apparatus 960. Further, the external interface unit 966 may be configured as a network interface coupled to a network such as LAN or the Internet. That is, the external interface unit 966 has a role as the transmission unit in the imaging apparatus 960.

The recording medium mounted on the media drive 968 may be, for example, any readable and writable removable medium such as a magnetic disk, a magneto-optical disk, an optical disc, or a semiconductor memory. In addition, the recording medium may be fixedly mounted on the media drive 968, and a non-transportable storage unit such as a built-in hard disk drive or SSD (Solid State Drive) is configured, for example.

The control unit 970 includes a processor such as CPU, and a memory such as RAM and ROM. The memory stores a program executed by the CPU, program data, and the like. The program stored in the memory is read and executed by the CPU, for example, when the imaging apparatus 960 is started. The CPU executes the program to control the operation of the imaging apparatus 960 in accordance with an operation signal inputted, for example, from the user interface unit 971.

The user interface unit 971 is coupled to the control unit 970. The user interface unit 971 includes, for example, a button, a switch, and the like for allowing a user to operate the imaging apparatus 960. The user interface unit 971 detects an operation by the user via these components and generates an operation signal, and outputs the generated operation signal to the control unit 970.

In the imaging apparatus 960 configured in this manner, for example, the image processing unit 964 may have the function of the image encoding device 100 described above. That is, the image processing unit 964 may encode image data in a method described in each of the embodiments described above. This allows the imaging apparatus 960 to obtain effects similar to those of each of the embodiments described above.

In addition, in the imaging apparatus 960 configured in this manner, for example, the image processing unit 964 may have the function of the image decoding device 200 described above. That is, the image processing unit 964 may decode encoded data in a method described in each of the embodiments described above. This allows the imaging apparatus 960 to obtain effects similar to those of each of the embodiments described above.

<Video Set>

Figure 46:
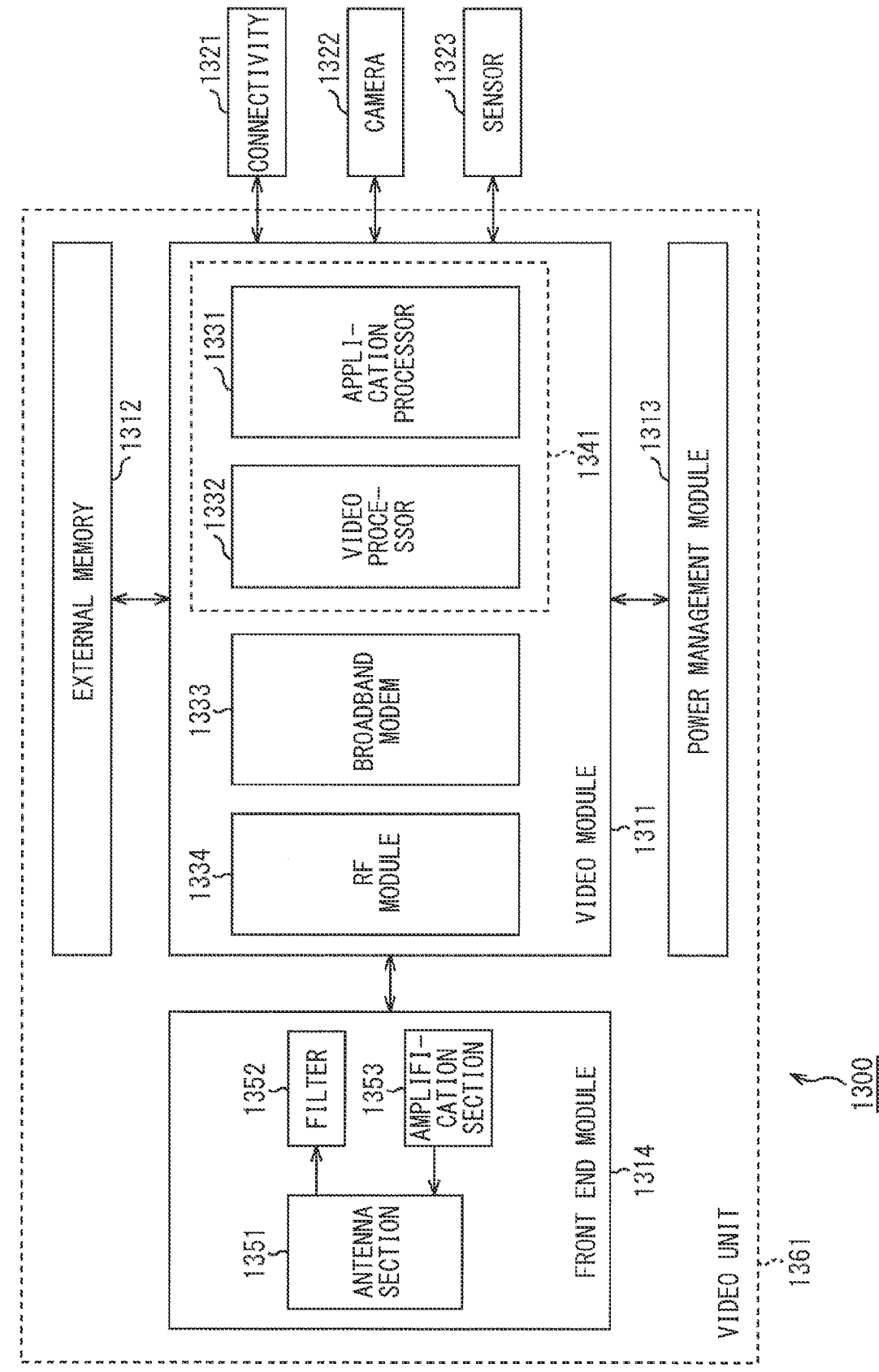
FIG. 46 is a block diagram illustrating an example of a schematic configuration of a video set.

In addition, it is also possible to carry out the present technology as any component to be incorporated in any apparatus or in an apparatus included in a system, for example, a processor as system LSI (Large Scale Integration) or the like, a module that uses a plurality of processors or the like, a unit that uses a plurality of modules or the like, a set in which another function is added to a unit (i.e., some components of an apparatus), and the like. FIG. 46 illustrates an example of a schematic configuration of a video set to which the present technology is applied.

In recent years, an electronic apparatus has been multi-functionalized. In a case where, in development or manufacture, some components thereof are carried out as sales, provision, or the like, they are each carried out not only as a component having one function, but also as one set having a plurality of functions resulting from a combination of a plurality of components having functions associated with each other in many cases.

A video set 1300 illustrated in FIG. 46 is such a multi-functionalized component, and is a combination of a device having a function or functions related to image encoding and decoding (one or both of the image encoding and decoding) and a device having another function related to the function or functions.

As illustrated in FIG. 46, the video set 1300 includes a module group including a video module 1311, an external memory 1312, a power management module 1313, a front end module 1314, and the like, and a device having related functions such as a connectivity 1321, a camera 1322, a sensor 1323, and the like.

A module is a part in which several part functions related to each other are collected for coherent functions. In spite of any specific physical configuration, for example, a configuration is conceivable in which electronic circuit elements such as a plurality of processors, registers, or capacitors having respective functions, other devices, and the like are disposed on a wiring board or the like and integrated. In addition, it is conceivable to combine a module with another module, a process, or the like to form a new module.

In a case of the example of FIG. 46, the video module 1311 is a combination of components having functions related to image processing, and includes an application processor, a video processor, a broadband modem 1333, and an RF module 1334.

Processor each includes components having predetermined functions that are integrated on a semiconductor chip by SoC (System On a Chip), and some of the processors are referred to, for example, as system LSI (Large Scale Integration) or the like. The components having predetermined functions may be logic circuits (hardware components), CPUs, ROMs, RAMs, and the like and a program (software component) executed using them (software configuration), or may be a combination of both of them. For example, a processor may include a logic circuit, and CPU. ROM, RAM, and the like, and a portion of functions may be achieved by a logic circuit (hardware component), and the other functions may be achieved by a program (software component) executed by the CPU.

The application processor 1331 of FIG. 46 is a processor that executes an application related to image processing. The application executed by this application processor 1331 is able to not only execute an arithmetic process to achieve a predetermined function, but also control a component, for example, the video processor 1332 and the like inside and outside the video module 1311 as necessary.

The video processor 1332 is a processor having a function related to image encoding/decoding (one or both thereof).

The broadband modem 1333 performs digital modulation or the like on data (digital signal) to be transmitted through wired or wireless (or both wired and wireless) broadband communication performed via a broadband line such as the Internet or a public telephone network to convert the data into an analog signal, or demodulates an analog signal received through the broadband communication to convert the analog signal into data (digital signal). The broadband modem 1333 processes any information such as, for example, image data to be processed by the video processor 1332, a stream in which image data is encoded, an application program, or setting data.

The RF module 1334 is a module that performs frequency conversion, modulation and demodulation, amplification, a filter process, and the like on an RF (Radio Frequency) signal to be transmitted or received via an antenna. For example, the RF module 1334 performs frequency conversion and the like on a baseband signal generated by the broadband modem 1333 to generate an RF signal. In addition, for example, the RF module 1334 performs frequency conversion and the like on an RF signal received via the front end module 1314 to generate a baseband signal.

It is to be noted that, as illustrated by a broken line 1341 in FIG. 46, the application processor 1331 and the video processor 1332 may be integrated to be configured as one processor.

The external memory 1312 is a module provided outside the video module 1311 and having a storage device used by the video module 1311. Although this storage device of the external memory 1312 may be achieved by any physical component, the storage device is generally used for storage of a large amount of data such as image data in units of frames in many cases. Accordingly, it is desirable to achieve the storage device by a semiconductor memory that relatively costs less and has a large capacity like DRAM (Dynamic Random Access Memory).

The power management module 1313 manages and controls power supply to the video module 1311 (each component in the video module 1311).

The front end module 1314 is a module that provides a front end function (circuit at a transmission/reception end of the antenna side) to the RF module 1334. As illustrated in FIG. 46, the front end module 1314 includes, for example, an antenna section 1351, a filter 1352, and an amplification section 1353.

The antenna section 1351 includes an antenna for transmitting and receiving a wireless signal, and a peripheral component. The antenna section 1351 transmits a signal supplied from the amplification section 1353 as a wireless signal, and supplies a received wireless signal as an electric signal (RF signal) to the filter 1352. The filter 1352 performs a filter process and the like on an RF signal received via the antenna section 1351, and supplies the processed RF signal to the RF module 1334. The amplification section 1353 amplifies the RF signal supplied from the RF module 1334, and supplies the antenna section 1351.

The connectivity 1321 is a module having a function related to coupling to the outside. The connectivity 1321 includes any physical component. For example, the connectivity 1321 includes a component, an external input/output terminal, and the like having a communication function according to a standard other than a communication standard with which the broadband modem 1333 is compatible.

For example, the connectivity 1321 may include a module having a communication function that complies with a wireless communication standard such as Bluetooth (registered trademark), IEEE 802.11 (e.g., Wi-Fi (Wireless Fidelity, registered trademark)), NFC (Near Field Communication), or IrDA (InfraRed Data Association), an antenna for transmitting and receiving a signal that complies with the standard, and the like. In addition, for example, the connectivity 1321 may include a module having a communication function that complies with a wired communication standard such as USB (Universal Serial Bus) or HDMI (registered trademark) (High-Definition Multimedia Interface), a terminal that complies with the standard, and the like. Further, for example, the connectivity 1321 may have other data (signal) transmission functions and the like such as an analog input/output terminal.

It is to be noted that the connectivity 1321 may include a device of a transmission destination of data (signal). For example, the connectivity 1321 may include a drive (including not only a drive for a removable medium, but also a hard disk, SSD (Solid State Drive), NAS (Network Attached Storage), and the like) for reading and writing of data from and into a recording medium such as a magnetic disk, an optical disc, a magneto-optical disk, or a semiconductor memory. In addition, the connectivity 1321 may include an output device (such as a monitor or a speaker) of an image or a sound.

The camera 1322 is a module having a function of imaging object to obtain image data of the object. The image data obtained by imaging of the camera 1322 is, for example, supplied to the video processor 1332 and encoded.

The sensor 1323 is a module having any sensor function such as, for example, an audio sensor, an ultrasonic sensor, an optical sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, or a temperature sensor. Data detected by the sensor 1323 is supplied, for example, to the application processor 1331, and is used by an application or the like.

The component described above as a module may be achieved as a processor, and conversely, the component described as a processor may be achieved as a module.

In the video set 1300 configured as described above, the present technology is applicable to the video processor 1332 as described below. Accordingly, it is possible to carry out the video set 1300 as a set to which the present technology is applied.

(Configuration Example of Video Processor)

Figure 47:
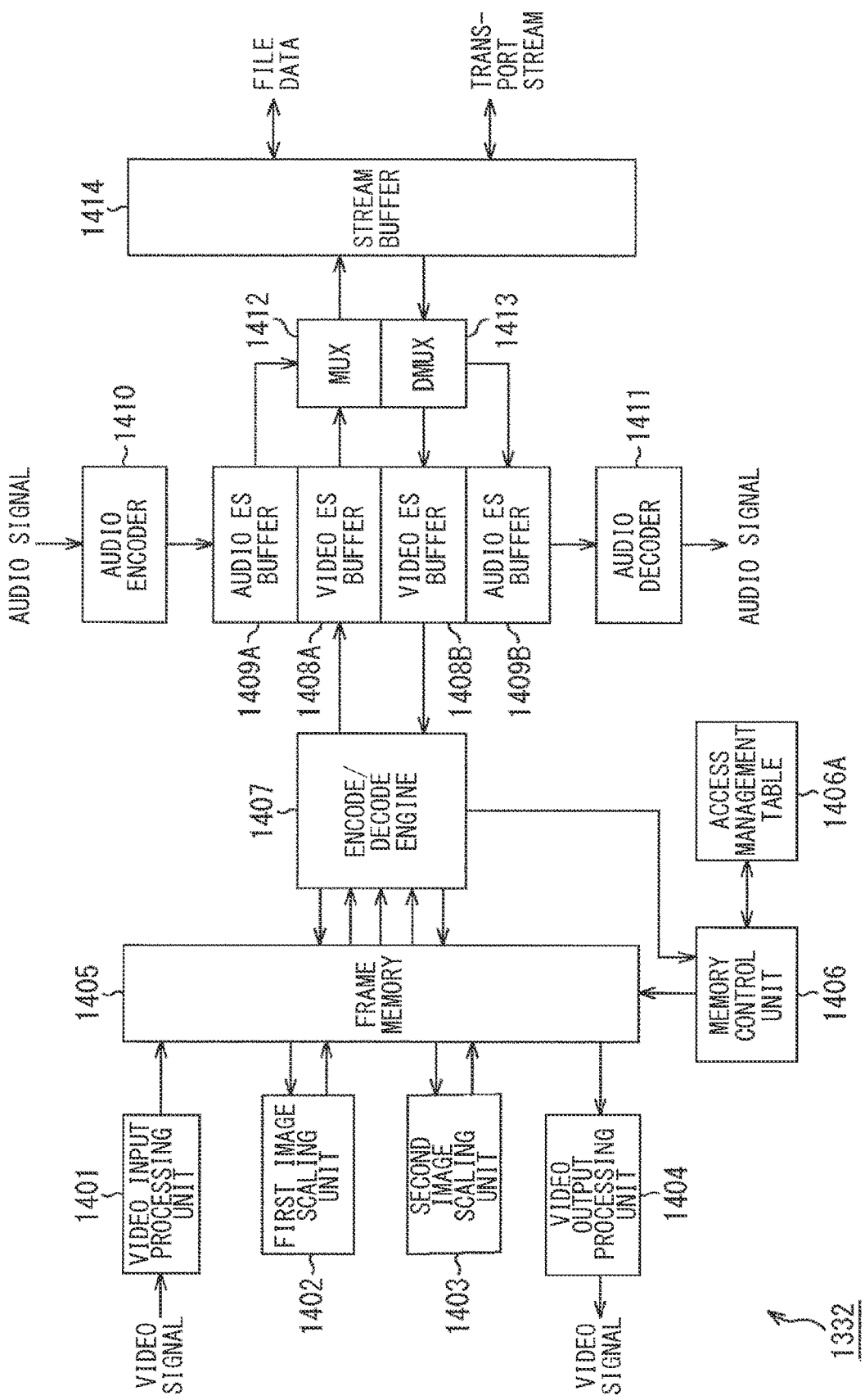
FIG. 47 is a block diagram illustrating an example of a schematic configuration of a video processor.

FIG. 47 illustrates an example of a schematic configuration of the video processor 1332 (FIG. 46) to which the present technology is applied.

In a case of the example of FIG. 47, the video processor 1332 has a function of receiving the input of a video signal and an audio signal and encoding them in a predetermined scheme, and a function of decoding encoded video data and audio data and reproducing and outputting a video signal and an audio signal.

As illustrated in FIG. 47, the video processor 1332 includes a video input processing unit 1401, a first image scaling unit 1402, a second image scaling unit 1403, a video output processing unit 1404, a frame memory 1405, and a memory control unit 1406. In addition, the video processor 1332 includes an encode/decode engine 1407, video ES (Elementary Stream) buffers 1408A and 1408B, and audio ES buffers 1409A and 1409B. Further, the video processor 1332 includes an audio encoder 1410, an audio decoder 1411, a multiplexing unit (MUX (Multiplexer)) 1412, a demultiplexing unit (DMUX (Demultiplexer)) 1413, and a stream buffer 1414.

The video input processing unit 1401 acquires a video signal inputted, for example, from the connectivity 1321 (FIG. 46) or the like, and converts the acquired video signal into digital image data. The first image scaling unit 1402 performs format conversion, an image scaling process, and the like on image data. The second image scaling unit 1403 performs an image scaling process on image data in accordance with a format at an outputting designation via the video output processing unit 1404, and performs format conversion, an image scaling process, and the like similar to those by the first image scaling unit 1402 on image data. The video output processing unit 1404 performs format conversion, conversion into an analog signal, and the like on image data, and outputs the resulting analog signal as a reproduced video signal, for example, to the connectivity 1321 and the like.

The frame memory 1405 is a memory for image data shared by the video input processing unit 1401, the first image scaling unit 1402, the second image scaling unit 1403, the video output processing unit 1404, and the encode/decode engine 1407. The frame memory 1405 is achieved as a semiconductor memory such as, for example, DRAM.

The memory control unit 1406 receives a synchronizing signal from the encode/decode engine 1407 and controls writing/reading access to the frame memory 1405 in accordance with the schedule of access to the frame memory 1405 written in an access management table 1406A. The access management table 1406A is updated by the memory control unit 1406 in accordance with a process executed by the encode/decode engine 1407, the first image scaling unit 1402, the second image scaling unit 1403, or the like.

The encode/decode engine 1407 performs an encoding process of image data and a decoding process of a video stream that is data obtained by encoding image data. For example, the encode/decode engine 1407 encodes image data read from the frame memory 1405, and successively writes the encoded image data as a video stream into the video ES buffer 1408A. In addition, for example, the encode/decode engine 1407 successively reads and decodes video streams from the video ES buffer 1408B, and successively writes the decoded video streams as image data into the frame memory 1405. The encode/decode engine 1407 uses the frame memory 1405 as a working area in the encoding and decoding. In addition, the encode/decode engine 1407 outputs a synchronizing signal to the memory control unit 1406 at timing at which, for example, a process for each macro-block is started.

The video ES buffer 1408A buffers a video stream generated by the encode/decode engine 1407, and supplies the multiplexing unit (MUX) 1412. The video ES buffer 1408B buffers a video stream supplied from the demultiplexing unit (DMUX) 1413, and supplies the encode/decode engine 1407.

The audio ES buffer 1409A buffers an audio stream generated by the audio encoder 1410, and supplies the multiplexing unit (MUX) 1412. The audio ES buffer 1409B buffers an audio stream supplied from the demultiplexing unit (DMUX) 1413, and supplies the audio decoder 1411.

The audio encoder 1410, for example, digitally converts an audio signal inputted, for example, from the connectivity 1321 or the like, and encodes the digital audio signal in a predetermined scheme such as, for example, an MPEG audio scheme or an AC3 (Audio Code number 3) scheme. The audio encoder 1410 successively writes audio streams that are data obtained by encoding audio signals into the audio ES buffer 1409A. The audio decoder 1411 decodes an audio stream supplied from the audio ES buffer 1409B, performs, for example, conversion into an analog signal or the like, and supplies, for example, the connectivity 1321 or the like as a reproduced audio signal.

The multiplexing unit (MUX) 1412 multiplexes a video stream and an audio stream. This multiplexing is performed in any method (i.e., format of a bit stream to be generated by the multiplexing). In addition, upon this multiplexing, it is also possible for the multiplexing unit (MUX) 1412 to add predetermined header information and the like to the bit stream. That is, the multiplexing unit (MUX) 1412 is able to convert the format of the stream by the multiplexing. For example, the multiplexing unit (MUX) 1412 multiplexes a video stream and an audio stream to convert the streams into a transport stream that is a bit stream of a format for transfer. In addition, for example, the multiplexing unit (MUX) 1412 multiplexes a video stream and an audio stream to convert the streams into data (file data) of a file format for recording.

The demultiplexing unit (DMUX) 1413 demultiplexes a bit stream in which a video stream and an audio stream are multiplexed in a method corresponding to that of the multiplexing by the multiplexing unit (MUX) 1412. That is, the demultiplexing unit (DMUX) 1413 extracts a video stream and an audio stream from a bit stream read from the stream buffer 1414 (demultiplexes a video stream and an audio stream from each other). In short, the demultiplexing unit (DMUX) 1413 is able to convert (inverse conversion to the conversion by the multiplexing unit (MUX) 1412) the format of a stream by demultiplexing. For example, the demultiplexing unit (DMUX) 1413 is able to convert a transport stream supplied, for example, from the connectivity 1321, the broadband modem 1333, or the like into a video stream and an audio stream by acquiring the transport stream via the stream buffer 1414 and demultiplexing the transport stream. In addition, for example, the demultiplexing unit (DMUX) 1413 is able to convert file data read from various recording media, for example, by the connectivity 1321 into a video stream and an audio stream by acquiring the file data via the stream buffer 1414 and demultiplexing the file data.

The stream buffer 1414 buffers the bitstream. For example, the stream buffer 1414 buffers a transport stream supplied from the multiplexing unit (MUX) 1412, and supplies, for example, the connectivity 1321, the broadband modem 1333, and the like at predetermined timing or on the basis of a request from the outside or the like.

In addition, for example, the stream buffer 1414 buffers file data supplied from the multiplexing unit (MUX) 1412, and supplies, for example, the connectivity 1321 and the like at predetermined timing or on the basis of a request from the outside or the like to cause the file data to be recorded on various recording media.

Further, the stream buffer 1414 buffers a transport stream acquired, for example, via the connectivity 1321, broadband modem 1333, or the like, and supplies the demultiplexing unit (DMUX) 1413 at predetermined timing or on the basis of a request from the outside or the like.

In addition, the stream buffer 1414 buffers file data read from various recording media, for example, by the connectivity 1321 or the like, and supplies the demultiplexing unit (DMUX) 1413 at predetermined timing or on the basis of a request from the outside or the like.

Next, an example of the operation of the video processor 1332 configured in this manner is described. For example, a video signal inputted from the connectivity 1321 or the like to the video processor 1332 is converted into digital image data in a predetermined scheme such as a 4:2:2 Y/Cb/Cr scheme by the video input processing unit 1401, and is successively written into the frame memory 1405. This digital image data is read into the first image scaling unit 1402 or the second image scaling unit 1403, subjected to format conversion to that of a predetermined scheme such as the 4:2:0 Y/Cb/Cr scheme and a scaling process, and then written into the frame memory 1405 again. This image data is encoded by the encode/decode engine 1407, and written as a video stream into the video ES buffer 1408A.

In addition, an audio signal inputted from the connectivity 1321 or the like to the video processor 1332 is encoded by the audio encoder 1410, and written as an audio stream into the audio ES buffer 1409A.

The video stream of the video ES buffer 1408A and the audio stream of the audio ES buffer 1409A are read to and multiplexed by the multiplexing unit (MUX) 1412 to be converted into a transport stream, file data, or the like. The transport stream generated by the multiplexing unit (MUX) 1412 is buffered by the stream buffer 1414, and then is outputted to an external network, for example, via the connectivity 1321, broadband modem 1333, or the like. In addition, the file data generated by the multiplexing unit (MUX) 1412 is buffered by the stream buffer 1414, outputted, for example, to the connectivity 1321 or the like, and then recorded on various recording media.

In addition, a transport stream inputted from an external network to the video processor 1332, for example, via the connectivity 1321, the broadband modem 1333, and the like is buffered by the stream buffer 1414, and then demultiplexed by the demultiplexing unit (DMUX) 1413. In addition, file data read from various recording media, for example, by the connectivity 1321 or the like and inputted to the video processor 1332 is buffered by the stream buffer 1414, and then demultiplexed by the demultiplexing unit (DMUX) 1413. That is, a transport stream or file data inputted to the video processor 1332 is demultiplexed into a video stream and an audio stream by the demultiplexing unit (DMUX) 1413.

The audio stream is supplied via the audio ES buffer 1409B to and decoded by the audio decoder 1411 to reproduce an audio signal. In addition, the video streams are successively read, after written into the video ES buffer 1408B, and decoded by the encode/decode engine 1407 and written into the frame memory 1405. The decoded image data is subjected to a scaling process by the second image scaling unit 1403 and is written into the frame memory 1405. Then, the decoded image data is read into the video output processing unit 1404 and subjected to format conversion to a predetermined format such as the 4:2:2 Y/Cb/Cr scheme. The decoded image data is further converted into an analog signal, and a video signal is reproduced and outputted.

In a case where the present technology is applied to the video processor 1332 configured in this manner as described above, the present technology according to the respective embodiments described above may be applied to the encode/decode engine 1407. That is, for example, the encode/decode engine 1407 may have the function of the image encoding device 100 or the function of the image decoding device 200 described above or both of them. This allows the video processor 1332 to obtain effects similar to those of each of the embodiments described above.

It is to be noted that, in the encode/decode engine 1407, the present technology (i.e., the function of the image encoding device 100 or the function of the image decoding device 200 or both of them) may be achieved by hardware such as a logic circuit or by software such as an incorporated program or may be achieved by both of them.

(Another Configuration Example of Video Processor)

Figure 48:
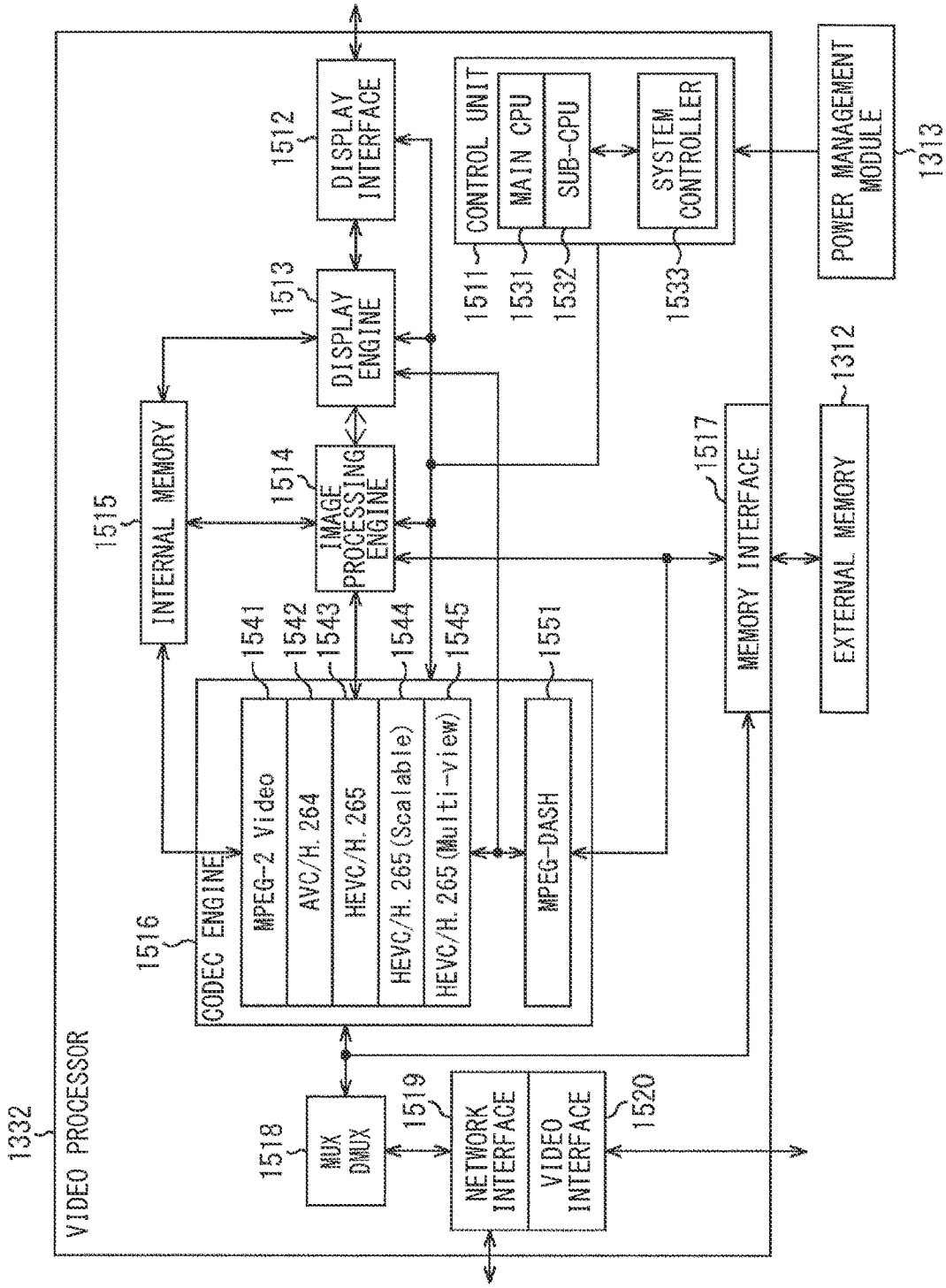
FIG. 48 is a block diagram illustrating another example of the schematic configuration of the video processor.

FIG. 48 illustrates another example of the schematic configuration of the video processor 1332 to which the present technology is applied. In a case of the example of FIG. 48, the video processor 1332 has a function of encoding/decoding video data in a predetermined scheme.

More specifically, as illustrated in FIG. 48, the video processor 1332 includes a control unit 1511, a display interface 1512, a display engine 1513, an image processing engine 1514, and an internal memory 1515. In addition, the video processor 1332 includes a codec engine 1516, a memory interface 1517, a multiplexing/demultiplexing unit (MUX DMUX) 1518, a network interface 1519, and a video interface 1520.

The control unit 1511 controls the operation of the respective processing units in the video processor 1332 such as the display interface 1512, the display engine 1513, the image processing engine 1514, and the codec engine 1516.

As illustrated in FIG. 48, the control unit 1511 includes, for example, main CPU 1531, sub-CPU 1532, and a system controller 1533. The main CPU 1531 executes a program and the like for controlling the operation of the respective processing units in the video processor 1332. The main CPU 1531 generates a control signal in accordance with the program and the like, and supplies the respective processing units (i.e., controls the operation of the respective processing units). The sub-CPU 1532 plays an auxiliary role of the main CPU 1531. For example, the sub-CPU 1532 executes a child process, a subroutine, or the like of the program or the like executed by the main CPU 1531. The system controller 1533 controls the operation of the main CPU 1531 and the sub-CPU 1532 such as designating programs to be executed by the main CPU 1531 and the sub-CPU 1532.

The display interface 1512 outputs image data, for example, to the connectivity 1321 and the like under the control of the control unit 1511. For example, the display interface 1512 converts image data in the form of digital data into an analog signal, and outputs the image data as a reproduced video signal, or the image data of digital data as it is, to a monitor or the like of the connectivity 1321.

The display engine 1513 performs various conversion processes such as format conversion, size conversion, and color region conversion on the image data under the control of the control unit 1511 to match the hardware specifications of a monitor or the like on which an image thereof is to be displayed.

The image processing engine 1514 performs predetermined image processing such as, for example, a filter process to improve the image quality on the image data under the control of the control unit 1511.

The internal memory 1515 is a memory that is provided in the inside of the video processor 1332 and shared by the display engine 1513, the image processing engine 1514, and the codec engine 1516. The internal memory 1515 is used for transfer of data performed, for example, between the display engine 1513, the image processing engine 1514, and the codec engine 1516. For example, the internal memory 1515 stores data supplied from the display engine 1513, the image processing engine 1514, or the codec engine 1516, and supplies, as necessary (e.g., in accordance with a request), the data to the display engine 1513, the image processing engine 1514, or the codec engine 1516. Although this internal memory 1515 may be achieved by any storage device, it is generally used for storage of a small amount of data such as image data in units of blocks or parameters in many cases. Accordingly, it is desirable that the internal memory 1515 be achieved by a semiconductor memory that has a relatively (e.g., in comparison with the external memory 1312) small capacity, but is high in response speed like, for example, SRAM (Static Random Access Memory).

The codec engine 1516 performs a process for encoding or decoding image data. This codec engine 1516 is compatible with any encoding/decoding scheme, and may be compatible with one or a plurality of schemes. For example, the codec engine 1516 may have codec functions of a plurality of encoding and decoding schemes, and encode image data or decode encoded data by a codec function selected from the codec functions.

In the example illustrated in FIG. 48, the codec engine 1516 includes, as functional blocks for a process for the codec, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551.

The MPEG-2 Video 1541 is a functional block that encodes or decodes image data in the MPEG-2 scheme. The AVC/H.264 1542 is a functional block that encodes or decodes image data in the AVC scheme. The HEVC/H.265 1543 is a functional block that encodes or decodes image data in the HEVC scheme. The HEVC/H. 265 (Scalable) 1544 is a functional block that scalably encodes or scalably decodes image data in the HEVC scheme. The HEVC/H.265 (Multi-view) 1545 is a functional block that multi-visually encodes or multi-visually decodes image data in the HEVC scheme.

The MPEG-DASH 1551 is a functional block that transmits and receives image data in the MPEG-DASH (MPEG-Dynamic Adaptive Streaming over HTTP) scheme. MPEG-DASH is a technology for performing streaming of a video by using the HTTP (HyperText Transfer Protocol), and has one of characteristics in that appropriate encoded data is selected and transmitted in units of segments from among a plurality of pieces of encoded data that are prepared in advance and are different from each other in resolution and the like. The MPEG-DASH 1551 performs generation of a stream that complies with the standard, transmission control of the stream, and the like, and for encoding/decoding of image data, the MPEG-2 Video 1541 to HEVC/H.265 (Multi-view) 1545 described above are used.

The memory interface 1517 is an interface for the external memory 1312. Data supplied from the image processing engine 1514 or the codec engine 1516 is supplied to the external memory 1312 via the memory interface 1517. In addition, data read from the external memory 1312 is supplied to the video processor 1332 (image processing engine 1514 or codec engine 1516) via the memory interface 1517.

The multiplexing/demultiplexing unit (MUX DMUX) 1518 multiplexes and demultiplexes of various kinds of data related to an image such as a bit stream of encoded data, image data, and a video signal. This multiplexing/demultiplexing is performed in any method. For example, upon multiplexing, the multiplexing/demultiplexing unit (MUX DMUX) 1518 is able to not only collect a plurality of pieces of data into one piece of data, but also add predetermined header information and the like to the data. In addition, upon demultiplexing, the multiplexing/demultiplexing unit (MUX DMUX) 1518 is able to not only partition one piece of data into a plurality of pieces of data, but also add predetermined header information and the like to each of the partitioned pieces of data. That is, the multiplexing/demultiplexing unit (MUX DMUX) 1518 is able to convert the format of data by multiplexing/demultiplexing. For example, the multiplexing/demultiplexing unit (MUX DMUX) 1518 is able to perform conversion into a transport stream that is a bit stream in a format for transfer or data (file data) in a file format for recording by multiplexing bit streams. Naturally, demultiplexing also allows for inverse conversion.

The network interface 1519 is an interface, for example, for the broadband model 1333, the connectivity 1321, and the like. The video interface 1520 is an interface, for example, for the connectivity 1321, the camera 1322, and the like.

Next, an example of the operation of the video processor 1332 like this is described. For example, when a transport stream is received from an external network via the connectivity 1321, the broadband modem 1333, or the like, the transport stream is supplied via the network interface 1519 to and demultiplexed by the multiplexing-demultiplexing unit (MUX DMUX) 1518 and is decoded by the codec engine 1516. Image data obtained by decoding of the codec engine 1516 is subjected, for example, to predetermined image processing by the image processing engine 1514, subjected to predetermined conversion by the display engine 1513, supplied, for example, to the connectivity 1321 or the like via the display interface 1512, and an image thereof is displayed on the monitor. In addition, for example, the image data obtained by decoding of the codec engine 1516 is re-encoded by the codec engine 1516, multiplexed by the multiplexing/demultiplexing unit (MUX DMUX) 1518 for conversion into file data, outputted, for example, to the connectivity 1321 or the like via the video interface 1520, and recorded on various recording media.

Further, file data of encoded data obtained by encoding image data and read from a recording medium not illustrated, for example, by the connectivity 1321 or the like is supplied via the video interface 1520 to and demultiplexed by the multiplexing/demultiplexing unit (MUX DMUX) 1518, and decoded by the codec engine 1516. Image data obtained by decoding of the codec engine 1516 is subjected to predetermined image processing by the image processing engine 1514, subjected to predetermined conversion by the display engine 1513, supplied, for example, to the connectivity 1321 or the like via the display interface 1512, and an image thereof is displayed on the monitor. In addition, for example, the image data obtained by decoding of the codec engine 1516 is re-encoded by the codec engine 1516, multiplexed by the multiplexing/demultiplexing unit (MUX DMUX) 1518 for conversion into a transport stream, supplied, for example, to the connectivity 1321, the broadband modem 1333, and the like via the network interface 1519, and transmitted to another apparatus not illustrated.

It is to be noted that image data or other data is transferred between the respective processing units in the video processor 1332, for example, by using the internal memory 1515 or the external memory 1312. In addition, the power management module 1313 controls power supply, for example, to the control unit 1511.

In a case where the present technology is applied to the video processor 1332 configured in this manner as described above, the present technology according to the respective embodiments described above may be applied to the codec engine 1516. That is, for example, the codec engine 1516 may have the function of the image encoding device 100 or the function of the image decoding device 200 described above or both of them. This allows the video processor 1332 to obtain effects similar to those of each of the embodiments described above.

It is to be noted that, in the codec engine 1516, the present technology (i.e., the function of the image encoding device 100) may be achieved by hardware such as a logic circuit or by software such as an incorporated program or may be achieved by both of them.

While two examples of the configuration of the video processor 1332 are demonstrated above, the video processor 1332 may have any configuration and have a configuration other than the two examples described above. In addition, although this video processor 1332 may be configured as one semiconductor chip, the video processor 1332 may also be configured as a plurality of semiconductor chips. The video processor 1332 may be, for example, three-dimensional stacked LSI in which a plurality of semiconductors is stacked. In addition, the video processor 1332 may be achieved by a plurality of LSIs.

(Example of Application to Apparatus)

It is possible to incorporate the video set 1300 into various apparatuses that process image data. For example, it is possible to incorporate the video set 1300 into the television apparatus 900 (FIG. 42), the mobile phone 920 (FIG. 43), the recording/reproducing apparatus 940 (FIG. 44), the imaging apparatus 960 (FIG. 45), and the like. Incorporating the video set 1300 into an apparatus allows the apparatus to obtain effects similar to those of the respective embodiments described above.

It is to be noted that it is possible to carry out even a portion of the respective components of the video set 1300 described above as a component to which the present technology is applied as long as the component includes the video processor 1332. For example, it is possible to carry out the video processor 1332 alone as a video processor to which the present technology is applied. In addition, for example, it is possible to carry out the processor indicated by the broken line 1341, the video module 1311, or the like as a processor, a module, or the like to which the present technology is applied as described above. Further, for example, it is possible to carry out the video module 1311, the external memory 1312, the power management module 1313, and the front end module 1314 in combination as a video unit 1361 to which the present technology is applied. In a case of any of the configurations, it is possible to obtain effects similar to those of the embodiments described above.

That is, it is possible to incorporate any component into various apparatuses that process image data similarly to a case of the video set 1300 as long as the component includes the video processor 1332. For example, it is possible to incorporate the video processor 1332, the processor indicated by the broken line 1341, the video module 1311, or the video unit 1361 into the television apparatus 900 (FIG. 42), the mobile phone 920 (FIG. 43), the recording/reproducing apparatus 940 (FIG. 44), the imaging apparatus 960 (FIG. 45), and the like. Incorporating any of the components to which the present technology is applied into an apparatus then allows the apparatus to obtain effects similar to those of the respective embodiments described above similarly to a case of the video set 1300.

<Network System>

Figure 49:
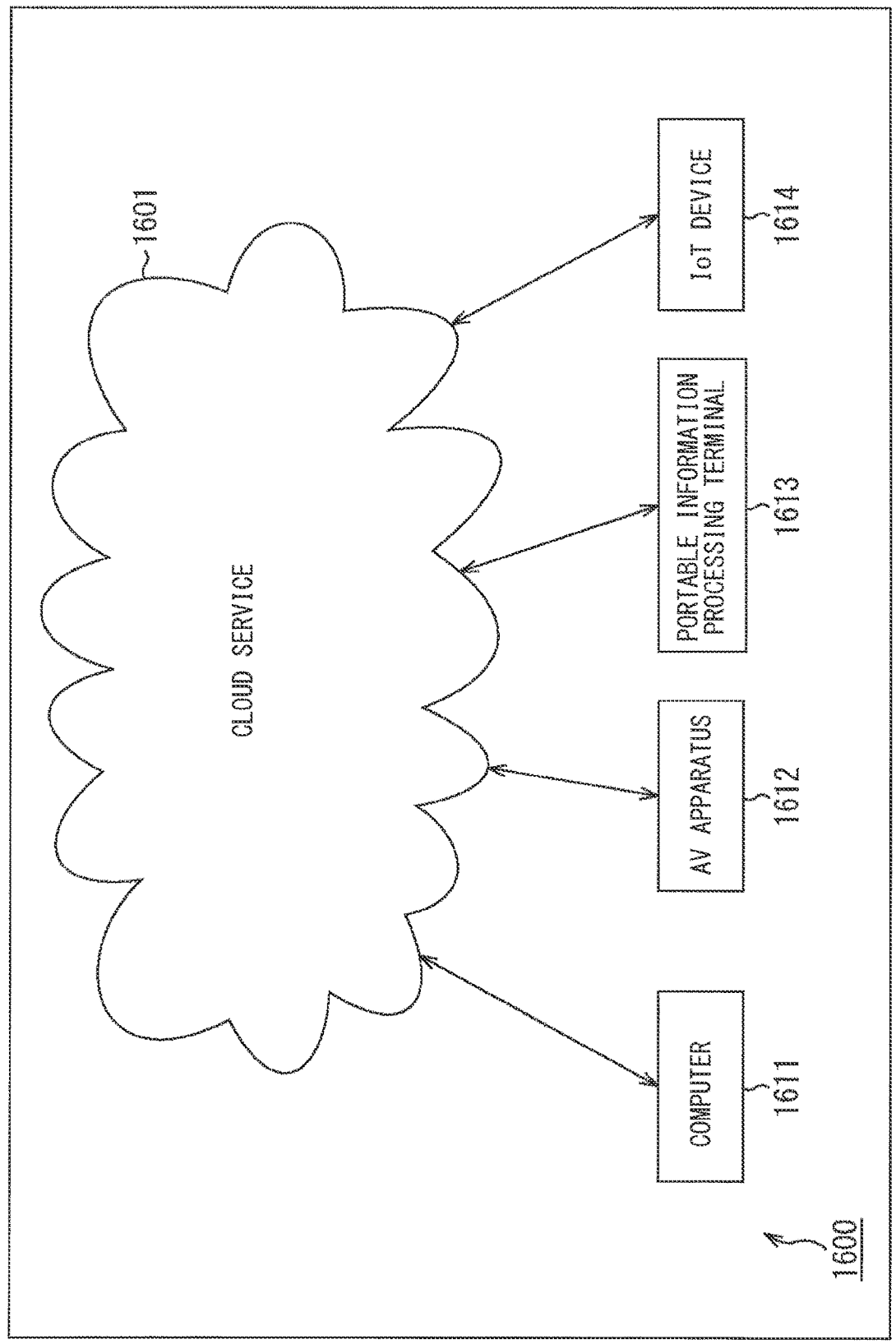
FIG. 49 is a block diagram illustrating an example of a schematic configuration of a network system.

In addition, the present technology is also applicable to a network system including a plurality of apparatuses. FIG. 49 illustrates an example of a schematic configuration of a network system to which the present technology is applied.

A network system 1600 illustrated in FIG. 49 is a system in which apparatuses transfer information regarding an image (moving image) via a network therebetween. A cloud service 1601 of this network system 1600 is a system that provides a service regarding an image (moving image) to terminals such as a computer 1611, an AV (Audio Visual) apparatus 1612, a portable information processing terminal 1613, and an IoT (Internet of Things) device 1614 coupled to the cloud service 1601 to allow for communication. For example, the cloud service 1601 provides a supplying service of content of an image (moving image) like so-called video distribution (on-demand or live distribution) to a terminal. In addition, for example, the cloud service 1601 provides a backup service for receiving content of an image (moving image) from a terminal for storage. In addition, for example, the cloud service 1601 provides a service for mediating transfer of content of an image (moving image) between terminals.

The cloud service 1601 includes any physical component. For example, the cloud service 1601 may include various servers such as a server that stores and manages moving images, a server that distributes a moving image to a terminal, a server that acquires a moving image from a terminal, and a server that manage users (terminals) or accounting, or any network such as the Internet or LAN.

The computer 1611 includes an information processing apparatus such as, for example, a personal computer, a server, or a work station. The AV apparatus 1612 includes an image processing apparatus such as, for example, a television receiver, a hard disk recorder, a game console, or a camera. The portable information processing terminal 1613 includes a portable information processing apparatus such as, for example, a notebook personal computer, a tablet terminal, a mobile phone, or a smartphone. The IoT device 1614 includes any entity that performs a process for an image such as, for example, a machine, a home appliance, furniture, another article, an IC tag, and a card type device. Those terminals each have a communication function, and are each able to couple (establish a session) to the cloud service 1601 and transfer information (i.e., communicate) with the cloud service 1601. In addition, each terminal is also able to communicate with another terminal. Communication between terminals may be performed via the cloud service 1601 or may be performed without the intervention of the cloud service 1601.

The present technology may be applied to the network system 1600 as described above to, when data of an image (moving image) is transferred between terminals or between a terminal and the cloud service 1601, encode/decode the image data as described above in the respective embodiments. That is, the terminals (computer 1611 to IoT device 1614) and the cloud service 1601 may each have the functions of the image encoding device 100 or the image decoding device 200 described above. This allows the terminals (computer 1611 to IoT device 1614) and the cloud service 1601 between which image data is transferred to obtain effects similar to those of the respective embodiments described above.

It is to be noted that various kinds of information regarding encoded data (bit stream) may be multiplexed on the encoded data and then transmitted or recorded, or may be transmitted or recorded as separate data associated with the encoded data without being multiplexed on the encoded data. Here, the term "associate" means that, when one of pieces of data is, for example, to be processed, the other piece of data may be used (linked). That is, the pieces of data that are associated with each other may be collected as one piece of data or may be made individual pieces of data. For example, information associated with encoded data (image) may be transmitted on a transmission path different from that for the encoded data (image). In addition, for example, information associated with encoded data (image) may be recorded on a recording medium (or into a different recording area of the same recording medium) different from that for the encoded data (image). It is to be noted that this "association" does not have to be exerted on the entire data, but a portion of the data. For example, an image and information corresponding to the image may be associated with each other in any units such as a plurality of frames, one frame, or a portion of a frame.

In addition, as described above, the terms "synthesize," "multiplex," "add," "integrate," "include," "store," "place into," "fit into," and "insert." and the like mean herein that a plurality of things is collected into one thing such as, for example, collecting encoded data and metadata into one, and means one method of "associate" described above.

It is to be noted that the effects described in this specification are merely illustrative and not limitative. Other effects may be provided.

In addition, embodiments of the present technology are not limited to the embodiments described above, but various alterations may occur insofar as they are within the scope of the present technology.

It is to be noted that the present technology is able to adopt the following configurations.

<1>
A decoding device including:
a decoding unit that decodes tap coefficients of respective classes, the tap coefficients being each obtained through learning for minimizing an error by using a decoding in-progress image and an original image, the decoding in-progress image being obtained by adding a residual of predictive coding and a predicted image together, the original image corresponding to the decoding in-progress image;
a classification section that performs classification of classifying a pixel of interest of the decoding in-progress image into any of a plurality of classes by using an inclination feature amount, the inclination feature amount indicating a tangent direction of a contour line of pixel values of the pixel of interest; and
an arithmetic operation unit that performs a filter arithmetic operation with the decoding in-progress image by using a tap coefficient of a class of the pixel of interest among the tap coefficients of the respective classes.

<2>
The decoding device according to <1>, in which the classification section classifies the pixel of interest by using the inclination feature amount of the pixel of interest and reliability of the inclination feature amount of the pixel of interest.

<3>
The decoding device according to <2>, in which
the inclination feature amount of the pixel of interest is a representative value, the representative value representing the tangent directions of the contour lines of respective pixels of a peripheral region of the pixel of interest, and
the reliability of the inclination feature amount of the pixel of interest indicates a degree to which the tangent directions of the contour lines of the respective pixels of the peripheral region do not include a direction different from a direction indicated by the representative value.

<4>
The decoding device according to <2> or <3>, in which the classification section classifies the pixel of interest by further using another feature amount of the pixel of interest other than the inclination feature amount and the reliability.

<5>
The decoding device according to <4>, in which the other feature amount includes a feature amount indicating a high frequency component of a peripheral region of the pixel of interest.

<6>
The decoding device according to any of <1> to <5>, in which
the decoding unit decodes a predetermined classification parameter, the predetermined classification parameter being used in the classification to process a feature amount of the pixel of interest, and
the classification section classifies the pixel of interest by processing the feature amount of the pixel of interest with the classification parameter.

<7>
The decoding device according to <6>, in which the classification parameter is generated by using the original image to equally classify pixels into the plurality of respective classes.

<8>
The decoding device according to any of <1> to <7>, in which the decoding unit decodes differential coefficients, the differential coefficients including differences between tap coefficients of a class for a first direction into which a pixel having the inclination feature amount indicating the first direction is classified and tap coefficients of a class for a second direction into which a pixel having the inclination feature amount indicating the second direction is classified, the tap coefficients of the class for the first direction being reordered in accordance with rotational symmetry of the tap coefficients of the class for the first direction and the tap coefficient in the class for the second direction.

<9>

The decoding device according to any of <1> to <8>, in which the tap coefficients of the respective classes have tap structures, the tap structures being different from each other between the respective classes.

<10>

A decoding method including, by a decoding device:

decoding tap coefficients of respective classes, the tap coefficients being each obtained through learning for minimizing an error by using a decoding in-progress image and an original image, the decoding in-progress image being obtained by adding a residual of predictive coding and a predicted image together, the original image corresponding to the decoding in-progress image:

performing classification of classifying a pixel of interest of the decoding in-progress image into any of a plurality of classes by using an inclination feature amount, the inclination feature amount indicating a tangent direction of a contour line of pixel values of the pixel of interest; and performing a filter arithmetic operation with the decoding in-progress image by using a tap coefficient of a class of the pixel of interest among the tap coefficients of the respective classes.

<11>

An encoding device including:

a classification section that performs classification of classifying a pixel of interest of a decoding in-progress image into any of a plurality of classes by using an inclination feature amount, the inclination feature amount indicating a tangent direction of a contour line of pixel values of the pixel of interest, the decoding in-progress image being obtained by adding a residual of predictive coding and a predicted image together;

an arithmetic operation unit that performs a filter arithmetic operation with the decoding in-progress image by using a tap coefficient of a class of the pixel of interest among tap coefficients of the respective classes, the tap coefficients of the respective classes being each obtained through learning for minimizing an error by using the decoding in-progress image and an original image, the original image corresponding to the decoding in-progress image; and an encoding unit that encodes the tap coefficient.

<12>

The encoding device according to <11>, in which the classification section classifies the pixel of interest by using the inclination feature amount of the pixel of interest and reliability of the inclination feature amount of the pixel of interest.

<13>

The encoding device according to <12>, in which the inclination feature amount of the pixel of interest is a representative value, the representative value representing the tangent directions of the contour lines of respective pixels of a peripheral region of the pixel of interest, and the reliability of the inclination feature amount of the pixel of interest indicates a degree to which the tangent directions of the contour lines of the respective pixels of the peripheral region do not include a direction different from a direction indicated by the representative value.

<14>

The encoding device according to <12> or <13>, in which the classification section classifies the pixel of interest by further using another feature amount of the pixel of interest other than the inclination feature amount and the reliability.

<15>

The encoding device according to <14>, in which the other feature amount includes a feature amount indicating a high frequency component of a peripheral region of the pixel of interest.

<16>

The encoding device according to any of <11> to <15>, in which the classification section classifies the pixel of interest by processing a feature amount of the pixel of interest with a predetermined classification parameter, and the encoding unit encodes the classification parameter.

<17>

The encoding device according to <16>, further including a classification parameter generation unit that generates the classification parameter by using the original image to equally classify pixels into the plurality of respective classes.

<18>

The encoding device according to any of <11> to <17>, in which the encoding unit encodes differential coefficients instead of tap coefficients of a class for a second direction into which a pixel having the inclination feature amount indicating the second direction is classified, the differential coefficients including differences between tap coefficients of a class for a first direction into which a pixel having the inclination feature amount indicating the first direction is classified and the tap coefficients of the class for the second direction, the tap coefficients of the class for the first direction being reordered in accordance with rotational symmetry of the tap coefficients of the class for the first direction and the tap coefficients of the class for the second direction.

<19>

The encoding device according to any of <11> to <18>, in which the tap coefficients of the respective classes have tap structures, the tap structures being different from each other between the respective classes.

<20>

An encoding method including, by an encoding device:

performing classification of classifying a pixel of interest of a decoding in-progress image into any of a plurality of classes by using an inclination feature amount, the inclination feature amount indicating a tangent direction of a contour line of pixel values of the pixel of interest, the decoding in-progress image being obtained by adding a residual of predictive coding and a predicted image together;

performing a filter arithmetic operation with the decoding in-progress image by using a tap coefficient of a class of the pixel of interest among tap coefficients of the respective classes, the tap coefficients of the respective classes being each obtained through learning for minimizing an error by using the decoding in-progress image and an original image, the original image corresponding to the decoding in-progress image: and encoding the tap coefficient.

REFERENCE SIGNS LIST

11 Transmission medium, 12 Recording medium, 20 ALF processing unit, 21 Tap selection section, 22 Classification section, 23 Coefficient acquisition section, 24 Filter arithmetic operation section, 50 Learning unit, 51 Tap selection section, 52 Classification section, 53 Summing section, 54 Coefficient calculation section, 100 Image encoding device. 101 Arithmetic operation unit, 102 Orthogonal transform unit, 103 Orthogonal transform unit, 104 Lossless encoding unit, 105 Inverse quantization unit, 106 Inverse orthogonal transform unit. 107 Arithmetic operation unit, 108 DF, 109 SAO, 110 ALF, 111 DPB, 112 Prediction unit, 131 Classification parameter generation unit, 132 Learning unit, 133 ALF processing unit, 161 Tap selection section, 162 Classification section, 163 Summing section, 164 Coefficient calculation section, 171 Class block extraction section, 172 Inclination feature amount/reliability calculation section, 173 First classification section, 174 Feature amount calculation section, 175 Second classification section, 181 Tap selection section. 182 Classification section, 183 Coefficient acquisition section. 184 Filter arithmetic operation section. 191 Class block extraction section, 192 Inclination feature amount/reliability calculation section, 193 First classification section, 194 Feature amount calculation section, 195 Second classification section, 200 Image decoding device, 201 Lossless decoding unit, 202 Inverse quantization unit, 203 Inverse orthogonal transform unit. 204 Arithmetic operation unit, 205 DF, 206 SAO, 207 ALF, 208 DPB, 209 Prediction unit, 231 ALF processing unit, 241 Tap selection section, 242 Classification section, 243 Coefficient acquisition section. 244 Filter arithmetic operation section. 251 Class block extraction section. 252 Inclination feature amount/reliability calculation section, 253 First classification section, 254 Feature amount calculation section, 255 Second classification section

The invention claimed is:

1. A decoding device comprising:
a decoding unit that decodes tap coefficients of respective classes, the tap coefficients being each obtained through learning for minimizing an error by using a decoding in-progress image and an original image, the decoding in-progress image being obtained by adding a residual of predictive coding and a predicted image together, the original image corresponding to the decoding in-progress image;
a classification section that performs classification of classifying a pixel of interest of the decoding in-progress image into any of a plurality of classes by using an inclination feature amount, the inclination feature amount indicating a tangent direction of a contour line of pixel values of the pixel of interest; and
an arithmetic operation unit that performs a filter arithmetic operation with the decoding in-progress image by using a tap coefficient of a class of the pixel of interest among the tap coefficients of the respective classes,
wherein the decoding unit, the classification section, and the arithmetic operation unit are each implemented via at least one processor.

2. The decoding device according to claim 1, wherein the classification section classifies the pixel of interest by using the inclination feature amount of the pixel of interest and reliability of the inclination feature amount of the pixel of interest.

3. The decoding device according to claim 2, wherein the inclination feature amount of the pixel of interest is a representative value, the representative value representing the tangent directions of the contour lines of respective pixels of a peripheral region of the pixel of interest, and the reliability of the inclination feature amount of the pixel of interest indicates a degree to which the tangent directions of the contour lines of the respective pixels of the peripheral region do not include a direction different from a direction indicated by the representative value.

4. The decoding device according to claim 2, wherein the classification section classifies the pixel of interest by further using another feature amount of the pixel of interest other than the inclination feature amount and the reliability.

5. The decoding device according to claim 4, wherein the other feature amount includes a feature amount indicating a high frequency component of a peripheral region of the pixel of interest.

6. The decoding device according to claim 1, wherein
the decoding unit decodes a predetermined classification parameter, the predetermined classification parameter being used in the classification to process a feature amount of the pixel of interest, and
the classification section classifies the pixel of interest by processing the feature amount of the pixel of interest with the classification parameter.

7. The decoding device according to claim 6, wherein the classification parameter is generated by using the original image to equally classify pixels into the plurality of respective classes.

8. The decoding device according to claim 1, wherein the decoding unit decodes differential coefficients, the differential coefficients including differences between tap coefficients of a class for a first direction into which a pixel having the inclination feature amount indicating the first direction is classified and tap coefficients of a class for a second direction into which a pixel having the inclination feature amount indicating the second direction is classified, the tap coefficients of the class for the first direction being reordered in accordance with rotational symmetry of the tap coefficients of the class for the first direction and the tap coefficient in the class for the second direction.

9. The decoding device according to claim 1, wherein the tap coefficients of the respective classes have tap structures, the tap structures being different from each other between the respective classes.

10. A decoding method comprising, by a decoding device:
decoding tap coefficients of respective classes, the tap coefficients being each obtained through learning for minimizing an error by using a decoding in-progress image and an original image, the decoding in-progress image being obtained by adding a residual of predictive coding and a predicted image together, the original image corresponding to the decoding in-progress image;
performing classification of classifying a pixel of interest of the decoding in-progress image into any of a plurality of classes by using an inclination feature amount, the inclination feature amount indicating a tangent direction of a contour line of pixel values of the pixel of interest; and
performing a filter arithmetic operation with the decoding in-progress image by using a tap coefficient of a class of the pixel of interest among the tap coefficients of the respective classes.

11. An encoding device comprising:
a classification section that performs classification of classifying a pixel of interest of a decoding in-progress image into any of a plurality of classes by using an inclination feature amount, the inclination feature amount indicating a tangent direction of a contour line of pixel values of the pixel of interest, the decoding in-progress image being obtained by adding a residual of predictive coding and a predicted image together;

an arithmetic operation unit that performs a filter arithmetic operation with the decoding in-progress image by using a tap coefficient of a class of the pixel of interest among tap coefficients of the respective classes, the tap coefficients of the respective classes being each obtained through learning for minimizing an error by using the decoding in-progress image and an original image, the original image corresponding to the decoding in-progress image; and an encoding unit that encodes the tap coefficient, wherein the classification section, the arithmetic operation unit, and the encoding unit are each implemented via at least one processor.

12. The encoding device according to claim 11, wherein the classification section classifies the pixel of interest by using the inclination feature amount of the pixel of interest and reliability of the inclination feature amount of the pixel of interest.

13. The encoding device according to claim 12, wherein
the inclination feature amount of the pixel of interest is a representative value, the representative value representing the tangent directions of the contour lines of respective pixels of a peripheral region of the pixel of interest, and the reliability of the inclination feature amount of the pixel of interest indicates a degree to which the tangent directions of the contour lines of the respective pixels of the peripheral region do not include a direction different from a direction indicated by the representative value.

14. The encoding device according to claim 12, wherein the classification section classifies the pixel of interest by further using another feature amount of the pixel of interest other than the inclination feature amount and the reliability.

15. The encoding device according to claim 14, wherein the other feature amount includes a feature amount indicating a high frequency component of a peripheral region of the pixel of interest.

16. The encoding device according to claim 11, wherein
the classification section classifies the pixel of interest by processing a feature amount of the pixel of interest with a predetermined classification parameter, and the encoding unit encodes the classification parameter.

17. The encoding device according to claim 16, further comprising a classification parameter generation unit that generates the classification parameter by using the original image to equally classify pixels into the plurality of respective classes, wherein the classification parameter generation unit is implemented via at least one processor.

18. The encoding device according to claim 11, wherein the encoding unit encodes differential coefficients instead of tap coefficients of a class for a second direction into which a pixel having the inclination feature amount indicating the second direction is classified, the differential coefficients including differences between tap coefficients of a class for a first direction into which a pixel having the inclination feature amount indicating the first direction is classified and the tap coefficients of the class for the second direction, the tap coefficients of the class for the first direction being reordered in accordance with rotational symmetry of the tap coefficients of the class for the first direction and the tap coefficients of the class for the second direction.

19. The encoding device according to claim 11, wherein the tap coefficients of the respective classes have tap structures, the tap structures being different from each other between the respective classes.

20. An encoding method comprising, by an encoding device:

performing classification of classifying a pixel of interest of a decoding in-progress image into any of a plurality of classes by using an inclination feature amount, the inclination feature amount indicating a tangent direction of a contour line of pixel values of the pixel of interest, the decoding in-progress image being obtained by adding a residual of predictive coding and a predicted image together;

performing a filter arithmetic operation with the decoding in-progress image by using a tap coefficient of a class of the pixel of interest among tap coefficients of the respective classes, the tap coefficients of the respective classes being each obtained through learning for minimizing an error by using the decoding in-progress image and an original image, the original image corresponding to the decoding in-progress image; and encoding the tap coefficient.

* * * * *